(12) United States Patent
Zhao et al.

(10) Patent No.: US 10,618,042 B1
(45) Date of Patent: Apr. 14, 2020

(54) MIXED METAL OXIDE EXTRUDATE CATALYST

(71) Applicants: Xianhui Zhao, Tampa, FL (US); John Norbert Kuhn, Tampa, FL (US); Devin Mason Walker, Tallahassee, FL (US); Babu Joseph, Tampa, FL (US)

(72) Inventors: Xianhui Zhao, Tampa, FL (US); John Norbert Kuhn, Tampa, FL (US); Devin Mason Walker, Tallahassee, FL (US); Babu Joseph, Tampa, FL (US)

(73) Assignees: UNIVERSITY OF SOUTH FLORIDA, Tampa, FL (US); T2C-ENERGY, LLC, Tampa, FL (US)

( * ) Notice: Subject to any disclaimer, the term of this patent is extended or adjusted under 35 U.S.C. 154(b) by 43 days.

(21) Appl. No.: 15/994,813

(22) Filed: May 31, 2018

Related U.S. Application Data

(60) Provisional application No. 62/512,842, filed on May 31, 2017.

(51) Int. Cl.
  *B01J 23/02* (2006.01)
  *B01J 37/00* (2006.01)
  (Continued)

(52) U.S. Cl.
  CPC ......... *B01J 37/0009* (2013.01); *B01J 21/066* (2013.01); *B01J 21/10* (2013.01);
  (Continued)

(58) Field of Classification Search
  CPC ...... B01J 37/0009; B01J 21/066; B01J 21/10; B01J 23/005; B01J 23/755; B01J 23/78;
  (Continued)

(56) References Cited

U.S. PATENT DOCUMENTS 4,293,445 A  10/1981 Shimizu et al.
4,668,654 A  5/1987 Drake
(Continued)

OTHER PUBLICATIONS

Astrid Wolfbeisser et al., "Methane dry reforming over ceria-zirconia supported Ni catalysts." Catalysis Today 277, pp. 234-245. (Year: 2016).*

(Continued)

*Primary Examiner* — Patricia L. Hailey
(74) *Attorney, Agent, or Firm* — Thomas | Horstemeyer, LLP

(57) ABSTRACT

Methods of making a $Ce_{0.6}Zr_{0.4}O_2$ supported NiMg catalyst extrudate are provided. In some aspects, the methods include preparing a ceria-zirconia solution comprising $Ce(NO_3)_3 \cdot 6H_2O$, $ZrO(NO_3)_2 \cdot xH_2O$, and water; forming a precipitate; drying and calcining the precipitate to produce a $Ce_{0.6}Zr_{0.4}O_2$; adding a nickel-magnesium solution to the $Ce_{0.6}Zr_{0.4}O_2$ to produce the $NiMg/Ce_{0.6}Zr_{0.4}O_2$; and drying and calcining a wet extrudate of the $NiMg/Ce_{0.6}Zr_{0.4}O_2$ to produce the $Ce_{0.6}Zr_{0.4}O_2$ supported NiMg catalyst extrudate. $Ce_{0.6}Zr_{0.4}O_2$ supported NiMg catalyst extrudates made by the methods are also provided.

19 Claims, 24 Drawing Sheets

(51) Int. Cl.
| | |
|---|---|
| *B01J 37/03* | (2006.01) |
| *B01J 37/08* | (2006.01) |
| *B01J 21/06* | (2006.01) |
| *B01J 23/00* | (2006.01) |
| *B01J 23/755* | (2006.01) |
| *B01J 23/78* | (2006.01) |
| *B01J 21/10* | (2006.01) |

(52) U.S. Cl.
CPC ........... *B01J 23/005* (2013.01); *B01J 23/755* (2013.01); *B01J 23/78* (2013.01); *B01J 37/031* (2013.01); *B01J 37/08* (2013.01); *B01J 2523/3712* (2013.01); *B01J 2523/48* (2013.01)

(58) Field of Classification Search
CPC .. B01J 37/031; B01J 37/08; B01J 2523/3712; B01J 2523/48
USPC ......... 502/117, 304, 328, 349; 423/263, 608
See application file for complete search history.

(56) References Cited

U.S. PATENT DOCUMENTS

| | | | |
|---|---|---|---|
| 4,977,123 A | 12/1990 | Flytzani-Stephanopoulos et al. | |
| 5,593,936 A | 1/1997 | Glock et al. | |
| 5,607,297 A | 3/1997 | Henley et al. | |
| 5,866,503 A | 2/1999 | Siriwardane | |
| 5,958,827 A * | 9/1999 | Suda ................... | B01D 53/945 502/300 |
| 5,965,475 A | 10/1999 | Wittenbrink et al. | |
| 6,110,861 A | 8/2000 | Krumpelt et al. | |
| 6,372,678 B1 | 4/2002 | Youngman et al. | |
| 6,455,052 B1 | 9/2002 | Marcussen et al. | |
| 6,506,705 B2 | 1/2003 | Blanchard et al. | |
| 6,635,191 B2 | 10/2003 | Figueroa et al. | |
| 7,223,354 B2 | 5/2007 | Ramani et al. | |
| 7,247,597 B2 * | 7/2007 | Morikawa ................. | B01J 23/10 423/594.12 |
| 7,824,656 B2 | 11/2010 | Idem et al. | |
| 8,916,492 B2 | 12/2014 | Skjoth-Rasmussen et al. | |
| 9,000,199 B2 | 4/2015 | Hong et al. | |
| 9,102,887 B2 | 8/2015 | McGoldrick | |
| 9,168,510 B2 | 10/2015 | Lee et al. | |
| 9,480,974 B2 | 11/2016 | Rajaram et al. | |
| 9,630,167 B2 | 4/2017 | Bordoloi et al. | |
| 10,005,963 B2 * | 6/2018 | Kuhn ....................... | C10G 2/32 |
| 2003/0186805 A1 * | 10/2003 | Vanderspurt ........... | B01J 23/002 502/304 |
| 2007/0037690 A1 | 2/2007 | Fenouil et al. | |
| 2014/0041300 A1 * | 2/2014 | Lee ......................... | B01J 23/83 48/198.5 |
| 2016/0296917 A1 * | 10/2016 | Bordoloi .................. | B01J 23/83 |

OTHER PUBLICATIONS

Rajib Kumar Singha et al., "Ni nanocluster on modified CeO2—ZrO2 nanoporous composite for tri-reforming of methane." Catalysis Science and Technology, 6, pp. 7122-7136. (Year: 2016).*

Nada H. Elsayed et al., "Low temperature dry reforming of methane over Pt—Ni—Mg/ceria-zirconia catalysts." Applied Catalysis B: Environmental 179, pp. 213-219. (Year: 2015).*

Carla de Leitenburg et al., "A Novel and Simple Route to Catalysts with a High Oxygen Storage Capacity: the Direct Room-temperature Synthesis of CeO2—ZrO2 Solid Solutions." J. Chem. Soc., Chem. Commun., pp. 2181-2182. (Year: 1995).*

Albertina Cabanas et al., "A continuous and clean one-step synthesis of nano-particulate Ce1-xZrxO2 solid solutions in near-critical water." Chem. Commun., pp. 901-902. (Year: 2000).*

Bemani, M. and Z. A. Aboosadi, "A Dynamic Model on the Tri-Reformer Fixed-Bed Reactor to Prepare Synthesis Gas Required to Produce Methanol," Journal of Fundamental and Applied Sciences, 2016, pp. 2918-2932, vol. 8, No. 3S, doi: 10.4314/jfas.v8i3s.386.

Noureldin, Mohamed M. B., et al., "A Process Integration Approach to the Assessment of CO2 Fixation through Dry Reforming," ACS Sustainable Chemistry & Engineering, 2015, pp. 625-636, vol. 3, ACS Publications, doi: 10.1021/sc5007736.

Liu, Jie, et al., "Alkaline-assisted Ni nanocatalysts with largely enhanced low-temperature activity toward CO2 methanation," Catalysis Science & Technology, 2016, pp. 3976-3983, vol. 6, doi: 10.1039/c5cy02026c.

Parry, E.P., "An Infrared Study of Pyridine Absorbed on Acidic Solids. Characterization of Surface Acidity," Journal of Catalysis, 1963, pp. 371-379, vol. 2.

Kumar, Velisoju, et al., "An investigation on the influence of support type for Ni catalysed vapour phase hydrogenation of aqueous levulinic acid to γ-valerolactone," RSC Advances, 2016, pp. 9872-9879, vol. 6, doi: 10.1039/c5ra24199e.

Xie, Jingyi, et al., "Autothermal reforming and partial oxidation of n-hexadecane via Pt/Ni bimetallic catalysts on ceria-based supports," International Journal of Hydrogen Energy, 2015, pp. 8510-8521, vol. 40, Elsevier Ltd., doi: 10.1016/j.ijhydene.2015.04.139.

Kumar, Nitin, et al., "Bi-reforming of methane on Ni-based pyrochlore catalyst," Applied Catalysis A: General, 2016, pp. 211-216, vol. 517, doi: 10.1016/j.apcata.2016.03.016.

Wang, Changzhen, et al., "Carbon intermediates during CO2 reforming of methane over NieCaOeZrO2 catalysts: A temperature-programmed surface reaction study," International Journal of Hydrogen Energy, 2016, pp. 19014-10924, vol. 41, Elsevier Ltd., doi: 10.1016/j.ijhydene.2016.08.128.

García-Vargas, Jesús Manuel, et al., "Catalytic and kinetic analysis of the methane tri-reforming over a Ni—Mg/β-SiC catalyst," International Journal of Hydrogen Energy, 2015, pp. 8677-8687, vol. 40, Elsevier Ltd., doi: 10.1016/j.ijhydene.2015.05.032.

Narasimharao, Katabathini and Tarek T. Ali, "Catalytic Oxidative Cracking of Propane Over Nanosized Gold Supported Ce0.5Zr0.5O2 Catalysts," Catalysis Letters, 2013, pp. 1074-1084, vol. 143.

Trane-Restrup, Rasmus, et al., "Catalytic Steam Reforming of Bio-Oil to Hydrogen Rich Gas," Technical University of Denmark, Department of Chemical and Biochemical Engineering, 2013, pp. 1-169.

Daza, Carlos Enrique, et al., "CO2 reforming of methane over Ni/Mg/Al/Ce mixed oxides," Catalysis Today, 2008, pp. 357-366, vol. 133-135, doi: 10.1016/j.cattod.2007.12.081.

Elsayed, Nada H., et al., "Comparison of Pd—Ni—Mg/Ceria-Zirconia and Pt—Ni—Mg/Ceria-Zirconia Catalysts for Syngas Production via Low Temperature Reforming of Model Biogas," Topics in Catalysis, 2016, pp. 138-146, vol. 59.

Lang, Wendy, et al., "Co-oxidation of CO and propylene on Pd/CeO2—ZrO2 and Pd/Al2O3 monolith catalysts: A light-off, kinetics, and mechanistic study," Applied Catalysis B: Environmental, 2017, pp. 430-442, vol. 218, doi: 10.1016/j.apcatb.2017.06.064.

Zhao, X., et al., "Design and optimization of NiMg/ceria-zirconia catalyst pellets," Powder Technology, 2019, pp. 1-9, doi: 10.1016/j.powtec.2019.08.097.

Djinovic, Petar, et al., "Details Behind the Self-Regeneration of Supported NiCo/Ce0.8Zr0.2O2 Bimetallic Catalyst in the CH4—CO2 Reforming Reaction," CHEMCATCHEM, 2014, pp. 1652-1663, vol. 6, doi: 10.1002/cctc.201400059.

Vasiliades, M.A., et al., "Dry reforming of methane over 5 wt% Ni/Ce1-xPrxO2-δ catalysts: Performance and characterisation of active and inactive carbon by transient isotopic techniques," Applied Catalysis B: Environmental, 2016, pp. 168-183, vol. 197, doi: 10.1016/j.apcatb.2016.03.012.

Du, X., et al., "Dry reforming of methane over ZrO2-supported Co—Mo carbide catalyst," Applied Petrochemical Research, 2014, pp. 137-144, vol. 4, doi: 10.1007/s13203-014-0060-3.

Li, Weizuo, et al., "Dry reforming of methane towards CO-rich hydrogen production over robust supported Ni catalyst on hierarchically structured monoclinic zirconia nanosheets," International Journal of Hydrogen Energy, 2016, pp. 17907-17921, vol. 41, Elsevier Ltd., doi: 10.1016/j.ijhydene.2016.07.272.

Abdullah, Nor Hakimin, et al., "Effect of homogeneous acidic catalyst on mechanical strength of trishydrazone hydrogels: Characterization and optimization studies," Arabian Journal of Chemistry, 2016, pp. 1-10, doi: 10.1016/j.arabjc.2016.01.001.

(56) References Cited

OTHER PUBLICATIONS

Al-Fatesh, Ahmed Sadeq, et al., "Effect of Nano-support and Type of Active Metal on Reforming of CH4 with CO2," Journal of the Chinese Chemical Society, 2014, pp. 461-470, vol. 61.

Hellgardt, Klaus and David Chadwick, "Effect of pH of Precipitation on the Preparation of High Surface Area Aluminas from Nitrate Solutions," Industrial & Engineering Chemical Industry, 1998, pp. 405-411, vol. 37.

M.N., Syazwani, et al., "Effect of pH on the Physicochemical Properties of MoVTeNbOx Catalysts for Oxidation of Propane to Acrylic Acid," International Jouranl of Scientific & Technology Research, 2016, pp. 40-45, vol. 5, No. 1.

May-Lozano, M., et al., "Effect of the Amount of Water in the Synthesis of B—TiO2: Orange II Photodegradation," International Journal of Photochemistry, 2014, pp. 1-8, Hindawi Publishing Corporation, doi: 10.1155/2014/721216.

Cimenler, Ummuhan, et al., "Effect of Zeolite Membrane Shell Thickness on Reactant Selectivity for Hydrocarbon Steam Reforming Using Layered Catalysts," Energy & Fuels, 2016, pp. A-I, ACS Publications, doi: 10.1021/acs.energyfuels.6b00510.

Sekido, T., et al., "Effects of pH on the structure and mechanical properties of dried pH-responsive latex particles," Soft Matter, 2017, pp. 7562-7570, vol. 13, doi: 10.1039/c7sm01625e.

Zhan, Zongcheng, et al., "Effects of synthesis methods on the performance of Pt + Rh/Ce0.6Zr0.4O2 three-way catalysts," Journal of Environmental Sciences, 2014, pp. 683-693, vol. 26, doi: 10.1016/S1001-0742(13)60444-1.

Vidmar, Polona, et al., "Effects of Trivalent Dopants on the Redox Properties of Ce0.6Zr0.4O2 Mixed Oxide," Journal of Catalysts, 1997, pp. 160-168, vol. 171.

Ashok, J., et al., "Enhanced activity of CO2methanation over Ni/CeO2—ZrO2catalysts:Influence of preparation methods," Catalysis Today, 2016, pp. 1-8, doi: 10.1016/j.cattod.2016.07.020.

Xu, Ya, et al., "Enhanced catalytic activity of Ni3Al foils towards methane steam reforming by water vapor and hydrogen pretreatments," International Journal of Hydrogen Energy, 2016, pp. 7352-7362, vol. 41, Elsevier Ltd., doi: 10.1016/j.ijhydene.2016.03.103.

Mitchell, Sharon, et al., "From powder to technical body: the undervalued science of catalyst scale up," Chemical Society Reviews, 2013, pp. 6094-6112, vol. 42, doi: 10.1039/c3cs60076a.

Stelte, Wolfgang, et al., "Fuel pellets from biomass: The importance of the pelletizing pressure and its dependency on the processing conditions," Fuel, 2011, pp. 3285-3290, vol. 90, Elsevier Ltd., doi: 10.1016/j.fuel.2011.05.011.

Daza, Carlos Enrique, et al., "High stability of Ce-promoted Ni/Mg—Al catalysts derived from hydrotalcites in dry reforming of methane," Fuel, 2010, pp. 592-603, vol. 89, Elsevier Ltd., doi: 10.1016/j.fuel.2009.10.010.

Xu, Shan and Xiaolai Wang, "Highly active and coking resistant Ni/CeO2—ZrO2 catalyst for partial oxidation of methane," Fuel, 2005, pp. 563-567, vol. 84, doi: 10.1016/j.fuel.2004.10.008.

Roh, Hyun-Seog, et al., "Highly active and stable Ni/Ce—ZrO2 catalyst for H2 production from methane," Journal of Molecular Cataylsis A: Chemical, 2002, pp. 137-142, vol. 181.

Roh, Hyun-Seog, et al., "Highly Active and Stable Ni—Ce—ZrO2 Catalysts in Combined H2O and CO2 Reforming of Methane for Gas to Liquids (GTL)."

Cimenler, Ummuhan, et al., "Hydrocarbon Steam Reforming Using Silicalite-1 Zeolite Encapsulated Ni-Based Catalyst," AIChE Journal, 2017, pp. 200-207, vol. 63, No. 1, doi: 10.1002/aic.

Sinkó, Katalin, "Influence of Chemical Conditions on the Nanoporous Structure of Silicate Aerogels," Materials, 2010, pp. 704-740, vol. 3, doi: 10.3390/ma3010704.

Vidal, H., et al., "Influence of high temperature treatments under net oxidizing and reducing conditions on the oxygen storage and buffering properties of a Ce0.68Zr0.32O2 mixed oxide," Catalysis Today, 1999, pp. 93-100, vol. 54.

Sukonket, Thitinat, et al., "Influence of the Catalyst Preparation Method, Surfactant Amount, and Steam on CO2 Reforming of CH4 over 5Ni/Ce0.6Zr0.4O2 Catalysts," Energy & Fuels, 2011, pp. 864-877, vol. 25, ACS Publications, doi: 10.1021/ef101479y.

Lavalley, J.C., "Infrared spectrometric studies of the surface basicity of metal oxides and zeolites using adsorbed probe molecules," Catalysis Today, 1996, pp. 377-401, vol. 27.

Busca, Guido, "Infrared studies of the reactive adsorption of organic molecules over metal oxides and of the mechanisms of their heterogeneously-catalyzed oxidation," Catalysis Today, 1996, pp. 457-496, vol. 27.

Liu, Jiahe, et al., "Integrated coal pyrolysis with CO2 reforming of methane over Ni/MgO catalyst for improving tar yield," Fuel Processing Technology, 2010, pp. 419-423, vol. 91, doi: 10.1016/j.fuproc.2009.05.003.

Beeckman, Jean W.L., et al., "Length to Diameter Ratio of Extrudates in Catalyst Technology I. Modeling Catalyst Breakage by Impulsive Forces," Particle Technology and Fluidization, 2016, pp. 639-647, vol. 62, No. 3, doi: 10.1002/aic.15046.

Hajjaji, Noureddine, et al., "Life cycle assessment of hydrogen production from biogas reforming," International Journal of Hydrogen Energy, 2016, pp. 6064-6075, vol. 41, Elsevier Ltd., doi: 10.1016/j.ijhydene.2016.03.006.

Elsayed, Nada H., et al., "Low temperature dry reforming of methane over Pt—Ni—Mg/ceria-zirconia catalysts," Applied Catalysis B: Environmental, 2015, pp. 213-219, vol. 179, doi: 10.1016/j.apcatb.2015.05.021.

Jacobs, Gary, et al., "Low-Temperature Water-Gas Shift: In-Situ DRIFTS—Reaction Study of a Pt/CeO2 Catalyst for Fuel Cell Reformer Applications," Journal of Physical Chemistry B, 2003, pp. 10398-10404, vol. 107.

Li, Yongdan, et al., "Measurement and statistics of single pellet mechanical strength of differently shaped catalysts," Powder Technology, 2000, pp. 176-184, vol. 113.

David, E., "Mechanical strength and reliability of the porous materials used as adsorbents/catalysts and the new development trends," International Scientific Journal Archives of Materials Science and Engineering, 2015, pp. 5-17, vol. 73, No. 1, www.archivesmse.org.

Wang, Xiang, et al., "Mechanism of CO2 Hydrogenation on Pd/Al2O3 Catalysts: Kinetics and Transient DRIFTS—MS Studies," ACS Catalysis, 2015, pp. 6337-6349, vol. 5, ACS Publications, doi: 10.1021/acscatal.5b01464.

Escritori, Janaína, et al., "Methane autothermal reforming on nickel-ceria-zirconia based catalysts," Catalysis Communications, 2009, pp. 1090-1094, vol. 10, doi: 10.1016/j.catcom.2009.01.001.

Kahle, Lea C. S., et al., "Methane Dry Reforming at High Temperature and Elevated Pressure: Impact of Gas-Phase Reactions," Industrial & Engineering Chemistry Research, 2013, pp. 11920-11930, vol. 52, ACS Publications, doi: 10.1021/ie401048w.

Wolfbeisser, Astrid, et al., "Methane dry reforming over ceria-zirconia supported Ni catalysts," Catalysis Today, 2016, pp. 234-245, vol. 277, Elsevier B.V., doi: 10.1016/j.cattod.2016.04.025.

Pengpanich, Sitthiphong, et al., "Methane partial oxidation over Ni/CeO2—ZrO2 mixed oxide solid solution catalysts," Catalysis Today, 2004, pp. 95-105, vol. 93-95, doi: 10.1016/j.cattod.2004.06.079.

Dong, Wen-Sheng, et al., "Methane reforming over Ni/Ce—ZrO2 catalysts: effect of nickel content," Applied Catalysis A: General, 2002, pp. 63-72, vol. 226.

Kuznetsova, T.G., et al., "Methane transformation into syngas over Ce—Zr—O systems: role of the surface/bulk promoters and oxygen mobility," Catalysis Today, 2004, pp. 161-164, vol. 91-92, doi: 10.1016/j.cattod.2004.03.056.

Fally, F., et al., "Modification of the oxygen storage capacity of CeO2—ZrO2 mixed oxides after redox cycling aging," Catalysis Today, 2000, pp. 373-386, vol. 59.

Cimenler, Ummuhan, et al., "Molecular-size selective H-β zeolite-encapsulated Ce—Zr/Ni—Mgcatalysts for steam reforming," Applied Catalysis A: General, 2015, pp. 494-500, vol. 505, doi: 10.1016/j.apcata.2015.05.014.

(56) References Cited

OTHER PUBLICATIONS

Heibel, Achim K., et al., "Monolithic Catalysts for the Chemical Industry," Industrial & Engineering Chemistry Research, 2004, pp. 4602-4611, vol. 43.

Farrauto, Robert J. and John N. Armor, "Moving from discovery to real applications for your catalyst," Applied Catalysis A: General, 2016, pp. 182-189, vol. 527, doi: 10.1016/j.apcata.2016.09.008.

Balzarotti, Riccardo, et al., "Ni/CeO2-thin ceramic layer depositions on ceramic monoliths for syngas production by Oxy Steam Reforming of biogas," Fuel Processing Technology, 2016, pp. 40-48, vol. 149, doi: 10.1016/j.fuproc.2016.04.002.

Xiang, Xianmei, et al., "Nickel based mesoporous silica-ceria-zirconia composite for carbon dioxide reforming of methane," Applied Catalysis A: General, 2016, pp. 140-150, vol. 520, doi: 10.1016/j.apcata.2016.04.020.

Kumar, Prashant, et al., "Nickel-Based Ceria, Zirconia, and Ceria-Zirconia Catalytic Systems for Low-Temperature Carbon Dioxide Reforming of Methane," Energy & Fuels, 2007, pp. 3113-3123, vol. 21, doi: 10.1021/ef7002409.

Zhao, Xianhui, et al., "NiMg/Ceria-Zirconia Cylindrical Pellet Catalysts for Tri-reforming of Surrogate Biogas," Industrial & Engineering Chemistry Research, 2018, pp. 845-855, vol. 57, ACS Publications, doi: 10.1021/acs.iecr.7b03669.

Schulz, Linus A., et al., "On the coke deposition in dry reforming of methane at elevatedpressures," Applied Catalysis A: General, 2015, pp. 599-607, vol. 54, doi: 10.1016/j.apcata.2015.03.002.

Cho, Wonjun, et al., "Optimal design and operation of a natural gas tri-reforming reactor for DME synthesis," Catalysis Today, 2009, pp. 261-267, vol. 139, doi: 10.1016/j.cattod.2008.04.051.

Di Monte, Roberta, et al., "Pd/Ce0:6Zr0:4O2/Al2O3 as advanced materials for three-way catalysts Part 1. Catalyst characterisation, thermal stability and catalytic activity in the reduction of NO by CO," Applied Catalysis B: Environmental, 2000, pp. 157-167, vol. 24.

Badoga, Sandeep, et al., Performance of Promoted Iron/CNT Catalyst for Fischer-Tropsch Synthesis: Influence of Pellet Shapes and Binder Loading, Energy & Fuels, 2017, pp. 12633-12644, vol. 31, ACS Publications, doi: 10.1021/acs.energyfuels.7b01318.

Frusteri, F., et al., "Potassium-enhanced stability of Ni/MgO catalysts in the dry-reforming of methane," Catalysis Communications, 2001, pp. 49-56, vol. 2.

Chandrasekar, Govindasamy, et al., "Preparation of SBA-15 extrudates: Evaluation of textural and mechanical properties," Journal of Porous Materials, 2009, pp. 175-183, vol. 16, doi: 10.1007/s10934-007-9182-7.

Chen, Shilong, et al., "Probing Surface Structures of CeO2, TiO2, and Cu2O Nanocrystals with CO and CO2 Chemisorption," The Journal of Physical Chemistry C, 2016, pp. 21472-21475, vol. 120, ACS Publications, doi: 10.1021/acs.jpcc.6b06158.

Liguras, Dimitris K., et al., "Production of hydrogen for fuel cells by steam reforming of ethanol over supported noble metal catalysts," Applied Catalysis B: Environmental, 2003, pp. 345-354, vol. 43, doi: 10.1016/S0926-3373(02)00327-2.

He, Dedong, et al., "Promoter Effects on Nickel-Supported Magnesium Oxide Catalystsfor the Carbon Dioxide Reforming of Methane," Energy & Fuels, pp. A-G, ACS Publications, doi: 10.1021/acs.energyfuels.6b02361.

Nakamura, Kazuya, et al., "Promoting effect of MgO addition to Pt/Ni/CeO2/Al2O3 in the steam gasification of biomass," Applied Catalysis B: Environmental, 2009, pp. 36-44, vol. 86, doi: 10.1016/j.apcatb.2008.07.016.

Chuong, Sara Yu, et al., "Pt—Re bimetallic supported on CeO2—ZrO2 mixed oxides as water-gas shift catalysts," Catalysis Today, 2005, pp. 257-262, vol. 99, doi: 10.1016/j.cattod.2004.10.002.

Chilukoti, Srilakshmi, et al., "Pure component spectral analysis of surface adsorbed species measured under real conditions. BTEM-DRIFTS study of CO and NO reaction over a Pd/γ Al2O3 catalyst," Physical Chemistry Chemical Physics, 2008, pp. 5510-5520, vol. 10.

Vidal, H., et al., "Redox behavior of CeO2—ZrO2 mixed oxides I. Influence of redox treatments on high surface area catalysts," Applied Catalysis B: Environmental, 2000, pp. 49-63, vol. 27.

Soykal, I. Ilgaz, et al., "Reduction Characteristics of Ceria under Ethanol Steam Reforming Conditions: Effect of the Particle Size," ACS Catalysis, 2014, pp. 585-592, vol. 4, ACS Publications, doi: 10.1021/cs400908h.

Hou, Miaomiao, et al., "Role of initial water content in glycerol hydrogenolysis to 1,2-propanediol over Cu—ZnO catalyst," Reaction Kinetics, Mechanisms and Catalysis, 2017, pp. 1129-1143, vol. 122, doi: 10.1007/s11144-017-1267-y.

Baldovino-Medrano, V.G. et al., "Role of shaping in the preparation of heterogeneous catalysts: Tableting and slip-casting of oxidation catalysts," Catalysis Today, 2015, pp. 81-91, vol. 246, doi: 10.1016/j.cattod.2014.08.030.

Rezaei, Fateme, et al., "Shaping amine-based solid CO2 adsorbents: Effects of pelletization pressure on the physical and chemical properties," Microporous and Mesoporous Materials, 2015, pp. 34-42, vol. 204, doi: 10.1016/j.micromeso.2014.10.047.

Devyatkov, Sergey Yu., et al., "Shaping of Sulfated Zirconia Catalysts by Extrusion: Understanding the Role of Binders," Industrial & Engineering Chemistry Research, 2016, pp. 6595-6606, vol. 55, ACS Publications, doi: 10.1021/acs.iecr.6b00820.

Olah, George A., et al., "Single Step Bi-reforming and Oxidative Bi-reforming of Methane (Natural Gas) with Steam and Carbon Dioxide to Metgas (CO—2H2) for Methanol Synthesis: Self-Sufficient Effective and Exclusive Oxygenation of Methane to Methanol with Oxygen," Journal of American Chemical Society, 2015, pp. 8720-8729, vol. 137, ACS Publications, doi: 10.1021/jacs.5b02029.

Trane-Restrup, R., et al., "Steam reforming of ethanol over Ni-based catalysts: Effect of feed composition on catalyst stability," International Journal of Hydrogen Energy, 2014, pp. 7735-7746, vol. 39, Elsevier Ltd., doi: 10.1016/j.ijhydene.2014.03.107.

Trane-Restrup, R., et al., "Steam reforming of ethanol: Effects of support and additives on Ni-based catalysts," International Journal of Hydrogen Energy, 2013, pp. 15105-15118, vol. 38, Elsevier, Ltd., doi: 10.1016/j.ijhydene.2013.09.027.

Roy, Partho S., et al., "Steam-biogas reforming over a metal-foam-coated (Pd—Rh)/(CeZrO2—Al2O3) catalyst compared with pellet type alumina-supported Ru and Ni catalysts," Journal of CO2 Utilization, 2015, pp. 12-20, vol. 12, doi: /10.1016/j.jcou.2015.09.003.

Fernández-García, M., et al., "Structural Characteristics and Redox Behavior of CeO2—ZrO2/Al2O3 Supports," Journal of Catalysis, 2000, pp. 385-392, vol. 194, doi: 10.1006/jcat.2000.2931.

Tronconi, Enrico, et al., "Structured catalysts for non-adiabatic applications," Current Opinion in Chemical Engineering, 2004, pp. 55-67, vol. 5, doi: 10.1016/j.coche.2014.04.003.

Chen, L.F., et al., "Surfactant-controlled synthesis of Pd/Ce0.6Zr0.4O2 catalyst for NO reduction by CO with excess oxygen," Applied Surface Science, 2005, pp. 319-328, vol. 243, doi: 10.1016/j.apsusc.2004.09.074.

Vita, Antonio, et al., "Syngas production by methane oxy-steam reforming on Me/CeO2 (Me = Rh, Pt, Ni) catalyst lined on cordierite monoliths," Applied Catalysis B: Environmental, 2015, pp. 551-563, vol. 162, doi: 10.1016/j.apcatb.2014.07.028.

Walker, Devin M., "Synthesis gas production to desired hydrogen to carbon monoxide ratios by tri-reforming of methane using Ni—MgO—(Ce,Zr)O2 catalysts," Applied Catalysis A: General, 2012, pp. 61-68, vol. 445-446, doi: 10.1016/j.apcata.2012.08.015.

Aasberg-Petersen, K., et al., "Technologies for large-scale gas conversion," Applied Catalysis A: General, 2001, pp. 379-387, vol. 221.

Diskin, Ann M., et al., "The oxidative chemistry of methane over supported nickel catalysts," Catalysis Today, 1998, pp. 147-154, vol. 46.

Guo, Jianjun, et al., "The reactivity of surface active carbonaceous species with CO2 and its role on hydrocarbon conversion reactions," Journal of Molecular Catalysis A: Chemical, 2010, pp. 1-7, vol. 316, doi: 10.1016/j.molcata.2009.09.023.

(56) References Cited

OTHER PUBLICATIONS

Lee, Seung-Ho, et al., "Tri-reforming of CH4 using CO2 for production of synthesis gas to dimethyl ether," Catalysis Today, 2003, pp. 133-137, vol. 87, doi: 10.1016/j.cattod.2003.10.005.

Song, Chunshan and Wei Pan, "Tri-reforming of methane: a novel concept for catalytic production of industrially useful synthesis gas with desired H2/CO ratios," Catalysis Today, 2004, pp. 463-484, vol. 98, doi: 10.1016/j.cattod.2004.09.054.

Zhao, Xianhui, et al., "Tri-reforming of surrogate biogas over Ni/Mg/ceria-zirconia/alumina pellet catalysts," Chemical Engineering Communications, pp. 1-14, doi: 10.1080/00986445.2018.1434162.

Katheria, Sanjay, et al., "Washcoating of Ni/MgAl2O4 Catalyst on FeCralloy Monoliths for Steam Reforming of Methane," Energy & Fuels, 2017, pp. 3143-3153, vol. 31, ACS Publications, doi: 10.1021/acs.energyfuels.6b03423.

Kouva, Sonja, et al., "Water and carbon oxides on monoclinic zirconia: experimental and computational insights," Physical Chemistry Chemical Physics, 2014, pp. 20650-20664, vol. 16, doi: 10.1039/c4cp02742f.

Bi, Yadong, et al., "Water-gas shift reaction in a Pd membrane reactor over Pt/Ce0.6Zr0.4O2 catalyst," International Journal of Hydrogen Energy, 2009, pp. 2965-2971, vol. 34, Elsevier Ltd., doi: 10.1016/j.ijhydene.2009.01.046.

\* cited by examiner

MIXED METAL OXIDE EXTRUDATE CATALYST

CROSS-REFERENCE TO RELATED APPLICATIONS

This application claims priority to, and the benefit of, U.S. provisional application entitled "MIXED METAL OXIDE EXTRUDATE CATALYST" having Ser. No. 62/512,842 filed May 31, 2017, the contents of which are incorporated by reference in their entirety.

STATEMENT REGARDING FEDERALLY SPONSORED RESEARCH OR DEVELOPMENT

This invention was made with government support under Grant Number DE-SC0015221 awarded by the Department of Energy. The government has certain rights in the invention.

TECHNICAL FIELD

The present invention relates to mixed metal oxide extrudate catalyst, for example extrudate catalyst that can be used for tri-reforming of biogas at the commercial scale.

BACKGROUND

Biogas is produced by the anaerobic digestion of organic materials including crop and forest residues, sewage sludge, and agricultural waste. Biogas consists of $CH_4$, $CO_2$, and trace amounts of moisture, $NH_3$, $H_2S$, etc. Biogas could be burned directly to generate heat or power, but this combustion process has a low efficiency (i.e. low calorific value) due to the presence of $CO_2$ and $H_2O$. Biogas could be utilized to produce syngas ($H_2$ and CO) via reforming technology followed by Fischer-Tropsch Synthesis (FTS) to produce higher value products.[1,2] There is also interest in tri-reforming as a means for $CO_2$ sequestration.[3,4]

There are several main reforming technologies to convert biogas to syngas without the removal of $CO_2$ including dry reforming (reaction (1)), bi-reforming (reaction (1) and reaction (2)), and tri-reforming (reaction (1), reaction (2), and reaction (3)). Bi-reforming of methane has the advantage of producing 2:1 $H_2$/CO syngas that could be directly converted into high value products. However, a major problem during the bi-reforming process is carbon deposition that can deactivate the catalyst.[2] Tri-reforming of methane is a combination of dry reforming, steam reforming and partial oxygen reforming, where $O_2$ and $H_2O$ decrease the carbon deposition on the catalyst. The major reactions during the tri-reforming process are shown below. In addition, the molar ratio of $H_2$ to CO during the tri-reforming process could be controlled to achieve an optimum value. The partial oxidation reaction relieves some heat duty from the reactor.[5-7]

$CH_4+CO_2 \Rightarrow 2CO+2H_2$  $\Delta H°=247.3$ kJ/mol  (1)

$CH_4+H_2O \Rightarrow CO+3H_2$  $\Delta H°=206.3$ kJ/mol  (2)

$CH_4+\frac{1}{2}O_2 \Rightarrow CO+2H_2$  $\Delta H°=-35.6$ kJ/mol  (3)

$CO+H_2O \Rightarrow CO_2+H_2$  $\Delta H°=-41.1$ kJ/mol  (4)

$CH_4 \Rightarrow C+2H_2$  $\Delta H°=74.9$ kJ/mol  (5)

$2CO \Rightarrow C+CO_2$  $\Delta H°=-172.2$ kJ/mol  (6)

$C+O_2 \Rightarrow CO_2$  $\Delta H°=-393.7$ kJ/mol  (7)

$C+H_2O \Rightarrow CO+H_2$  $\Delta H°=131.4$ kJ/mol  (8)

Tri-reforming of methane requires a high reaction temperature of approximately 800-1000° C. due to the typical net endothermic nature of the reactions, causing many catalysts to deactivate over relatively short period of times. This has led to a need for tri-reforming catalysts that are thermally stable and resistant to coke deposition[2]. Ni-based catalysts have been proven to show good catalytic performance towards methane reforming. Nickel is cheap and easy accessible; however, Ni-based catalysts deactivate gradually. Redox support materials such as $CeO_2$ and $(Ce,Zr)O_2$ could reduce carbon deposition and prevent metal sintering due to high oxygen storage capability and strong metal-support interaction. Moreover, magnesia could help reduce the carbon deposition.[5,8]

Pressure drop and mass transfer efficiency are two potential/additional limiting factors in commercial processes.[9] Most research level experiments are done on the powder form of catalyst to maximize mass transfer efficiency but these powder forms of the catalyst are not typically applicable in a fixed bed commercial reactor largely due to the extreme pressure drops that would be encountered. However, formed catalysts with various shapes can be optimized to balance transport limitations vs pressure drop effects. Extrudate catalysts have been developed for steam reforming of methane on the industrial scale. Coke formation and energy requirements are major challenges, especially at typical industrially used pressures.[10] Many researchers have investigated methane reforming under atmospheric pressure due to cost and safety concerns. However, this will adversely affect the process economics since syngas must be pressurized for downstream processing such as Fischer-Tropsch Synthesis.[11] New research level advancements in catalyst support materials and formulations offer the ability to overcome traditional commercial scale limitations but must be modified to meet the demanding physical conditions of large scale applications. Therefore, Ni-based formed catalysts with optimized formulations for tri-reforming of methane at higher pressures (e.g. >3 bar) are worth exploring.

Although literature studies of methane reforming are primarily on powder catalysts, formed catalysts—including foam, ceramic monolith, pellet, bead, sphere, and tablet—have been the focus of recent research. For example, Roy et al.[12] investigated the steam reforming of a model biogas (60% $CH_4$ and 40% $CO_2$) over $PdRh/CeZrO_2/Al_2O_3$/metal foam catalysts at 1 atm in a tubular fixed-bed reactor. The PdRh clusters supported on $CeZrO_2$-modified $Al_2O_3$ powder were coated on a Ni—Cr—Al alloy foam substrate to form the catalyst. With a steam to $CH_4$ ratio of 1.5 and the gas hourly space velocity (GHSV) of 20,000 h$^{-1}$, $CH_4$ conversion increased from 62% to around 99% and the $CO_2$ conversion increased from −21% to 18% with increasing reaction temperatures from 650° C. to 850° C. However, the $H_2$/CO molar ratio decreased with increasing reaction temperatures. Alumina pellets modified with a $NiMg/CeZrO_2$ were tested in our previous biogas tri-reforming studies, but the GHSV (<3,000 h$^{-1}$) was low in comparison to what is needed at the pilot and commercial scales.[13] Vita et al[14] studied the oxy-steam reforming of methane over $Ni/CeO_2$ loaded cordierite monolith catalysts at 1 atm in a fixed-bed quartz reactor. The monolith catalysts were synthesized through a combination of solution combustion synthesis and wet impregnation. The $CH_4/H_2O/O_2$ molar ratio was 1:1.2:0.55, weight hourly space velocity (WHSV) was 65,000 NmL/($g_{cat}$*h), and the reaction temperature was 500-800°

C. $CH_4$ conversion increased and $H_2/CO$ molar ratio decreased with increasing reaction temperature. Garcia-Vargas et al.[15] studied the tri-reforming of methane over NiMg/SiC pellet catalysts at 1 atm in a tubular quartz reactor. The NiMg/SiC pellet catalysts were synthesized through the impregnation method using SiC pellet (radius was 0.5 mm, purchased from SCAT CATALYST company) as the support. The WHSV was 60,000 $NmL/(g_{cat}*h)$ and the reaction temperature was 407-800° C. The $H_2/CO$ molar ratio (varying between 1.1 and 3.1 at 737° C.) was affected by the feed gas composition. $CO_2$ conversion decreased as the concentration of $H_2O$ and $O_2$ increased. To this point, biogas tri-reforming over formed catalysts at pressures higher than 1 atm have not been reported in the literature. This is attributed to the difficulty in producing a formed catalyst that is stable at the high pressures and temperatures needed.

There remains a need for improved catalysts that overcome the aforementioned deficiencies. Mixed oxide supports offer advantages over single metal oxide support materials with respect to desired tri-reforming catalyst performance but also present unique challenges to incorporate the mixed oxides into the desired form capable of withstanding commercial scale reactor conditions while overcoming pressure drop limitations and maintaining desired conversions with long catalyst lifetimes.

SUMMARY

In various aspects, methods are provided for making a mixed metal oxide extrudate catalyst that overcome one or more of the aforementioned deficiencies. The methods can include (a) ball milling a mixed metal oxide to produce a fine powder of about −625 mesh or smaller, (b) combining the powder with a binder and water to produce a mixture, wherein the mass ratio of the powder to the binder is about 10 to 100 and the mass ratio of the powder to water is about about 1 to 7 or about 1 to 5, (c) extruding the mixture through a die to produce a wet extrudate; and (d) drying and calcining the wet extrudate to produce the mixed metal oxide extrudate catalyst. In some aspects, the methods further include pressing the wet extrudate prior to the drying and calcining, e.g. at a force of at least 2000, 3000, or 4000 lbs.

For example, in some aspects the mixed metal oxide extrudate catalyst is a $Ce_{0.6}Zr_{0.4}O_2$ supported NiMg catalyst extrudate, and the method includes (a) preparing a ceria-zirconia solution comprising $Ce(NO_3)_3.6H_2O$, $ZrO(NO_3)_2.xH_2O$, and water; (b) combining the ceria-zirconia solution and $NH_4OH$ to produce a precipitate; (c) drying and calcining the precipitate to produce a $Ce_{0.6}Zr_{0.4}O_2$; (d) forming a nickel-magnesium solution comprising $Ni(NO_3)_2.6H_2O$ and $Mg(NO_3)_2.6H_2O$ dissolved in water; (e) adding the nickel-magnesium solution to the $Ce_{0.6}Zr_{0.4}O_2$ to produce the $NiMg/Ce_{0.6}Zr_{0.4}O_2$; (f) ball milling the $NiMg/Ce_{0.6}Zr_{0.4}O_2$ to produce a $NiMg/Ce_{0.6}Zr_{0.4}O_2$ powder; (g) combining the $NiMg/Ce_{0.6}Zr_{0.4}O_2$ powder with a binder and water to produce a mixture; (h) extruding the mixture through a die to produce a wet extrudate; and (i) drying and calcining the wet extrudate to produce the $Ce_{0.6}Zr_{0.4}O_2$ supported NiMg catalyst extrudate. In some aspects, the methods further include (i) pressing the wet extrudate at a force of at least 4000 lbs.;

In some aspects, the mixed metal oxide catalyst can include an active metal selected from nickel (Ni), magnesium (Mg), copper (Cu), iron (Fe), zinc (Zn), titanium (Ti), cobalt (Co), scandium (Sc), platinum (Pt), rhodium (Rh), yttrium (Y), lanthanum (La), gold (Au) and palladium (Pd). The supported metal oxide can include a mixed metal oxide catalyst. In some aspects, the supported metal oxide includes a combination of metals selected from Ni—Mg, Ni—Cu, Ni—Fe, Ni—Zn, Ni—Ti, Ni—Co, Ni—Sc, Ni—Pt, Ni—Rh, Ni—Y, Ni—La, Ni—Au and Ni—Pd or any combination of these. In some aspects, the mixed metal oxide includes a support selected from cerium (Ce), zirconium (Zr), silicon (Si), aluminum (Al), manganese (Mn), titanium (Ti), yttrium (Y), lanthanum (La), molybdenum (Mo), rhodium (Rh), gallium (Ga), tungsten (W) and barium (Ba).

In some aspects, when the mixed metal oxide extrudate catalyst is a $Ce_{0.6}Zr_{0.4}O_2$ supported NiMg catalyst extrudate, the mass ratio of the $Ce(NO_3)_3.6H_2O$ to the $ZrO(NO_3)_2.xH_2O$ is about 1.5 to 3.5. In some aspects, when the mixed metal oxide extrudate catalyst is a $Ce_{0.6}Zr_{0.4}O_2$ supported NiMg catalyst extrudate, the mass ratio of $Ni(NO_3)_2.6H_2O$ to $Mg(NO_3)_2.6H_2O$ is about 0.4 to 1.0.

The methods can include using various amounts of the binder and water to create a stable extrudate. In some aspects, a mass ratio of the powder to the binder is about 10 to 100, about 10 to 90, about 15 to 90, about 15 to 50, or about 15 to 25. In some aspects, when the mixed metal oxide extrudate catalyst is a $Ce_{0.6}Zr_{0.4}O_2$ supported NiMg catalyst extrudate, a mass ratio of the $NiMg/Ce_{0.6}Zr_{0.4}O_2$ powder to the binder is about 10 to 90 or about 10 to 30. In some aspects, a mass ratio of the powder to the water is about 1.5 to 7.0 or about 1.5 to 3.5. In some aspects, when the mixed metal oxide extrudate catalyst is a $Ce_{0.6}Zr_{0.4}O_2$ supported NiMg catalyst extrudate, a mass ratio of the $NiMg/Ce_{0.6}Zr_{0.4}O_2$ powder to the water is about 1.5 to 7, about 1.5 to 5, or about 1.5 to 3.5. In some aspects, the binder is a gum guar.

The methods can include extruding the extrudate using dies of various sizes. In some aspects, the die has a diameter of about 1.5 mm to 4 mm. The wet extrudate can be dried, for example, by heating the wet extrudate to a first elevated temperature of about 100° C. to 150° C. for a period of time of at least 2 hours. The wet extrudate can be calcined, for example, by heating the wet extrudate to a second elevated temperature of about 400° C. to 600° C. at a rate of about 5° C./min to 20° C./min and maintaining the second elevated temperature for a period of at least 2 hours.

A variety of mixed metal oxide extrudate catalysts prepared by the methods described herein are also provided. For example, in various aspects, a $Ce_{0.6}Zr_{0.4}O_2$ supported NiMg catalyst extrudate is provided. The mixed metal oxide extrudate catalysts can be stable at pressures of about 1-30 bar and temperatures of about 700° C. to 1000° C. The mixed metal oxide extrudate catalysts can have a surface area of about 18 $m^2/g$ to 30 $m^2/g$. The mixed metal oxide extrudate catalysts can have a pore volume of about 0.04 cc/g to 0.07 cc/g. The mixed metal oxide extrudate catalysts can have a pore size of about 90 Å to 180 Å.

A variety of methods are provided for the production of syngas using a mixed metal oxide extrudate catalysts described herein. The methods can include contacting a reactant gas with a mixed metal oxide extrudate catalyst described herein, where the contacting occurs at an elevated temperature and pressure to produce the syngas, wherein the reactant gas comprises $CH_4$, $CO_2$, $O_2$, and $H_2O$; wherein the elevated temperature is about 750° C. to 1000° C., wherein the elevated pressure is about 1.5 bar to 30 bar.

The reactant gas can include $CO_2$, $CH_4$, air, and steam. In various aspects, a $CH_4$ conversion percentage is about 85% to 100% for a ratio of the $H_2O$ to the $CH_4$ in the reactant gas of about 0.2 to 1.2. In various aspects, a $CO_2$ conversion percentage is about 20% to 60% for a ratio of the $H_2O$ to the $CH_4$ in the reactant gas of about 0.2 to 1.2. In various aspects, a molar ratio of $H_2$ to CO present in the syngas is about 1.0 to 3.0 for a ratio of the $H_2O$ to the $CH_4$ in the reactant gas of about 0.2 to 1.2. In various aspects, the reactant gas has a gas hourly space velocity of about 1,000 $h^{-1}$ to 100,000 $h^{-1}$. The mixed metal oxide extrudate catalysts can be in a variety of reactors. For example, the reactor can be a fixed-bed reactor, a moving bed reactor, a fluidized bed reactor, or a batch reactor. In some aspects, the mixed metal oxide extrudate catalyst is in a fixed-bed reactor and the reactant gas is contacted with the mixed metal oxide extrudate catalyst in the fixed-bed reactor. In some aspects, a coking rate of the mixed metal oxide extrudate catalyst is about $2.2 \times 10^{-4}$ $g/(g_{cat}*h)$ or less.

Other systems, methods, features, and advantages of the extrudate catalysts and methods of making and uses thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 2B) used large; (FIG. 2C) fresh small; and (FIG. 2D) used small pellet catalyst.

(FIG. 3C) fresh small; and (FIG. 3D) used small pellet catalyst.

(FIG. 4B) used large; (FIG. 4C) fresh small; and (FIG. 4D) used small pellet catalyst.

(FIG. 5A) large and (FIG. 5B) small catalyst.

(FIG. 6A) large and (FIG. 6B) small catalyst.

(FIGS. 18A-18B) TEM image of NiMg/$Ce_{0.6}Zr_{0.4}O_2$; (FIGS. 18C-18D) HRTEM image showing (220) and (111) plane of $Ce_{0.6}Zr_{0.4}O_2$; (FIG. 18E) HRTEM showing the interface of $MgNiO_2$ (200) and $Ce_{0.6}Zr_{0.4}O_2$ (111).

(FIGS. 19A-19B) TEM image of NiMg/$Ce_{0.6}Zr_{0.4}O_2$ (FIG. 19C) HRTEM image showing (220) and (111) plane of $Ce_{0.6}Zr_{0.4}O_2$ (FIG. 19D) HRTEM showing (200) plane of $MgNiO_2$ (FIG. 19E) HRTEM showing the interface of $MgNiO_2$ (220) and $Ce_{0.6}Zr_{0.4}O_2$ (111).

DETAILED DESCRIPTION

Figure 1:
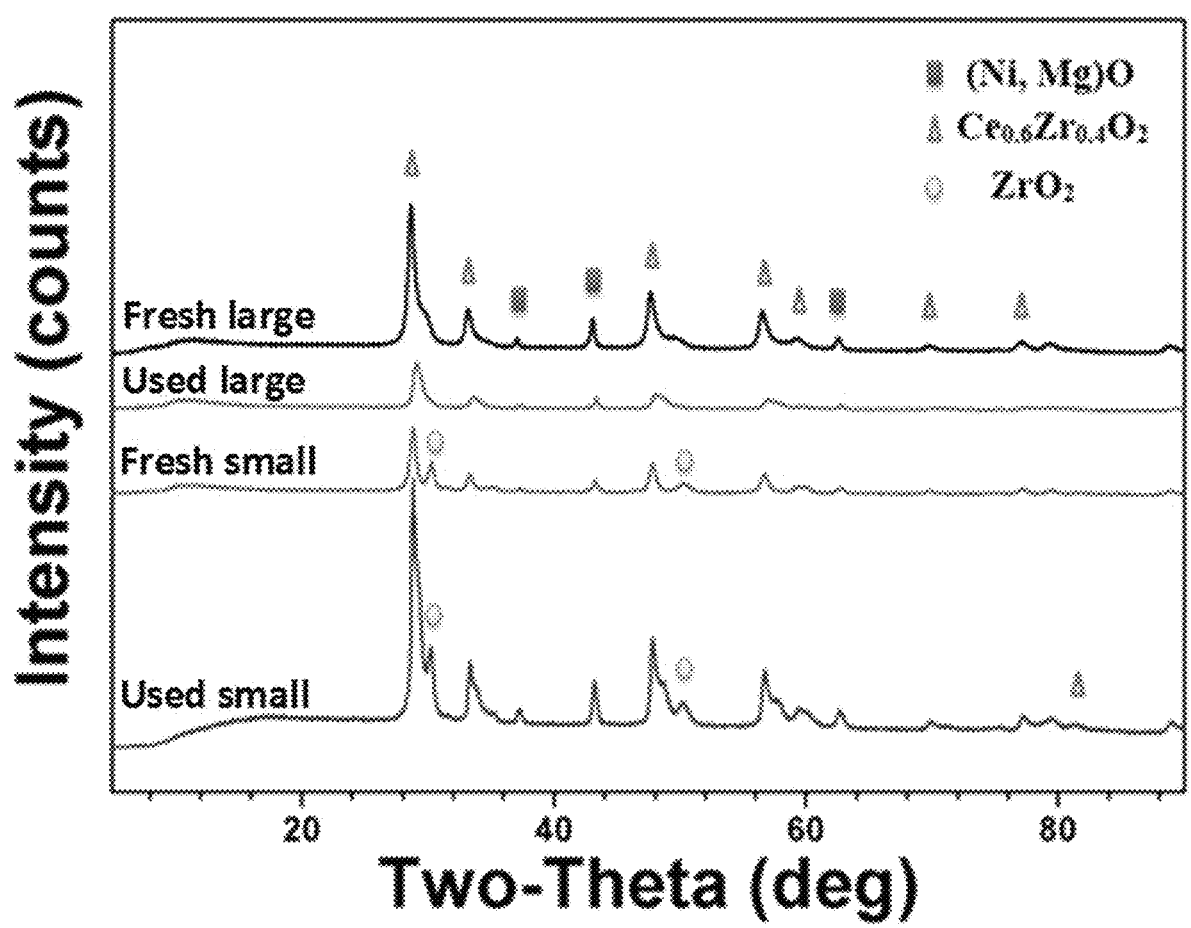
FIG. 1 shows the XRD profiles of fresh and used pellet catalysts.
Figure 2A:
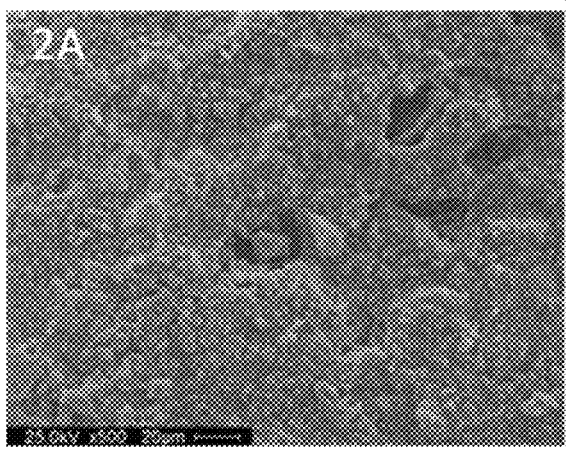
FIGS. 2A-2D show the SEM images of (FIG. 2A) fresh large.
Figure 2B:
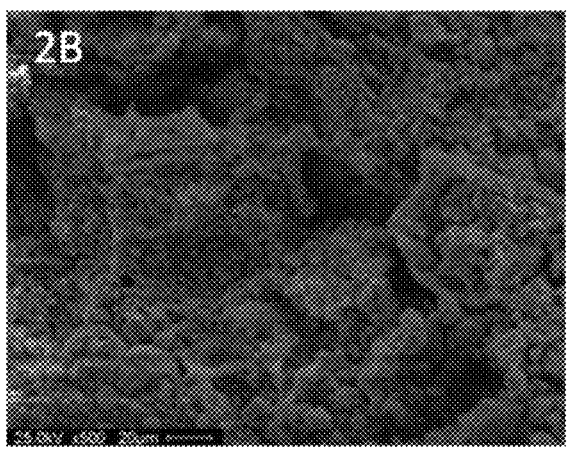
Figure 2C:
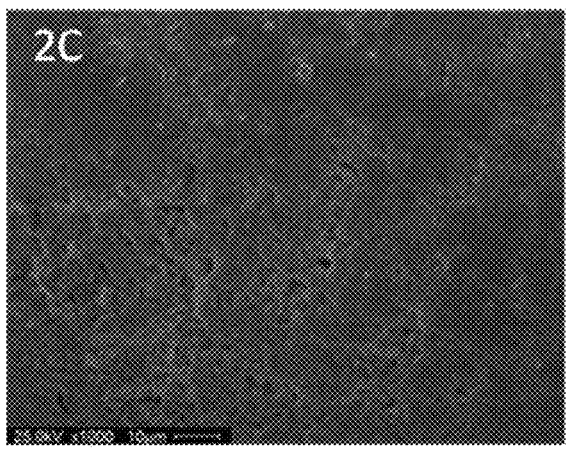
Figure 2D:
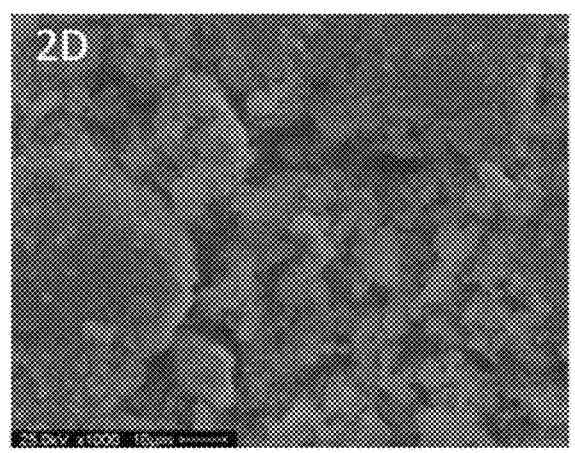
Figure 3A:
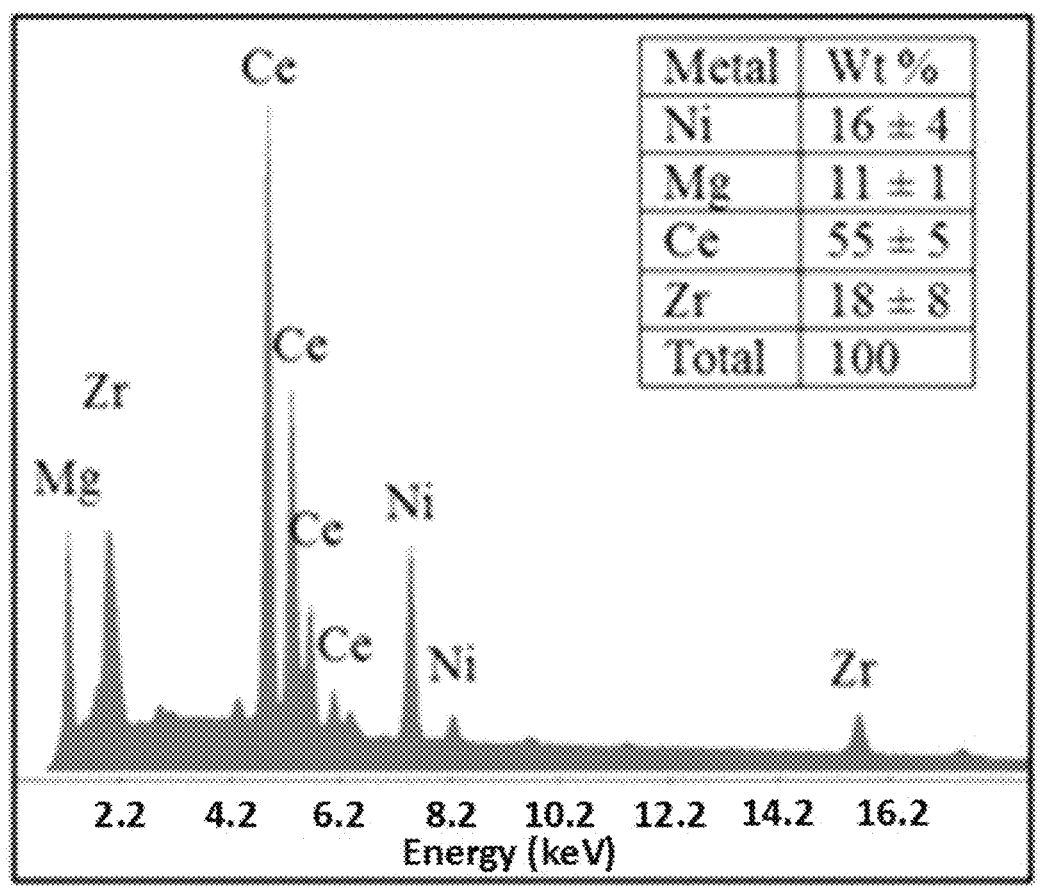
FIGS. 3A-3D show EDS results of (FIG. 3A) fresh large, (FIG. 3B) used large.
Figure 3B:
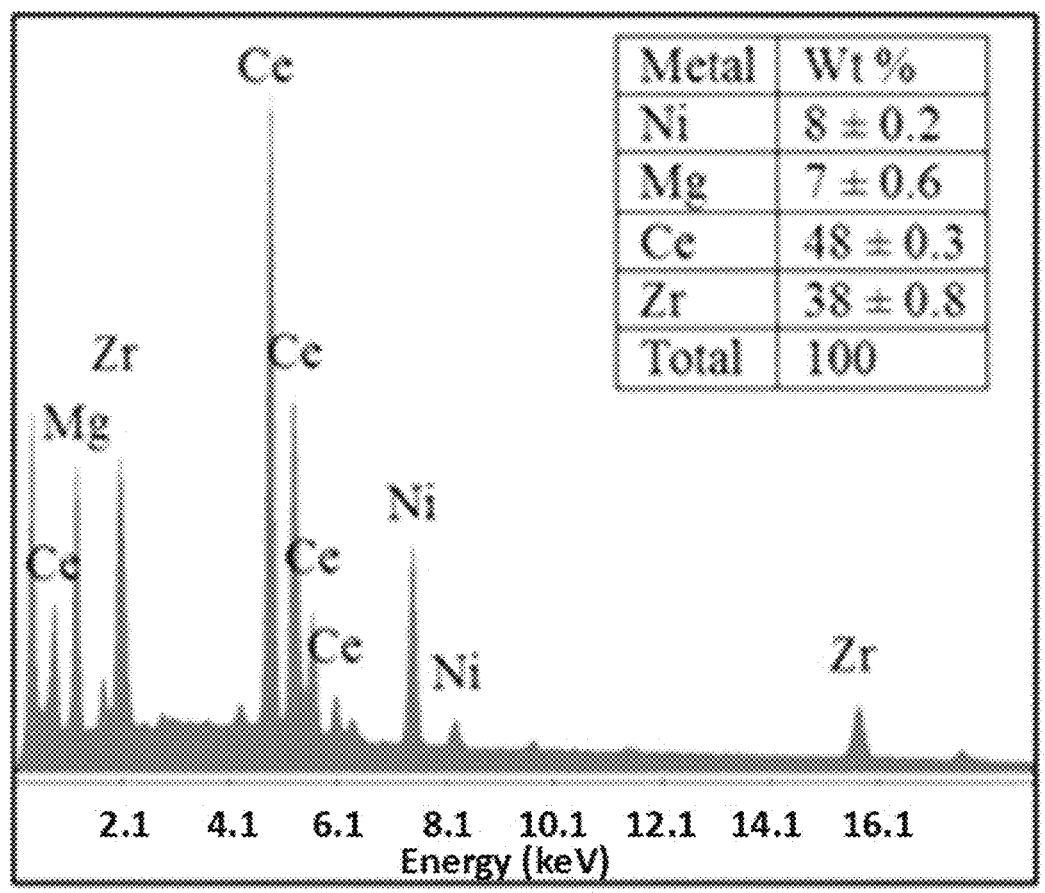
Figure 3C:
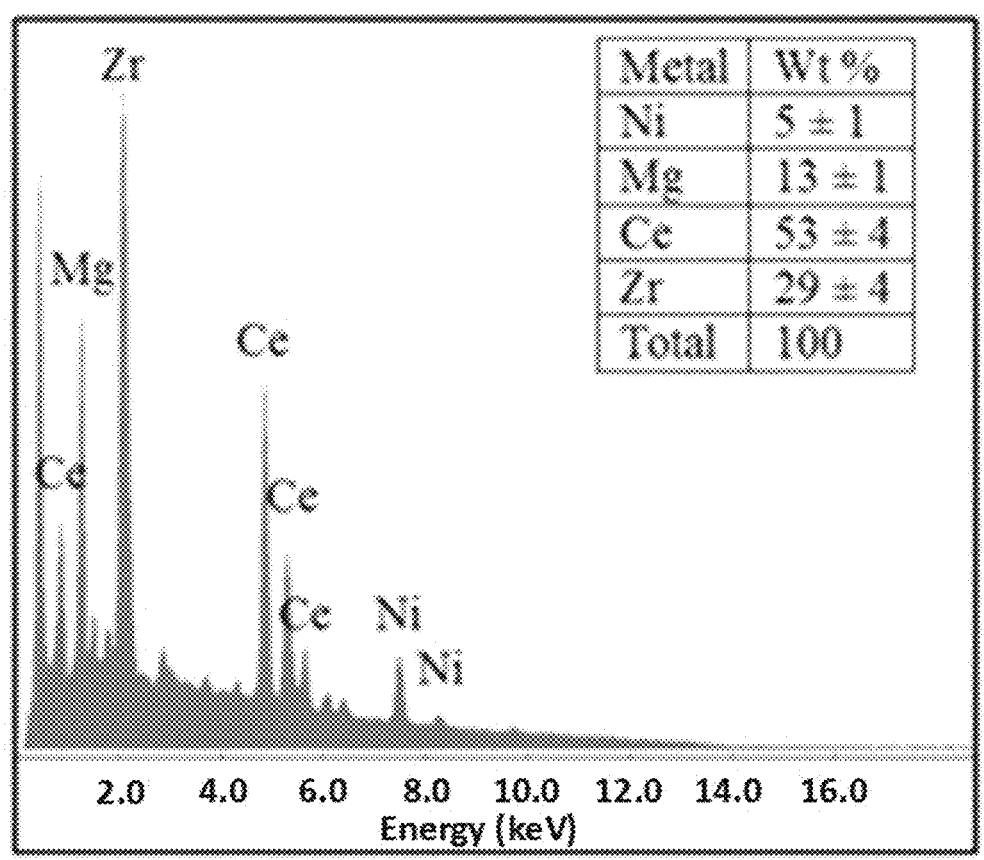
Figure 3D:
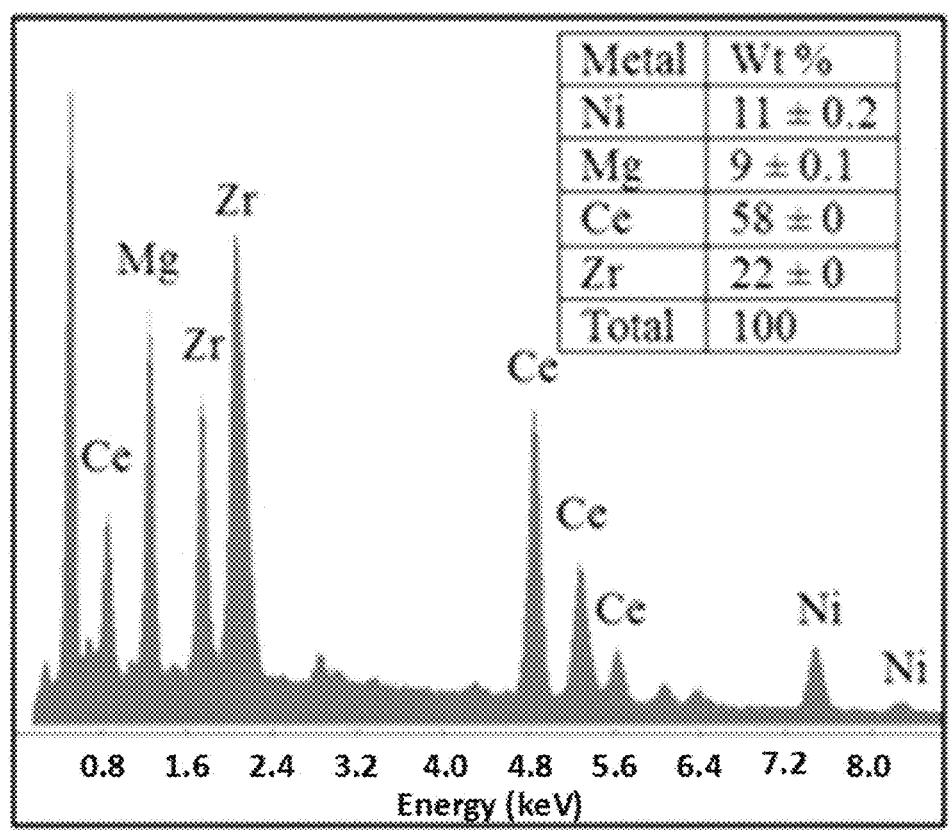
Figures 4A, 4B, 4C, 4D:
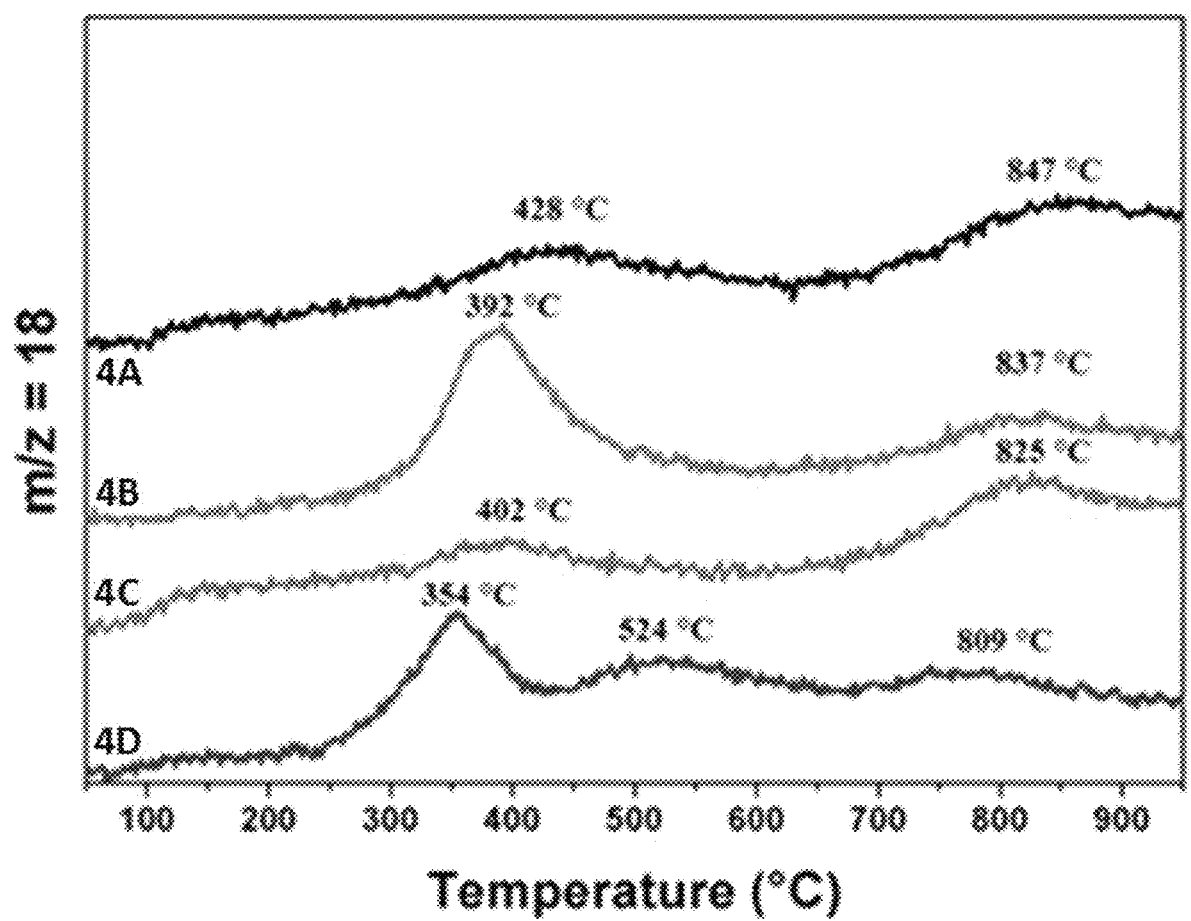
FIGS. 4A-4D show the TPR results of (FIG. 4A) fresh large.

In various aspects, methods of making extrudate catalysts are provided that are capable of producing extrudates that are stable at the elevated pressures (>1 bar) and temperatures (>600° C.) needed for the tri-reforming reactions. As an example, a $Ce_{0.6}Zr_{0.4}O_2$ supported NiMg catalyst extrudate is demonstrated capable of catalyzing tri-reforming reactions at elevated pressures and temperatures. Various extrudate catalysts are provided that can be prepared using the methods described herein, as well as methods for the conversion of methane into syngas using the extrudate catalysts.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "syngas" and "synthesis gas", as used interchangeably herein, refer to a gas mixture containing mostly hydrogen ($H_2$) gas and carbon monoxide (CO) gas and about 20 mol-%, 15 mol-%, 12 mol-%, 10 mol-%, 8 mol-%, 6 mol-%, 5 mol-%, or less of other components such as molecular oxygen ($O_2$), carbon dioxide ($CO_2$) gas, and gases of lower hydrocarbons. The syngas can have about 5 mol-%, 3 mol-%, 2 mol-%, 1 mol-%, or 0.5 mol-% of molecular oxygen. The syngas can have about 15 mol-%, 10 mol-%, 8 mol-%, 6 mol-%, 5 mol-%, 4 mol-%, 3 mol-%, 2 mol-%, or less of carbon dioxide.

Extrudate Catalysts and Methods of Making Thereof

A variety of mixed metal oxide extrudate catalyst are provided herein. The ability to make extrudate catalysts that are stable at high temperatures, pressures, and conditions exposed to in large scale reactors makes these extrudate catalyst particularly suited for commercial scale uses such as for the tri-reformation reactions described below.

In some aspects, the supported metal oxide extrudate catalysts is prepared by (a) ball milling a mixed metal oxide to produce a fine powder of about −400 mesh, −500 mesh, −550 mesh, −600 mesh, −625 mesh, −650 mesh, or smaller, (b) combining the powder with a binder and water to produce a mixture, wherein the mass ratio of the powder to the binder is about 10 to 90, about 10 to 30, about 12 to 28, or about 15 to 25 and the mass ratio of the powder to water is about 1 to 7, about 1 to 5, about 1.5 to 7, about 1.5 to 3.5, or about 1.5 to 2.5, (c) extruding the mixture through a die to produce a wet extrudate, (d) pressing the paste at a force of at least 4000 lbs.; and (e) drying and calcining the wet extrudate to produce the mixed metal oxide extrudate catalyst.

The methods can be used to make a variety of mixed metal oxide catalysts. For example, in some aspects the metal oxide includes a metal oxide catalyst such as nickel (Ni), magnesium (Mg), copper (Cu), iron (Fe), zinc (Zn), titanium (Ti), cobalt (Co), scandium (Sc), platinum (Pt), rhodium (Rh), yttrium (Y), lanthanum (La), gold (Au) and palladium (Pd). The metal oxide can be a mixed metal oxide. For example, mixed metal oxides can include any combination of two or more of the following metal oxides of Ni, Mg, Cu, Fe, Zn, Ti, Co, Sc, Pt, Rh, Y, La, Au, and Pd. In some aspects, the metal oxide is a nickel-magnesium oxide.

The mixed metal oxide catalysts can include a variety of support materials. For example, the support can include cerium (Ce), zirconium (Zr), silicon (Si), aluminum (Al), manganese (Mn), titanium (Ti), yttrium (Y), lanthanum (La), molybdenum (Mo), rhodium (Rh), gallium (Ga), tungsten (W) and barium (Ba). Also, mixed oxides such as Si—Al, spinels, etc. could be used as the support. In some aspects, the support is a cerium-zirconium oxide.

The extrudates can be made using a suitable binder. The binder can include guar gum, polyvinyl alcohol, magnesium stearate, carboxymethyl cellulose, phenolic resin, petroleum resin, bentonite clay, molasses, alumina, aluminate silicate, methyl cellulose, hydroxyethyl cellulose, polyvinyl acetate, vegetable hydrocolloid, polyvinyl butyal, acrylic polymer, animal protein, cellulose ether, polymethyl methacrylate, locust bean, gelatine, or a combination thereof. In some aspects, the binder is guar gum.

The methods can be used to make extrudates of varying sizes and shapes. For example, in some aspects the mixture is extruded through a die having a diameter of about 0.5 mm to 6 mm, about 1 mm to 4 mm, or about 1.5 mm to 3 mm.

The drying of the wet extrudate can be performed by heating the wet extrudate to a first elevated temperature of about 100° C. to 150° C. for a period of time of at least 2 hours, at least 3 hours, at least 4 hours, or more. The extrudate can also be calcined, for example by heating the wet extrudate to a second elevated temperature of about 400° C. to 600° C. at a rate of about 5° C./min to 20° C./min and maintaining the second elevated temperature for a period of at least 2 hours.

In some aspects, the mixed metal oxide catalyst extrudate is a $Ce_{0.6}Zr_{0.4}O_2$ supported NiMg catalyst extrudate. The $Ce_{0.6}Zr_{0.4}O_2$ supported NiMg catalyst extrudate can be prepared by a method including (a) preparing a ceria-zirconia solution comprising $Ce(NO_3)_3 \cdot 6H_2O$, $ZrO(NO_3)_2 \cdot xH_2O$, and water; (b) combing the ceria-zirconia solution and $NH_4OH$ to produce a precipitate; (c) drying and calcining the precipitate to produce a $Ce_{0.6}Zr_{0.4}O_2$; (d) forming a nickel-magnesium solution comprising $Ni(NO_3)_2 \cdot 6H_2O$ and $Mg(NO_3)_2 \cdot 6H_2O$ dissolved in water; (e) adding the nickel-magnesium solution to the $Ce_{0.6}Zr_{0.4}O_2$ to produce the $NiMg/Ce_{0.6}Zr_{0.4}O_2$; (f) ball milling the $NiMg/Ce_{0.6}Zr_{0.4}O_2$ to produce a $NiMg/Ce_{0.6}Zr_{0.4}O_2$ powder; (g) combing the $NiMg/Ce_{0.6}Zr_{0.4}O_2$ powder with a binder and water to produce a mixture; (h) extruding the mixture through a die to produce a wet extrudate; (i) pressing the paste at a force of at least 4000 lbs.; and (j) drying and calcining the wet extrudate to produce the $Ce_{0.6}Zr_{0.4}O_2$ supported NiMg catalyst extrudate. The mass ratio of the $Ce(NO_3)_3 \cdot 6H_2O$ to the $ZrO(NO_3)_2 xH_2O$ can be about 1 to 5, about 1.5 to 3.5, or about 1.5 to 2.5. In some aspects, where the $NiMg/Ce_{0.6}Zr_{0.4}O_2$ is available, the method can begin with the ball milling in step (f) or can begin with a powder of the $NiMg/Ce_{0.6}Zr_{0.4}O_2$ in step (g). In step (c) the drying can be performed by heating the precipitate to a first elevated temperature of about 110° C. to 130° C. for a period of time of at least 3, 4, 5, or 6 hours. In step (c) the calcining can be performed by heating the precipitate to a second elevated temperature of about 700° C. to 900° C. at a rate of about 5° C./min to 15° C./min and maintaining the second elevated temperature for a period of at least 2 hours. A mass ratio of $Ni(NO_3)_2 \cdot 6H_2O$ to $Mg(NO_3)_2 \cdot 6H_2O$ can be about 0.4 to 1.0. The $NiMg/Ce_{0.6}Zr_{0.4}O_2$ can be a fine powder, for example about a −400 mesh, −500 mesh, −550 mesh, −600 mesh, −625 mesh, or −650 mesh. A mass ratio of the $NiMg/Ce_{0.6}Zr_{0.4}O_2$ powder to the binder can be about 10 to 90 or about 10 to 30. A mass ratio of the $NiMg/Ce_{0.6}Zr_{0.4}O_2$ powder to the water can be about 1.5 to 7 or about 1.5 to 5. The binder can be guar gum. In some aspects, the die can have a diameter of about 1 mm to 4 mm. In step (j) the drying can be performed by heating the wet extrudate to a first elevated temperature of about 100° C. to 150° C. for a period of time of at least 2 hours. In step (j) the calcining is performed by heating the wet extrudate to a second elevated temperature of about 400° C. to 600° C. at a rate of about 5° C./min to 20° C./min and maintaining the second elevated temperature for a period of at least 2 hours.

The methods can be used to make a variety of mixed metal extrudate catalysts. The extrudates can be stable at pressures of about 1 bar to 30 bar, 1.5 bar to 30 bar, 2 bar to 30 bar, or about 2 bar to 20 bar and temperatures of about 600° C. to 1000° C., about 700° C. to 1000° C., about 800° C. to 1000° C., or about 800° C. to 950° C. The extrudate can have a surface area of about 112 $m^2/g$ to 30 $m^2/g$, about 18 $m^2/g$ to 30 $m^2/g$, about 20 $m^2/g$ to 35 $m^2/g$. The extrudate can have a pore volume of about 0.04 cc/g to 0.07 cc/g. The extrudate can have a pore size of about 90 Å to 180 Å.

Methods of Using Extrudate Catalysts

Methods of using the extrudate catalysts are also provided. The methods can include using the extrudate catalyst in a packed bed reactor, for example for a tri-reforming reaction of converting methane and methane rich gases into syngas.

In some aspects, a method of producing a syngas is provided. The methods can include contacting a reactant gas with a mixed metal oxide extrudate catalyst described herein at an elevated temperature and pressure to produce the syngas. In particular aspects, the extrudate catalyst is a $Ce_{0.6}Zr_{0.4}O_2$ supported NiMg catalyst extrudate. Elevated temperatures for the reaction can include above 600° C., above 650° C., above 700° C., above 750° C., or above 800° C. and up to about 1000° C. The reactant gas can include $CO_2$, $CH_4$, $O_2$, air, and steam. The methods can be used to yield a $CH_4$ conversion percentage of about 85% to 100%, about 90% to 100%, about 90% to 99%, or about 95% to 99% for a ratio of the $H_2O$ to the $CH_4$ in the reactant gas of about 0.2 to 1.2. The methods can be used to yield a $CO_2$ conversion percentage of about 20% to 60% for a ratio of the $H_2O$ to the $CH_4$ in the reactant gas of about 0.2 to 1.2. A molar ratio of $H_2$ to CO present in the syngas can be about 1.0 to 3.0 for a ratio of the $H_2O$ to the $CH_4$ in the reactant gas of about 0.2 to 1.2. The methods can be used at high flow rates, e.g. the reactant gas can have a gas hourly space velocity of about 1,000 $h^{-1}$ to 100,000 $h^{-1}$, about 15,000 $h^{-1}$ to 100,000 $h^{-1}$ or about 20,000 $h^{-1}$ to 100,000 $h^{-1}$. The coking rate of the extrudate catalyst can be about $2.2 \times 10^{-4}$ $g/(g_{cat}*h)$ or less, about $1.0 \times 10^{-4}$ $g/(g_{cat}*h)$ or less, about $1.0 \times 10^{-5}$ $g/(g_{cat}*h)$ or less, or about $1.0 \times 10^{-6}$ $g/(g_{cat}*h)$ or less.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Trials for Extrudate Catalyst Synthesis

TABLE 1

A summary of trials for extrudate catalyst synthesis

| Trial # | Method | Note |
|---|---|---|
| 1 | $NiMg/Ce_{0.6}Zr_{0.4}O_2/Al_2O_3$ pellets with more water (the mass ratio of water to $Al_2O_3$ was higher than ~ 0.5) | The $NiMg/Ce_{0.6}Zr_{0.4}O_2/Al_2O_3$ solution could not be completely adsorbed by the $Al_2O_3$ pellets; unable to achieve desired metal loading |

TABLE 1-continued

A summary of trials for extrudate catalyst synthesis

| Trial # | Method | Note |
|---|---|---|
| 2 | NiMg/$Ce_{0.6}Zr_{0.4}O_2$/$Al_2O_3$ pellets with suitable amount of water (the mass ratio of water to $Al_2O_3$ was in the range of 0.2 - 0.5) | The doping of metals on the $Al_2O_3$ pellets was not uniform; significantly higher volume of catalyst needed to achieve desired conversions leading to lower space velocities and low catalytic performance during biogas tri-reforming |
| 3 | $Ce_{0.6}Zr_{0.4}O_2$ extrudates obtained from wet hydroxide slurry | The $Ce_{0.6}Zr_{0.4}O_2$ extrudates were very brittle (being brittle means it is unable to load the catalyst in the reactor while maintaining its shape); the void spaces created by the water, nitrates, ammonia, etc. led to delicate extrudates unable to maintain physical shape |
| 4 | $Ce_{0.6}Zr_{0.4}O_2$ extrudates obtained from dry hydroxide slurry | The obtained dry $Ce_{0.6}Zr_{0.4}O_2$ extrudates were not brittle, but the volume decreased; upon calcination the extrudates became brittle |
| 5 | $Ce_{0.6}Zr_{0.4}O_2$ extrudates without ball milling | The $Ce_{0.6}Zr_{0.4}O_2$ extrudates were brittle |
| 6 | $Ce_{0.6}Zr_{0.4}O_2$ extrudates without adding binder | The $Ce_{0.6}Zr_{0.4}O_2$ extrudates were not brittle; adding binder can provide mechanical strength and physical integrity for holding the powders together |
| 7 | $Ce_{0.6}Zr_{0.4}O_2$ extrudates with more water (the mass ratio of water to $Ce_{0.6}Zr_{0.4}O_2$ was higher than ~ 0.7) | The extruded $Ce_{0.6}Zr_{0.4}O_2$ extrudates adjoined to each other and were not able to be separate without damage to shape; the volume of $Ce_{0.6}Zr_{0.4}O_2$ extrudates decreased after drying and calcination; the surface on the $Ce_{0.6}Zr_{0.4}O_2$ extrudates was rough with large pores |
| 8 | $Ce_{0.6}Zr_{0.4}O_2$ extrudates with less water (the mass ratio of water to $Ce_{0.6}Zr_{0.4}O_2$ was lower than ~ 0.1) | The mixture of $Ce_{0.6}Zr_{0.4}O_2$ powders, guar gum and water could not be extruded out |
| 9 | $Ce_{0.6}Zr_{0.4}O_2$ extrudates with suitable amount of water (the mass ratio of water to $Ce_{0.6}Zr_{0.4}O_2$ was in the range of 0.1-0.7) | The $Ce_{0.6}Zr_{0.4}O_2$ extrudates were not brittle with consistent shape and physical integrity |
| 10 | NiMg/$Ce_{0.6}Zr_{0.4}O_2$ extrudates with doping NiMg solution on extrudates | The water in the NiMg solution caused the $Ce_{0.6}Zr_{0.4}O_2$ extrudates to breakdown; the NiMg/$Ce_{0.6}Zr_{0.4}O_2$ was not in the extrudate form after calcination |
| 11 | NiMg/$Ce_{0.6}Zr_{0.4}O_2$ extrudates with doping NiMg solution on powders | The NiMg solution caused the aggregation of some $Ce_{0.6}Zr_{0.4}O_2$ powders into clumps |
| 12 | NiMg/$Ce_{0.6}Zr_{0.4}O_2$ extrudates without ball milling | The NiMg/$Ce_{0.6}Zr_{0.4}O_2$ extrudates were brittle |
| 13 | NiMg/$Ce_{0.6}Zr_{0.4}O_2$ extrudates without adding binder | The NiMg/$Ce_{0.6}Zr_{0.4}O_2$ extrudates were not brittle able to maintain physical integrity during conditions seen in packed bed reactor |
| 14 | NiMg/$Ce_{0.6}Zr_{0.4}O_2$ extrudates with more water (the mass ratio of water to NiMg/$Ce_{0.6}Zr_{0.4}O_2$ was higher than ~ 0.7) | The extruded NiMg/$Ce_{0.6}Zr_{0.4}O_2$ extrudates adjoined to each other together making them unable to be separated without damage to shape |
| 15 | NiMg/$Ce_{0.6}Zr_{0.4}O_2$ extrudates with less water (the mass ratio of water to NiMg/$Ce_{0.6}Zr_{0.4}O_2$ was lower than ~ 0.1) | The mixture of NiMg/$Ce_{0.6}Zr_{0.4}O_2$ powders, gum guar and water could not be extruded out |
| 16 | NiMg/$Ce_{0.6}Zr_{0.4}O_2$ extrudates with suitable amount of water (the mass ratio of water to NiMg/$Ce_{0.6}Zr_{0.4}O_2$ was in the range of 0.1-0.7) | The NiMg/$Ce_{0.6}Zr_{0.4}O_2$ extrudates were not brittle with consistent shape and physical integrity |
| 17 | NiMg/$Ce_{0.6}Zr_{0.4}O_2$ extrudates with smaller diameter (R = 0.75 mm) | The NiMg/$Ce_{0.6}Zr_{0.4}O_2$ extrudates were not brittle with consistent shape and physical integrity; the smaller size improves the internal mass transfer and catalytic performance during the biogas tri-reforming |

TABLE 2

The $N_2$ adsorption-desorption analysis of extrudate catalysts

| Catalyst | BET surface area ($m^2g^{-1}$) | BJH pore volume ($cm^3/g$) | BJH average pore diameter (Å) |
|---|---|---|---|
| NiMg/$Ce_{0.6}Zr_{0.4}O_2$ extrudate (R = 1.59 mm) | 16 | 0.04 | 96 |
| NiMg/$Ce_{0.6}Zr_{0.4}O_2$ extrudate (R = 1.59 mm, bad sample obtained from trial #12 | 27 | 0.06 | 124 |
| NiMg/$Ce_{0.6}Zr_{0.4}O_2$ extrudate (R = 0.75 mm) | 22 | 0.07 | 176 |

TABLE 3

Mechanical/physical properties of extrudate catalysts testing

| Property | Method |
|---|---|
| Micro-hardness | Using a Hysitron TriboIndenter device |
| Bulk crush strength | ASTM D7084 |
| Attrition and abrasion | ASTM D4058 |
| Single pellet crush strength | ASTM D4179 and ASTM D6175 |
| Rapid crush strength | ASTM D6175 |
| Stability during thermal cycling | — |

Trial #1: NiMg/$Ce_{0.6}Zr_{0.4}O_2$/$Al_2O_3$ Pellets with More Water (the Mass Ratio of Water to $Al_2O_3$ was Higher than ~0.5)

$Al_2O_3$ pellets were directly purchased from a company (Alfa Aesar). The NiMg/$Ce_{0.6}Zr_{0.4}O_2$ solution was doped on the $Al_2O_3$ pellets. It is difficult to obtain the NiMg/$Ce_{0.6}Zr_{0.4}O_2$/$Al_2O_3$ pellets with uniform doping of metals. When more water (the mass ratio of water to $Al_2O_3$ was higher than ~0.5) was used to form the NiMg/$Ce_{0.6}Zr_{0.4}O_2$ solution, the solution could not be completely adsorbed by the $Al_2O_3$ pellets. Metals loaded would flake from the pellets with poor attrition properties.

Trial #2: NiMg/$Ce_{0.6}Zr_{0.4}O_2$/$Al_2O_3$ Pellets with Suitable Amount of Water (the Mass Ratio of Water to $Al_2O_3$ was in the Range of 0.2-0.5)

$Al_2O_3$ pellets were directly purchased from a company (Alfa Aesar) and the NiMg/$Ce_{0.6}Zr_{0.4}O_2$ solution was doped on the $Al_2O_3$ pellets. When a suitable amount of water (the mass ratio of water to $Al_2O_3$ was in the range of 0.2-0.5) was used to form the NiMg/$Ce_{0.6}Zr_{0.4}O_2$ solution, the solution could be completely adsorbed by the $Al_2O_3$ pellets. However, the doping of metals on the pellets was not uniform (some pellets showed variations in metal loading patterns visible by the grey and yellow descolorations). More importantly, the use of the NiMg/$Ce_{0.6}Zr_{0.4}O_2$/$Al_2O_3$ pellet catalyst in the tri-reforming reactor leads to an increase in catalyst volume needed to achieved desired conversions leading to low gas hourly space velocity requirements and poor catalytic performance. In addition, the size of the catalyst yielded internal mass transfer limitations with an effectiveness factor approximated as 0.05.

Trial #3: $Ce_{0.6}Zr_{0.4}O_2$ Extrudates Obtained from Wet Hydroxide Slurry

The wet Ce/Zr hydroxide slurry was obtained through the mixture of Ceria and Zirconia salt solution and ammonia solution. A plastic syringe was used to extrude the $Ce_{0.6}Zr_{0.4}O_2$ slurry to $Ce_{0.6}Zr_{0.4}O_2$ extrudates. After drying and calcination, the $Ce_{0.6}Zr_{0.4}O_2$ extrudates did not maintain their shape and fractured upon movement or touch. During the drying/calcination process, the void spaces created by the water, nitrates, ammonia, etc. led to the extrudates that could not maintain their shape under normal catalyst loading and reaction conditions. The $Ce_{0.6}Zr_{0.4}O_2$ extrudates would break upon the slightest touch.

Trial #4: $Ce_{0.6}Zr_{0.4}O_2$ Extrudates Obtained from Dried Hydroxide Slurry

The wet Ce/Zr hydroxide slurry was dried in a vacuum at 60° C. for 14 h to obtain a dry Ce/Zr hydroxide slurry. A pestle and mortar were used to crush the dry Ce/Zr hydroxide slurry. Suitable amounts of guar gum and water were added into the dry Ce/Zr hydroxide slurry and mixed. Guar gum is comprised of polysaccharides that do not introduce metal impurities such as Al and Si to the catalyst after calcination. The mixture was extruded and dried in a vacuum at 106° C. for 6 h. The extrudates changed to a black color but were not brittle while the volume of extrudates decreased. This is due to the evaporation of water, ammonia, and shrinking of the crystallite lattice. Finally, the Ce/Zr hydroxide were calcined at 800° C. for 4 h, the obtained extrudates were yellow in color and brittle to the touch due to significant formation of void spaces.

Trial #5: $Ce_{0.6}Zr_{0.4}O_2$ Extrudates Without Ball Milling

The $Ce_{0.6}Zr_{0.4}O_2$ intermediate was obtained after drying and calcination. The $Ce_{0.6}Zr_{0.4}O_2$ intermediate consists of large, bulky particles. A pestle and mortar was used to crush the $Ce_{0.6}Zr_{0.4}O_2$ intermediate into small particles for extrusion. However, the extruded $Ce_{0.6}Zr_{0.4}O_2$ extrudates were soft and became brittle after drying and calcination. The $Ce_{0.6}Zr_{0.4}O_2$ extrudates were not suitable for use in commercial scale reactors and would break upon the slightest touch.

Trial #6: $Ce_{0.6}Zr_{0.4}O_2$ Extrudates Without Adding Binder

The $Ce_{0.6}Zr_{0.4}O_2$ intermediate obtained after drying and calcination was ball milled using a Planetary Mono Mill. The milled $Ce_{0.6}Zr_{0.4}O_2$ powders were mixed with a suitable amount of water (the mass ratio of water to $Ce_{0.6}Zr_{0.4}O_2$ was in the range of 0.1-0.7). Adding binder (e.g. guar gum) would provide mechanical strength and physical integrity to hold the powders together. In this trial, no binder was added. The mixture was extruded to obtain $Ce_{0.6}Zr_{0.4}O_2$ extrudates. After drying and calcination, the obtained $Ce_{0.6}Zr_{0.4}O_2$ extrudates were not brittle thus maintaining their physical integrity. The addition of binder however is helpful to improve the mechanical strength and physical integrity of the extrudate catalysts.

Trial #7: $Ce_{0.6}Zr_{0.4}O_2$ Extrudates with More Water (the Mass Ratio of Water to $Ce_{0.6}Zr_{0.4}O_2$ was Higher Than ~0.7)

The $Ce_{0.6}Zr_{0.4}O_2$ intermediate obtained after drying and calcination was ball milled using a Planetary Mono Mill. The milled $Ce_{0.6}Zr_{0.4}O_2$ powders were mixed with guar gum and water. When more water (the mass ratio of water to $Ce_{0.6}Zr_{0.4}O_2$ was higher than ~0.7) was used, the extruded $Ce_{0.6}Zr_{0.4}O_2$ extrudates adjoined to each other and it was not easy to separate them without damage. After drying and calcination, the volume of the $Ce_{0.6}Zr_{0.4}O_2$ extrudates decreased. This is due to the evaporation of water, nitrates, etc. The surface on the $Ce_{0.6}Zr_{0.4}O_2$ extrudates was rough with large pores.

Trial #8: $Ce_{0.6}Zr_{0.4}O_2$ Extrudates with Less Water (the Mass Ratio of Water to $Ce_{0.6}Zr_{0.4}O_2$ was Lower Than ~0.1)

The $Ce_{0.6}Zr_{0.4}O_2$ intermediate obtained after drying and calcination was ball milled using a Planetary Mono Mill. The milled $Ce_{0.6}Zr_{0.4}O_2$ powders were mixed with guar gum and water. When less water (the mass ratio of water to $Ce_{0.6}Zr_{0.4}O_2$ was lower than ~0.1) was used, the combine powders mixture could not be extruded.

Trial #9: $Ce_{0.6}Zr_{0.4}O_2$ Extrudates with Suitable Amount of Water (the Mass Ratio of Water to $Ce_{0.6}Zr_{0.4}O_2$ was in the Range of 0.1-0.7)

The $Ce_{0.6}Zr_{0.4}O_2$ intermediate obtained after drying and calcination was ball milled using a Planetary Mono Mill. The milled $Ce_{0.6}Zr_{0.4}O_2$ powders were mixed with guar gum and water. When a suitable amount of water (the mass ratio of water to $Ce_{0.6}Zr_{0.4}O_2$ was in the range of 0.1-0.7) was used, the mixture could be extruded. After drying and calcination, the $Ce_{0.6}Zr_{0.4}O_2$ extrudates were not brittle with consistent shape and physical integrity. The $Ce_{0.6}Zr_{0.4}O_2$ extrudates obtained with and without the addition of guar gum were both not brittle. From a simple surface observation, the $Ce_{0.6}Zr_{0.4}O_2$ extrudates obtained with adding guar gum were more consistent than those obtained without adding gum guar. However, more characterization analysis needs to be carried out to study the effect of adding a binder (e.g. guar gum) on the extrudate properties. Based on above observations, ball milling the $Ce_{0.6}Zr_{0.4}O_2$ into fine powders and controlling the water content are two significant factors to obtain $Ce_{0.6}Zr_{0.4}O_2$ extrudates with consistent shape and physical integrity.

Trial #10: $NiMg/Ce_{0.6}Zr_{0.4}O_2$ Extrudates with Doping NiMg Solution on Extrudates The NiMg salt solution was doped on stable $Ce_{0.6}Zr_{0.4}O_2$ extrudates. However, the water in the NiMg solution caused the breakdown of extrudates. After drying and calcination, the $NiMg/Ce_{0.6}Zr_{0.4}O_2$ were no longer in the extrudate form.

Trial #11: $NiMg/Ce_{0.6}Zr_{0.4}O_2$ Extrudates with Doping NiMg Solution on Powders The NiMg salt solution was doped on the $Ce_{0.6}Zr_{0.4}O_2$ powders that were already ball milled. However, the water in the NiMg solution caused an aggregation of the powders. The obtained $NiMg/Ce_{0.6}Zr_{0.4}O_2$ would need to be ball milled again in order to extrude extrudates with desired physical properties.

Trial #12: $NiMg/Ce_{0.6}Zr_{0.4}O_2$ Extrudates Without Ball Milling

A pestle and mortar was used to crush the $NiMg/Ce_{0.6}Zr_{0.4}O_2$ intermediate into small particles for extrusion. The extrudate $NiMg/Ce_{0.6}Zr_{0.4}O_2$ were brittle after drying and calcination.

Trial #13: $NiMg/Ce_{0.6}Zr_{0.4}O_2$ Extrudates Without Adding Binder

The NiMg salt solution was doped on the $Ce_{0.6}Zr_{0.4}O_2$ intermediate dropwise and then the mixture was dried and calcined to obtain $NiMg/Ce_{0.6}Zr_{0.4}O_2$. The $NiMg/Ce_{0.6}Zr_{0.4}O_2$ was ball milled to obtain fine $NiMg/Ce_{0.6}Zr_{0.4}O_2$ powders. The milled $NiMg/Ce_{0.6}Zr_{0.4}O_2$ powders were mixed with a suitable amount of water (the mass ratio of water to $NiMg/Ce_{0.6}Zr_{0.4}O_2$ was in the range of 0.1-0.7). The mixture was extruded, dried and calcined. The obtained $NiMg/Ce_{0.6}Zr_{0.4}O_2$ extrudates showed good physical characteristics capable of withstanding commercial scale reactor conditions.

Trial #14: $NiMg/Ce_{0.6}Zr_{0.4}O_2$ Extrudates with More Water (the Mass Ratio of Water to $NiMg/Ce_{0.6}Zr_{0.4}O_2$ was Higher Than ~0.7)

The ball milled fine $NiMg/Ce_{0.6}Zr_{0.4}O_2$ powders were mixed with guar gum and water. When more water (the mass ratio of water to $NiMg/Ce_{0.6}Zr_{0.4}O_2$ was higher than ~0.7) was used, the extruded $NiMg/Ce_{0.6}Zr_{0.4}O_2$ extrudates adjoined each other and were not able to be separate them without damage.

Trial #15: $NiMg/Ce_{0.6}Zr_{0.4}O_2$ Extrudates with Less Water (the Mass Ratio of Water to $NiMg/Ce_{0.6}Zr_{0.4}O_2$ was Lower Than ~0.1)

The ball milled fine $NiMg/Ce_{0.6}Zr_{0.4}O_2$ powders were mixed with guar gum and water. When less water (the mass ratio of water to $NiMg/Ce_{0.6}Zr_{0.4}O_2$ was lower than ~0.1) was used, the powder mixture could not be extruded.

Trial #16: $NiMg/Ce_{0.6}Zr_{0.4}O_2$ Extrudate with Suitable Amount of Water (the Mass Ratio of Water to $NiMg/Ce_{0.6}Zr_{0.4}O_2$ was in the Range of 0.1-0.7)

The ball milled $NiMg/Ce_{0.6}Zr_{0.4}O_2$ powders were mixed with guar gum and water. When a suitable amount of water (the mass ratio of water to $NiMg/Ce_{0.6}Zr_{0.4}O_2$ was in the range of 0.1-0.7) was used, the mixture could be effectively extruded. After drying and calcination, the $NiMg/Ce_{0.6}Zr_{0.4}O_2$ extrudates were showed good physical characteristics capable of withstanding commercial scale reactor conditions. The $NiMg/Ce_{0.6}Zr_{0.4}O_2$ extrudates obtained with and without adding guar gum were not brittle. From a simple surface observation, the $Ce_{0.6}Zr_{0.4}O_2$ extrudates obtained with adding guar gum were more consistent than those obtained without adding gum guar. However, more characterization analysis needs to be carried out to study the effect of adding a binder (e.g. guar gum) on the extrudate properties.

Trial #17: $NiMg/Ce_{0.6}Zr_{0.4}O_2$ Extrudates with Smaller Diameter (R=0.75 mm)

The ball milled $NiMg/Ce_{0.6}Zr_{0.4}O_2$ powders were mixed with guar gum and a suitable amount of water (the mass ratio of water to $NiMg/Ce_{0.6}Zr_{0.4}O_2$ was in the range of 0.1-0.7). The mixture was extruded using a press die of a smaller size (inside diameter was 1.5 mm). After drying and calcination, the $NiMg/Ce_{0.6}Zr_{0.4}O_2$ extrudates showed good physical characteristics capable of withstanding commercial scale reactor. The smaller size of the $NiMg/Ce_{0.6}Zr_{0.4}O_2$ extru-

Example 2: NiMg/Ceria-Zirconia Cylindrical Pellet Catalysts for Tri-Reforming of Surrogate Biogas

Experimental Section

Catalyst Preparation

NiMg/$Ce_{0.6}Zr_{0.4}O_2$ powder catalyst used for the pelletization was synthesized using a co-precipitation method (to prepare $Ce_{0.6}Zr_{0.4}O_2$ support) and then a wet impregnation method (to load Ni and Mg to the support). $Ce(NO_3)_3 \cdot 6H_2O$ (30.1 g; 99.5% pure; Alfa Aesar) was dissolved in about 116 g of deionized (DI) water. In a separate beaker, 10.7 g of dried $ZrO(NO_3)_2$ derived from $ZrO(NO_3)_2 \cdot xH_2O$ (99.9% pure; Alfa Aesar) was added to about 116 g of DI water. Both solutions were mixed together and stirred for 30 min to obtain a homogeneous solution. $NH_4OH$ (70 mL; $NH_3$ assay: 28-30%; VWR International, LLC) was then added to the above solution with constant stirring. The mixture was transferred to a vacuum flask and filtered to remove excess liquid. The precipitate was vacuum filtered again with 300 mL of $NH_4OH$ (0.25 M). The final precipitate was dried in a furnace at 120° C. for 12 h and then calcined at 800° C. for 4 h using a ramp rate of 10° C./min to form $Ce_{0.6}Zr_{0.4}O_2$.

Nickel and magnesium were then loaded on the $Ce_{0.6}Zr_{0.4}O_2$ after it cooled down. $Ni(NO_3)_2 \cdot 6H_2O$ (8.3 g; 99.9985% pure; Alfa Aesar) and $Mg(NO_3)_2 \cdot 6H_2O$ (17.7 g; 99.97% pure; Alfa Aesar) were dissolved in about 9.9 g of DI water, which was then added drop-wise to the $Ce_{0.6}Zr_{0.4}O_2$. The mass percentages of Ni and Mg were both 8% based on the total mass of NiMg/$Ce_{0.6}Zr_{0.4}O_2$. The NiMg/$Ce_{0.6}Zr_{0.4}O_2$ dried at 120° C. for 2 h and calcined at 500° C. for 4 h at 10° C./min.

The NiMg/$Ce_{0.6}Zr_{0.4}O_2$ was then ball milled for 60 min at a speed of 300 rpm using a Planetary Mono Mill "Pulverisette 6" (Fritsch). The milled powder was mixed with gum guar (#G4129, Sigma-Aldrich, Co.) and DI water with a mass ratio of 12:0.57:3.33. The mixture was extruded using a Bench Top Auto Press (Carver, Inc.) at a speed of 15% and a force of 5000 lb (2268 kg). Two press dies with different inside diameter sizes (3.18 mm and 1.50 mm) were made to shape the catalysts. The extruded pellets were dried at 106° C. in a vacuum oven overnight and then calcined at 800° C. in air for 4 h with a ramp rate of 5° C./min. Extruded NiMg/$Ce_{0.6}Zr_{0.4}O_2$ pellet catalysts with two different radii were obtained. The cylindrical NiMg/$Ce_{0.6}Zr_{0.4}O_2$ pellet catalyst with radius of 1.59 mm and length of 7.0 mm is referred to as the large catalyst in this study. The cylindrical NiMg/$Ce_{0.6}Zr_{0.4}O_2$ pellet catalysts with radius of 0.75 mm and length of 2.0 mm is referred to as small catalyst in this study. Prior to the successful synthesis of consistent sized and attrition resistant catalyst pellets, a number of trials failed in the past. For example, the raw NiMg/$Ce_{0.6}Zr_{0.4}O_2$ powder diameters were too large and needed to be ball milled to reduce the particle size suitable for extrusion. This step plays a role in the durability of the extruded pellets. Adding binder (e.g. gum guar) also provides mechanical strength and physical integrity for holding the NiMg/$Ce_{0.6}Zr_{0.4}O_2$ powders together. When NiMg/$Ce_{0.6}Zr_{0.4}O_2$ powders were directly extruded without adding binder, the obtained pellets were too delicate and brittle for commercial use. The water content plays a significant role in the extruding process. If the water content is too low, it is difficult to obtain a heterogeneous mixture of the NiMg/$Ce_{0.6}Zr_{0.4}O_2$ powders that can be extruded out through the die press; however, if the water content is too high, the extruded NiMg/$Ce_{0.6}Zr_{0.4}O_2$ pellets tend to stick together making it difficult to separate the individual pellets without sacrificing their structural integrity.

Catalyst Characterization

Both fresh and used tri-reforming catalysts were characterized through the use of X-ray Diffractometer (XRD), scanning electron microscope (SEM), energy dispersive spectroscopy (EDS), $N_2$ adsorption-desorption analyzer, temperature programmed reduction (TPR), and Diffuse Reflectance Infrared Fourier transform spectroscopy (DRIFTS). The crystalline structure of the catalysts was determined using XRD (Bruker AXS) at 40 mA and 40 kV. The XRD pattern was scanned from 5° to 90° (2θ) with Cu Kα radiation and a Lynxeye detector.

The surface morphology of the catalysts was observed using a Hitachi S-800 scanning electron microscope. Prior to tests, the catalysts were coated with gold-palladium using a Denton Vacuum desk II sputter coater. Elemental composition of the catalysts was determined using an Ametek Energy Dispersive X-ray Spectroscopy and based on the average of two different spots on the catalyst sample.

The $N_2$ adsorption-desorption measurement of catalysts was carried out on a Quantachrome Autosorb-iQ. A suitable amount of the sample was first outgassed at 200° C. overnight before being loaded into an analysis station. The specific surface area was determined using Brunauer-Emmett-Teller (BET) in the $P/P_0$ range of 0.05-0.30. The average pore size and the pore volume were calculated using the Barret-Joyner-Halenda (BJH) method.

TPR was preformed using a Cirrus MKS mass spectrometer (MS) connected in-line with a reactor containing a suitable amount of catalyst. The catalysts were pretreated under helium at 50 sccm at 110° C. for 30 min then cooled to 50° C. The gas mix was switched to 5% $H_2$/He (total: 50 sccm) and the catalysts were heated at a ramp rate of 10° C./min to 950° C. holding for 30 min.

The surface acidity and basicity of both the fresh and used catalysts were tested through DRIFTS using a Nicolet IS50 spectrometer equipped with a reactor cell from Harrick Scientific. The catalysts were placed in the sample cup within the reactor and DRIFTS experiments were conducted. Prior to any DRIFTS analysis, all the samples were activated in the reactor cell under an argon flow of 40 sccm while being heated to 250° C. at a ramp rate of 2° C./min in order to remove any surface adsorbed gases on the catalyst. Fresh catalysts were also reduced utilizing the TPR experiments described above before loading to the DRIFTS cell. Once the reduced catalysts were placed in the DRIFTS reactor cell, they were activated under argon as described above along with an additional presence of hydrogen (4 sccm) during (100° C.-200° C.). All the activated samples were treated under flow of either pyridine or carbon dioxide along with argon as the carrier gas for probing the different surface acidic and basic sites. A flow of 2.5 sccm of argon was passed through a pyridine bubbler for 15 min. A flow of 40 sccm pure argon was used to flush excess pyridine in the reactor for 20 min. A temperature-programmed desorption (TPD) experiment was subsequently ensued with the spectra being taken at 30° C., 100° C., and 200° C. Similarly during probing with $CO_2$, 5 sccm of $CO_2$ was flown over the activated catalysts for 10 min. Excess $CO_2$ was flushed out by flowing 40 sccm of argon for 30 min. TPD was then performed with spectra taken at 30° C., 100° C., and 200° C. All the TPD spectra were taken at a resolution of 2 providing a data spacing of 0.241 cm$^{-1}$ and comprised of 150 scans. Gases were of ultra-high purity grade (UHP) obtained from AIRGAS.

The coking rate of used catalysts was determined through temperature-programmed oxidation (TPO). Flow rates of $O_2$=2.5 sccm and He=47.5 sccm were used to oxidize the catalysts and combust coke to $CO_2$. The catalysts were heated at 10° C./min from 23° C. to 700° C. and held for 1 h until the $CO_2$ signal had returned to baseline values. The concentrations of effluent gases were measured by MS (Cirrus MKS) using calibration curves. The $CO_2$ concentration profile was converted to a molar flow rate assuming an ideal gas and that the standard volumetric flow rate was the same as the feed (C+$O_2$=>$CO_2$) and then numerically integrating as a function of time using the trapezoidal rule to estimate the amount (moles) of carbon. This value was subsequently converted to mass of carbon and divided by catalyst mass and time-on-stream to obtain the average coke formation rate.

Tri-Reforming

Tri-reforming tests were run at 3 bar (standard deviation: 0.14 bar) in a bench scale fixed-bed reactor[16], where catalyst (2.9 g) was loaded between layers of SiC support to hold the catalyst bed in place. The reactor tube (inside diameter: 15.7 mm) was made of seamless nickel alloy pipe 625, due to its corrosion resistance, exceptional fatigue strength, oxidation resistance, and high temperature durability (up to 982° C.). Between upstream gauges and the downstream regulator, pressure drop across the bed was not observed (within 0.14 bar). A thermocouple was inserted roughly halfway into the catalyst bed. All gases including $CH_4$ (chemically pure grade), $CO_2$ (industrial grade), air (dry grade), $N_2$ (ultra-high purity) and $H_2$ (ultra-high purity) were purchased from Airgas, Inc. Gas flow rates were adjusted using mass flow controllers purchased from Brooks Instrument (Hatfield, Pa., USA) and Alicat Scientific, Inc, (Tucson, Ariz., USA), Feed ($CO_2$, $CH_4$ and air) and product gases ($H_2$ and CO) were analyzed using a Gas chromatography-mass spectrometer (GC-MS, GC: 6890N, MS: 5975C, Agilent Technologies). Nitrogen was used as an internal standard gas. Reactant lines were heated to approximately 120° C. using heating tapes to prevent the condensation of steam. A LC-10 AS pump was used to deliver DI water to a steam generator for the formation of steam.

Biogas composition (i.e., $CO_2$/$CH_4$ molar ratio) can vary roughly from 1/1 to 1/3, with a typical value approaching 1/1 and this justified the selection of 1/1.4 for this study. In order to obtain the $H_2$/CO molar ratio close to 2:1, different oxidants are needed and the effects of four different inlet $H_2O$/$CH_4$ molar ratios (0.35, 0.71, 0.91, and 1.16) on the reactant conversions and $H_2$/CO molar ratios were studied with the other molar ratios fixed to minimize the parameter space. The molar flow rate of steam was previously determined through blank experiments by controlling the steam generator temperature. Catalysts were first reduced at 860° C. for 1.0 h in a 10% $H_2$/$N_2$ ($N_2$=450 sccm; $H_2$=50 sccm). After reduction, surrogate gases ($CO_2$, $CH_4$, air, and steam) were introduced to the reactor. The molar ratio of $CH_4$/$CO_2$/air was 1.0:0.7:0.95. The GHSV varied between 20,300 and 25,800 h$^{-1}$, based on different steam molar flow rates. During preliminary tri-reforming tests over the large catalyst at 36,300 h$^{-1}$ (other conditions were the same), $CH_4$ conversion, $CO_2$ conversion, and $H_2$/CO molar ratio was 75%, 23%, and 2.1, respectively. Thus, a higher reaction temperature (882° C. (standard deviation: 7° C.)) was selected for the study. The time-on-stream for reaching steady-state was 0.5-1.0 h. Water in the reactor effluent was removed through a condenser and the gases were analyzed using the GC-MS. All $O_2$ was consumed during the tri-reforming reaction based upon results of previous biogas tri-reforming studies showing $O_2$ conversions higher than 99% at similar conditions. Atom balances were calculated using the total moles of carbon and hydrogen out as products divided by the total moles of carbon and hydrogen in as reactants. Carbon and hydrogen atom balances for all tri-reforming runs were calculated as 90% (standard deviation: 1%) and 103% (standard deviation: 8%), respectively. A blank tri-reforming experiment with only inert silicon carbide inside the reactor tube was run at the conditions of 882° C., 3 bar, and feed molar ratios of $CH_4$:$CO_2$:air:steam at 1.0:0.7:0.95:0.71. The $CH_4$ conversion, $CO_2$ conversion, $O_2$ conversion, and $H_2$/CO molar ratio were 30%, 10%, 100%, and 1.3, respectively. Aspen Plus (V8.8, Aspen Technology, Inc.) was used to simulate the tri-reforming at 882° C., 3 bar, and four different $H_2O$/$CH_4$ molar ratios (0.35, 0.71, 0.91 and 1.16). Gibbs free energy minimization calculations were used to calculate the conversions of $CH_4$ and $CO_2$ at equilibrium conditions.

To investigate the effect of internal mass transfer limitations, the Weisz-Prater criterion ($C_{WP}$) and Thiele modulus ($\Phi_n$) were calculated using the following equations:

$$C_{wp} = \frac{(-r_{A'}) * q_c * C_L^2}{D_e * C_{As}} \tag{9}$$

$$\Phi_n = C_L * \sqrt{\frac{(-r_A) * q_c}{D_e * C_{AS}}} \tag{10}$$

$$C_L = \frac{R * L}{2 * (R + L)} \tag{11}$$

where $C_L$ is the critical length (ratio of volume to external surface area) of the catalyst cylinder, R is the radius of the catalyst cylinder, L is the length of the catalyst cylinder, $q_c$ is the catalyst density, $C_{As}$ is the reactant concentration external to the catalyst, $-r_A'$ is the mass-normalized reaction rate, and $D_e$ is the effective diffusivity. The effectiveness factor was determined using a first-order reaction curve of "effectiveness factor vs Thiele modulus".[17, 18]

Results and Discussion

Catalyst Characterization

The diffraction lines (FIG. 1) at 2θ=28.8°, 33.3°, 47.8°, 56.6°, 59.4°, 69.7° and 77.2° indicated the cubic $Ce_{0.6}Zr_{0.4}O_2$ phase in all catalysts, according to Joint Committee on Power Diffraction Standards (JCPDS) file No. 00-038-1439. These results showed that $ZrO_2$ could be incorporated into the $CeO_2$ lattice to form a solid solution.[5] The fresh and used small catalysts exhibited the minor phase separation of tetragonal $ZrO_2$ at 30.2° and 50.1°, according to JCPDS file No. 00-017-0923. This might be due to the incomplete mixing of cerium and zirconium solutions during the preparation process of small catalysts. Another possible reason is the press die with a smaller size may cause a higher pelletizing pressure in the press channel, which affected the crystalline structure of small catalysts. The separate $ZrO_2$ species was also observed in the fresh and used PtRh/$Ce_{0.6}Zr_{0.4}O_2$ catalysts using a co-impregnation method by Zhan et al.[19] Diffraction lines characteristic of the (Mg,Ni)O structure in all catalysts at 2θ=37.2°, 43.2° and 62.6° were observed, according to JCPDS file No. 00-024-0712. These results were in agreement with the NiO—MgO phase reported in literature.[20, 21] All catalysts exhibited the NiO phase (JCPDS file No. 00-044-1159) or (Mg,Ni)O phase at 79.5°. The formation of (Mg,Ni)O solid solution indicates the incorporation of Ni into the MgO structure.[20]

$N_2$ adsorption-desorption results are shown in Table 4. BET surface areas of fresh pellet catalysts were 16-22 $m^2g^{-1}$, which was lower than that of pure $Ce_{0.6}Zr_{0.4}O_2$ powder (31 $m^2g^{-1}$) synthesized at 800° C. by Chen et al.[22] Chen et al. used $ZrOCl_2.8H_2O$ as a precursor of Zr during the catalyst synthesis process. The surface area of $Ce_{0.6}Zr_{0.4}O_2$ powders decreased while the pore diameter increased with the increase of the calcination temperature from 80° C. to 800° C. In addition, the pore volume of fresh pellet catalysts was lower than that of $Ce_{0.6}Zr_{0.4}O_2$ powder.[22] Thus, incorporation of Ni and Mg into $Ce_{0.6}Zr_{0.4}O_2$ might block some of the pores. Similar results were found by Sukonket et al.[23] that 5% $Ni/Ce_{0.6}Zr_{0.4}O_2$ powder had lower BET surface areas and pore volumes than those of pure $Ce_{0.6}Zr_{0.4}O_2$ powder synthesized through a surfactant-assisted route. In general, BET surface area and pore volume were highest for the powder and then decreased in following order: fresh small catalyst, fresh large catalyst, used small catalyst, and finally used large catalyst. However, the average pore size was highest for the fresh small catalyst and then decreased in following order: fresh commercial NiO/$Al_2O_3$ pellet catalyst (Table 7), powder, fresh large catalyst, and finally used catalysts. Lower BET surface area, pore volume, and average pore size of the used catalysts might be attributed to the pore blockage by coke deposits on the catalyst and higher reaction temperatures compared to calcination conditions. The above results indicate the press die size has an influence on the physical properties of catalysts. Both pellet catalysts with different radius sizes were extruded with the same force of the Bench Top Auto Press. However, the small size may result in a higher pelletizing pressure in the press channel of the press die. The pelletizing pressure may affect the shape and size of pores. Similar finding were observed by Stelte et al.[24] that pelletizing pressure increased with the decreasing particle size of fuel pellets.

TABLE 4

$N_2$ Physisorption Results of Fresh and Used Pellet Catalysts

| Catalyst | Nomenclature | State | BET surface area ($m^2g^{-1}$) | BJH pore volume ($cm^3/g$) | BJH average pore diameter (Å) | Reference |
| --- | --- | --- | --- | --- | --- | --- |
| NiMg/$Ce_{0.6}Zr_{0.4}O_2$ (R = 1.59 mm, L = 7.0 mm) | Large catalyst | Fresh | 16 | 0.04 | 96 | This study |
|  |  | Used* | 10 | 0.01 | 34 | This study |
| NiMg/$Ce_{0.6}Zr_{0.4}O_2$ (R = 0.75 mm, L = 2.0 mm) | Small catalyst | Fresh | 22 | 0.07 | 176 | This study |
|  |  | Used* | 11 | 0.02 | 34 | This study |
| NiMg/$Ce_{0.6}Zr_{0.4}O_2$ powder | N/A | Fresh | 35 | 0.10 | 114 | 5, 25 |

*"Used" means the catalystas previously subjected to tri-reforming reaction conditions for more than 9 h.

Morphologies of the catalysts was evaluated by SEM (FIGS. 2A-2D). The fresh and used large catalysts contained particles with different sizes and several large pores on the surface. The fresh small catalyst contained small but more abundant pores on the surface, compared to the fresh large catalyst. This is in agreement with the higher surface area and pore volume of the fresh small catalyst, compared to fresh large catalyst. However, compared to fresh large catalyst, the higher average pore size of fresh small catalyst suggests it has large sub-surface pores. These results align with the previous observation that the size of the press die affects the pore size and distribution of catalysts. No obvious carbon species were observed on the surface of the used catalysts, which is consistent with the low coking rate from the result of the TPO analysis. Similar research was reported by Vasiliades et al.[26] that hardly any carbon filaments were observed on the used $Ni/Ce_{0.2}Pr_{0.8}O_{2-\delta}$ catalyst suggesting resistance to carbon formation under reaction conditions. The $Ce_{0.2}Pr_{0.8}O_{2-\delta}$ support consisted of particles that agglomerated into large porous structures. The calculated relative weight proportion of Ni, Mg, Ce and Zr was 10%, 10%, 56% and 24%, respectively, based on precursor amounts used. All metal elements (Ni, Mg, Ce and Zr) were detected on the catalysts' surface (FIGS. 3A-3D). The relative proportion of metal elements on the catalyst was consistent with the above calculated estimates. The small catalyst showed higher radial crush strength and higher resistance to breakage than large catalyst (Table 5). Detailed analyses of the mechanical properties of NiMg/$Ce_{0.6}Zr_{0.4}O_2$ pellet catalysts are described in the supporting information: "mechanical properties of NiMg/$Ce_{0.6}Zr_{0.4}O_2$ cylindrical pellet catalysts" section.

Mechanical Properties of NiMg/$Ce_{0.6}Zr_{0.4}O_2$ Cylindrical Pellet Catalysts.

Table 5 shows the drop test (ratio of length to diameter of pellets) and radial crush strength results of NiMg/$Ce_{0.6}Zr_{0.4}O_2$ pellet catalysts. The drop test was determined using a similar method described by Beeckman et al.[2] First, the drop height could be between 0.20 m and 6.40 m. The drop height in this study was selected as 0.73 m. Second, the catalyst sample size was 4-6 pellets in this study due to the catalyst amount limitation. Third, the drop surface was a flat metal (copper) plate positioned horizontally. A long glass tube was used and placed on the flat metal plate. Fourth, the pellet sample was dropped from the top of the glass tube. Before and after the drop, the length and diameter of the pellet sample were measured using a caliper. The small catalyst has a lower ratio of length to diameter change after drop test than that of large catalyst. This indicates that the small catalyst has a higher resistance to breakage. The radial crush strength of NiMg/$Ce_{0.6}Zr_{0.4}O_2$ pellet catalysts were measured according to the standard test methods of ASTM D4179. The catalyst sample size was 4-6 pellets in this study due to the limitation of the catalyst amount. The small catalyst has a higher radial crush strength than that of large catalyst, which is consistent the above result that the small catalyst has a higher resistance to breakage than that of large catalyst.

TABLE 5

Drop Test (Ratio of Length to Diameter of Pellets) and Radial Crush Strength Data for NiMg/$Ce_{0.6}Zr_{0.4}O_2$ Pellet Catalysts

| Characteristic | Large catalyst | Small catalyst |
| --- | --- | --- |
| Ratio of length to diameter change after drop test (%) | 5.3 ± 0.05 | 2.1 ± 0.01 |
| Radial crush strength (N) | 0.94 ± 0.03 | 1.06 ± 0.02 |

From TPR results (FIGS. 4A-4D), the catalysts showed two reduction peaks, which occurred near 400 and 840° C. Based on literature, both NiO and the $Ce_{0.6}Zr_{0.4}O_2$ support partially reduce and the assignment of a reduction feature to a temperature lacks consensus.[5, 25, 27-33] The low temperature reduction peaks could be either attributed to NiO with weak interaction with Mg and the $Ce_{0.6}Zr_{0.4}O_2$ support[5, 32, 33] or near-surface cerium oxide[29-31]. The higher temperature reduction peaks are likely attributed to NiO strongly interacting with Mg and the $Ce_{0.6}Zr_{0.4}O_2$ support or the support itself. Based on these studies, the low and high temperature peaks in the fresh samples, respectively, are likely caused by NiO and $Ce_{0.6}Zr_{0.4}O_2$ support reduction. The used small catalyst exhibited a new reduction peak at around 524° C., which might be attributed to NiO having moderate interactions with Mg and the $Ce_{0.6}Zr_{0.4}O_2$ support or $CeO_2$.[25] Both used large and small catalysts exhibited an intense reduction peak at a temperature below 400° C. The most probable explanation, since the Ni should largely reduced, is that the metallic Ni aids in reducing the near-surface layers of the $Ce_{0.6}Zr_{0.4}O_2$ support. NiO re-oxidized during the reaction in the front end of the catalyst bed where $O_2$ may also contribute.

Figure 5A:
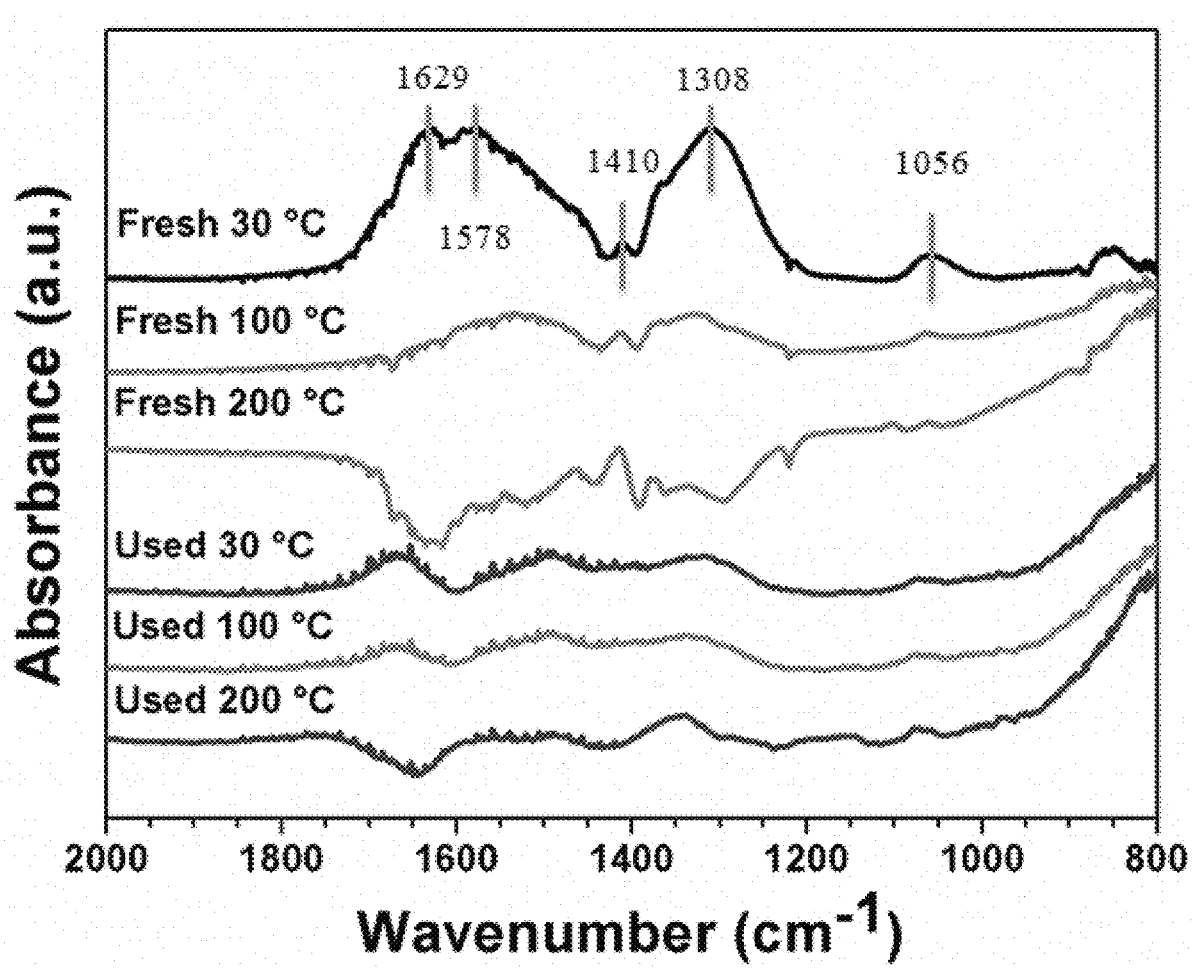
FIGS. 5A-5B show the $CO_2$-DRIFTS results of fresh and used pellet catalysts tested at 30° C., 100° C. and 200° C., respectively.
Figure 5B:
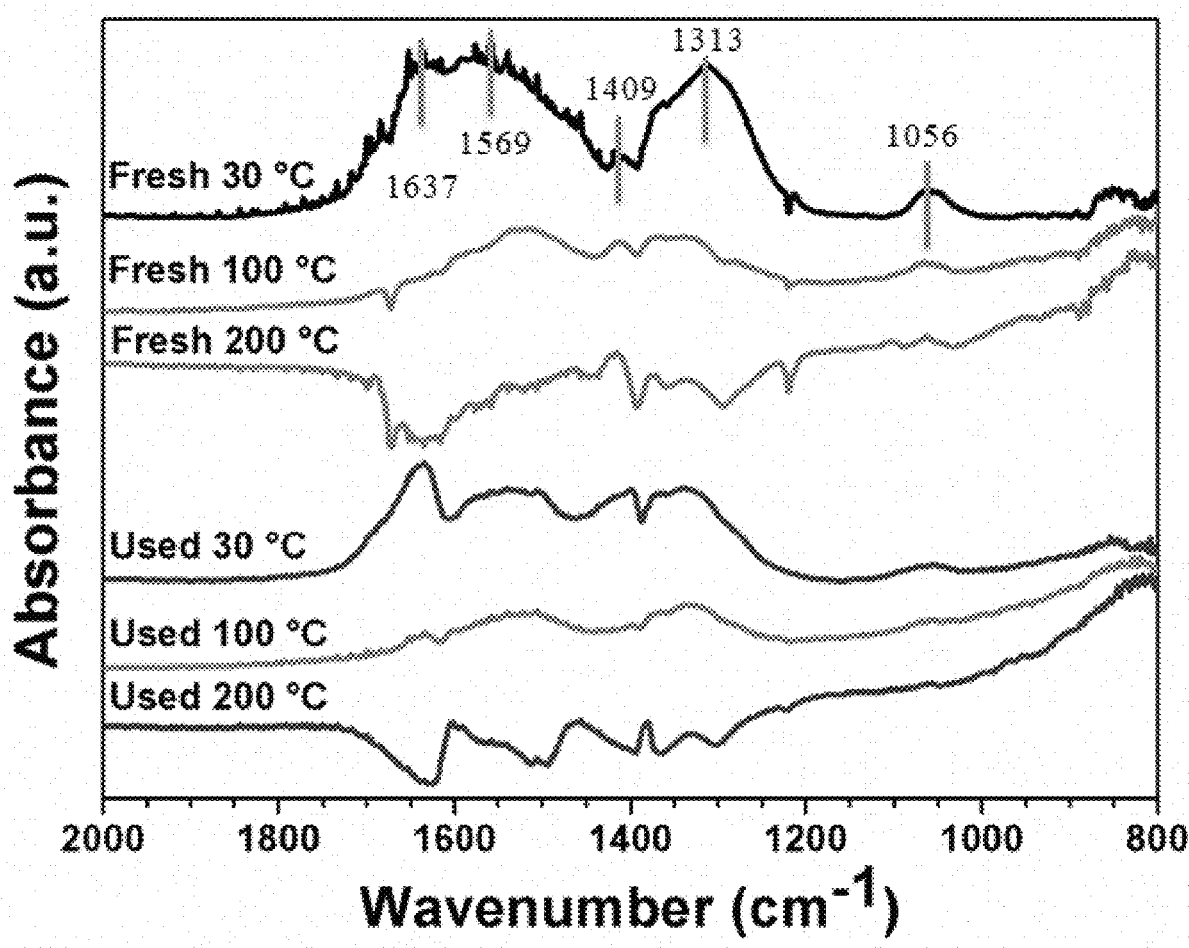

FIGS. 5A-5B shows the $CO_2$-DRIFTS profiles of fresh and used $NiMg/Ce_{0.6}Zr_{0.4}O_2$ catalysts. The investigation for surface acidity and basicity over different catalyst surfaces is usually conducted via probe molecules at different temperatures. Detection of surface adsorbed species at higher temperatures is often a representation of strength of acidity or basicity. The choice of temperatures of 30, 100, and 200° C. in this study is based on two reasons: several reports of conducting DRIFTS at similar temperatures to probe surface states[34-36] and limitations of the DRIFTS apparatus. For the fresh large catalyst tested at 30° C., there were five main peaks. The peak at around 1629 $cm^{-1}$ was attributed to H—O—H bending mode of the adsorbed water. The relative intensity of the H—O—H bond decreased with the increase in temperature from 30° C. to 200° C. Similar results were found by Ashok et al.[37] that the intensity of the hydroxyl group bonds on $Ni/CeO_2$—$ZrO_2$ catalyst decreased with the increase in temperature from 150° C. to 250° C. The peaks at around 1578 $cm^{-1}$, 1410 $cm^{-1}$, and 1308 $cm^{-1}$ were attributed to carbonates.[37] Presence of these carbonate species represents the tendency of carbon dioxide species being adsorbed on the surface that essentially marks surface activity of these catalysts. $CO_2$ is chemically stable, but the basic sites could activate it to form carbonates.[38] The relative intensity of the peak at around 1410 $cm^{-1}$ increased with increasing the temperature to 200° C., indicating a strong presence of bidentate carbonate species over ceria and zirconia.[39-41] The small catalyst on the contrary revealed strong carbonate peaks at 200° C. even at post-reaction conditions. The peak at around 1056 $cm^{-1}$ was attributed to surface formate that could reform carbonates.[42] Compared to the fresh large catalyst tested at 30° C., the relative intensities of bonds on the used large catalyst tested at 30° C. decreased accordingly. There were also five main peaks on the fresh small catalyst tested at 30° C. These peaks were very similar to those peaks on the fresh large catalyst.

Figure 6A:
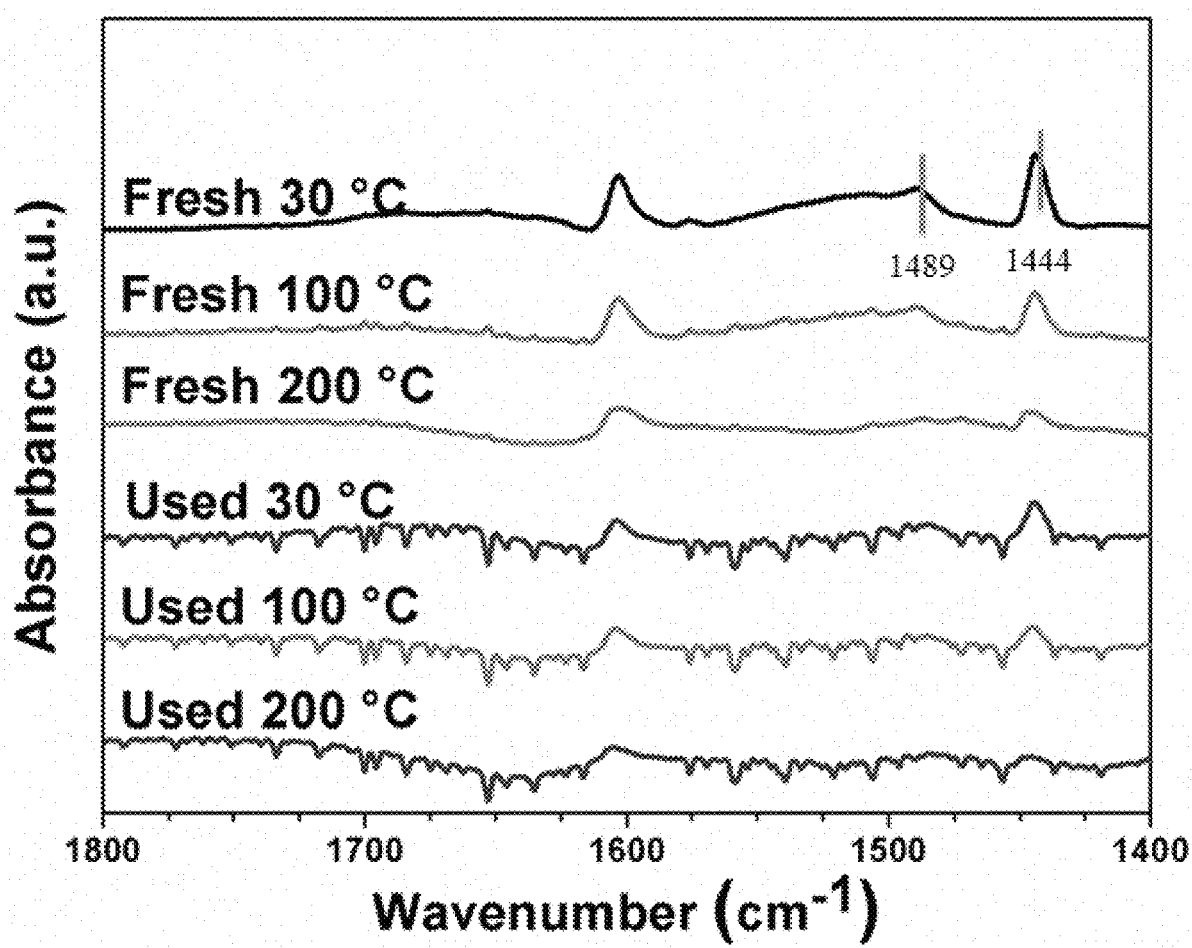
FIGS. 6A-6B show the pyridine DRIFTS results of fresh and used pellet catalysts tested at 30, 100, and 200° C., respectively.
Figure 6B:
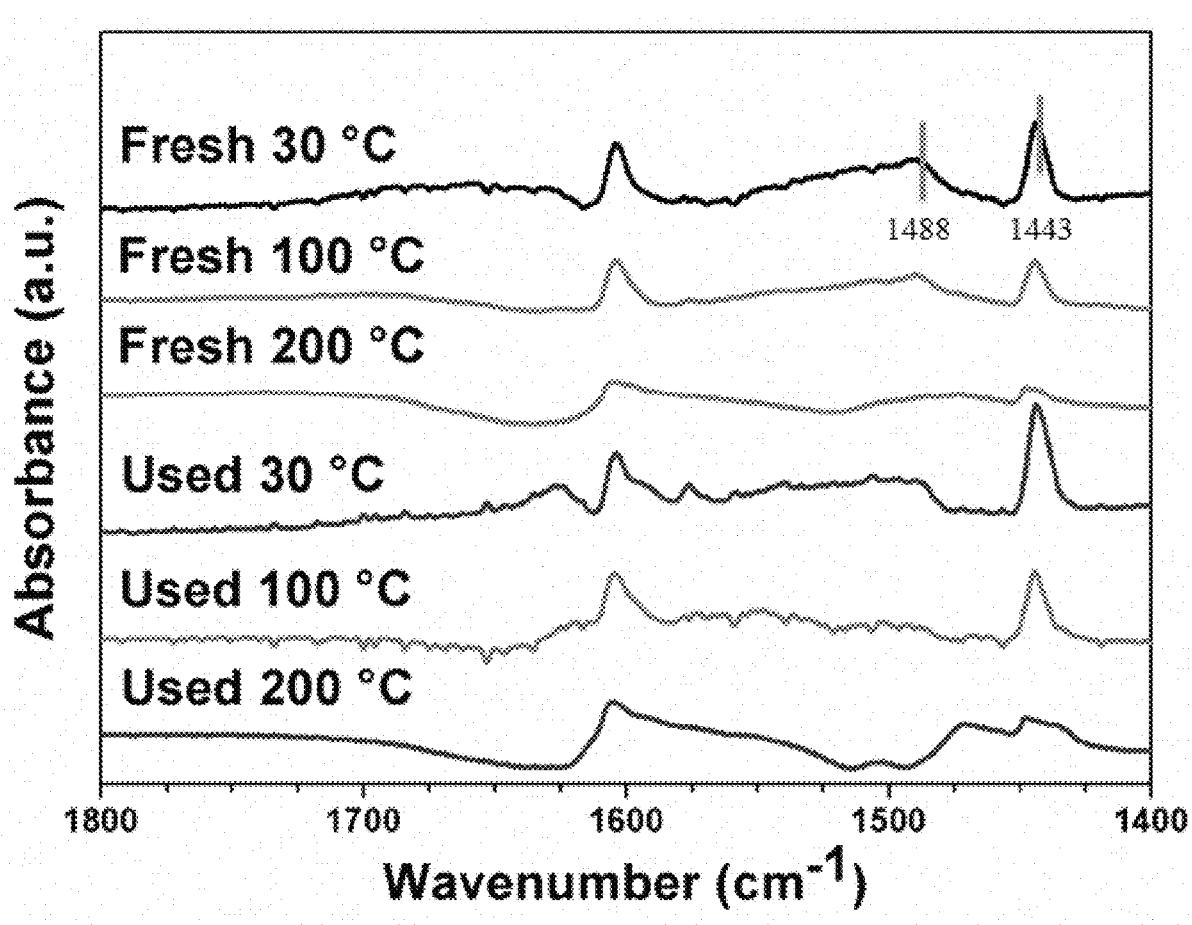

The pyridine adsorbed FT-IR spectra of fresh and used $NiMg/Ce_{0.6}Zr_{0.4}O_2$ catalysts are shown in FIGS. 6A-6B. Pyridine is a common basic probe molecule used to investigate the surface acidity. Both fresh and used large catalysts exhibited peaks at around 1489 $cm^{-1}$ and 1444 $cm^{-1}$. The peak at around 1489 $cm^{-1}$ was ascribed as both a Brønsted acid site and Lewis acid site. The intense bond at around 1444 $cm^{-1}$ was ascribed as a Lewis acid site. It is suggested that the acidic surface species of the catalysts are coordinated metal ions such as $Ce^{4+}$ and $Zr^{4+}$ ions.[43] The high intensity of the bond at around 1444 $cm^{-1}$ indicates a highly acidic surface on the catalyst.[42] The comparison between the spectral bands at 1489 $cm^{-1}$ and 1444 $cm^{-1}$ indicates that the catalyst had a higher number of Lewis acid sites compared to the Brønsted acid sites. This is consistent with the research of Kumar et al.[44] that the Lewis acid sites of the $Ni/ZrO_2$ catalyst were higher compared to the Brønsted acid sites. The Lewis acid sites of the catalyst can enhance the adsorption of $CH_4$ and $CO_2$, which may promote their conversions during the biogas tri-reforming.[45] Similarly, fresh and used small catalysts exhibited peaks at around 1488 $cm^{-1}$ and 1443 $cm^{-1}$. A consistent presence of pyridine adsorption (~1600 $cm^{-1}$) was also observed over both the large and small catalysts.[46] The Lewis acid site peaks of all catalysts showed a decreasing trend with the increase of adsorption temperature from 30° C. to 200° C. This is in alignment with the finding of Soykal et al.[42] that all of the bands became weaker with increasing temperature in the pyridine-DRIFT spectra of ceria nanopolyhedra catalyst.

Characterization and Preliminary Reaction Test of $NiO/Al_2O_3$ Pellet Catalysts Tri-reforming results are shown in Table 6 over the commercial $NiO/Al_2O_3$ pellet catalysts that were purchased from Alfa Aesar (4-hole, 4-flute domed cylinders, 10.5 mm×13 mm, #45465). The tests were carried out at the conditions of 882° C., 3 bar, and $CH_4/CO_2$/air molar ratio=1: 0.7:0.95. The $H_2O/CH_4$ molar feed ratio varied between 0.35 and 0.91. With the decrease of the $H_2O/CH_4$ molar feed ratio, the $CO_2$ conversion increased from 13% to 37% and the $H_2/CO$ molar ratio decreased from 2.4 to 1.4. The $O_2$ conversions were all 100%. The BET surface area and pore volume (Table 7) of used $NiO/Al_2O_3$ catalyst were both lower than those of the fresh $NiO/Al_2O_3$ catalyst. A possible reason is some pores were blocked by coke deposits on the catalyst. However, the average pore size (Table 7) of used $NiO/Al_2O_3$ catalyst was higher than that of the fresh $NiO/Al_2O_3$ catalyst. This might be attributed to the blockage of some small pores by the coke deposits.

TABLE 6

The Reactant Conversions and $H_2$/CO Molar Ratio Obtained during Biogas Tri-reforming over $NiO/Al_2O_3$ Pellet Catalysts at Conditions of 882° C., 3 bar, and $CH_4/CO_2$/air Molar Ratio = 1: 0.7: 0.95

| $H_2O/CH_4$ molar feed | GHSV ($h^{-1}$) | $CH_4$ conversion (%) | $CO_2$ conversion (%) | $H_2$/CO molar ratio |
|---|---|---|---|---|
| 0.35 | 19 × 10³ | 57 | 37 | 1.4 |
| 0.71 | 21 × 10³ | 60 | 28 | 1.7 |
| 0.91 | 22 × 10³ | 61 | 13 | 2.4 |

TABLE 7

The $N_2$ Adsorption-desorption Analysis of Fresh and Used $NiO/Al_2O_3$ Pellet Catalysts

| State | BET surface area ($m^2 g^{-1}$) | BJH pore volume ($cm^3/g$) | BJH average pore diameter (Å) |
|---|---|---|---|
| Fresh | 21 | 0.07 | 125 |
| Used* | 19 | 0.05 | 175 |

*"Used" means the catalyst was previously subjected to tri-reforming reaction conditions for 7.2 h.

Experimental Tri-Reforming Studies

Figure 7:
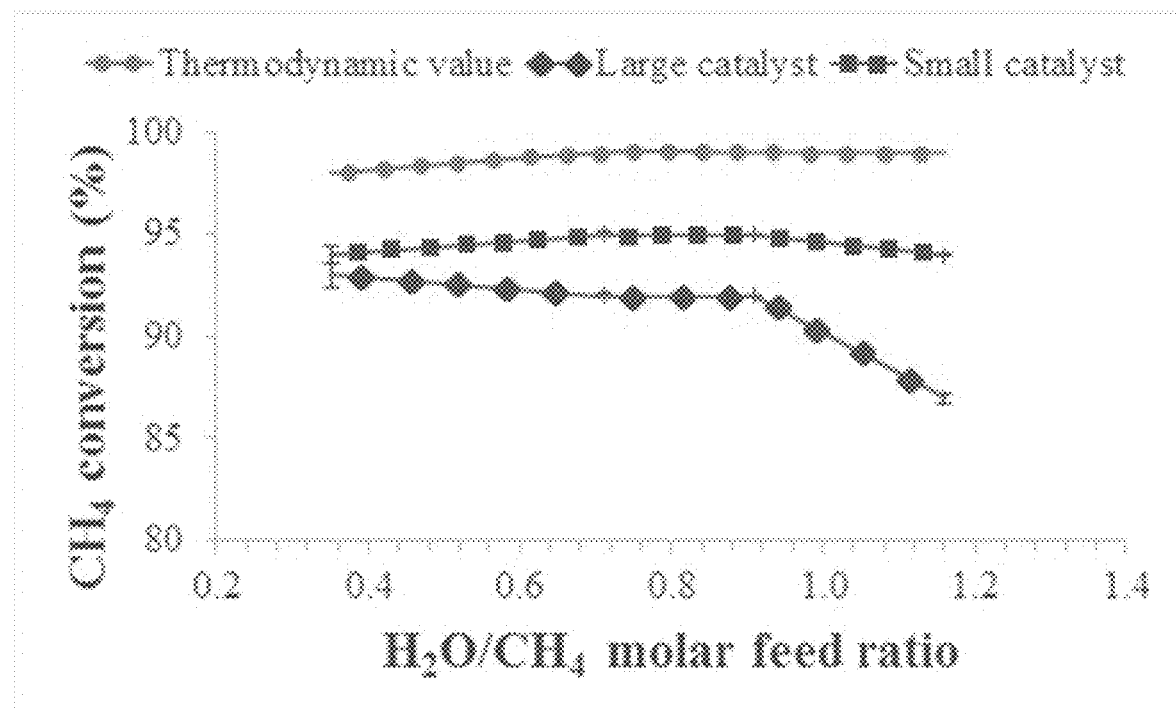
FIG. 7 shows the effect of $H_2O/CH_4$ molar feed ratio (0.35-1.16) on $CH_4$ conversion at 3 bar and 882° C.

The effect of $H_2O/CH_4$ molar feed ratio (0.35-1.16) on $CH_4$ conversion at 3 bar and 882° C. was investigated for tri-reforming (FIG. 7). Due to the reactor conditions and the catalyst, $CH_4$ conversions were high (ranged from 87% to 95%). High $CH_4$ conversions are also in accord with the thermodynamic equilibrium calculations ($CH_4$ conversions were between 98% and 99%). As a result, $CH_4$ conversion was not largely influenced by the $H_2O/CH_4$ molar feed ratio at these industrially relevant conditions. However, the $CH_4$ conversion did decrease for the highest $H_2O/CH_4$ molar feed ratio, especially for the large catalyst. While slight differences in GHSV may contribute, the high steam amounts are speculated to oxidize the catalyst surface, causing the drop in conversion. The $CH_4$ conversion obtained over fresh small catalyst was higher, compared to the commercial $NiO/Al_2O_3$ pellet catalyst used for the preliminary tri-reforming tests at similar conditions (Table 5). Details of the biogas tri-reforming tests over the commercial $NiO/Al_2O_3$ pellet catalyst are described in the supporting information: "characterization and preliminary reaction test of $NiO/Al_2O_3$ pellet catalysts" section.

Figure 8:
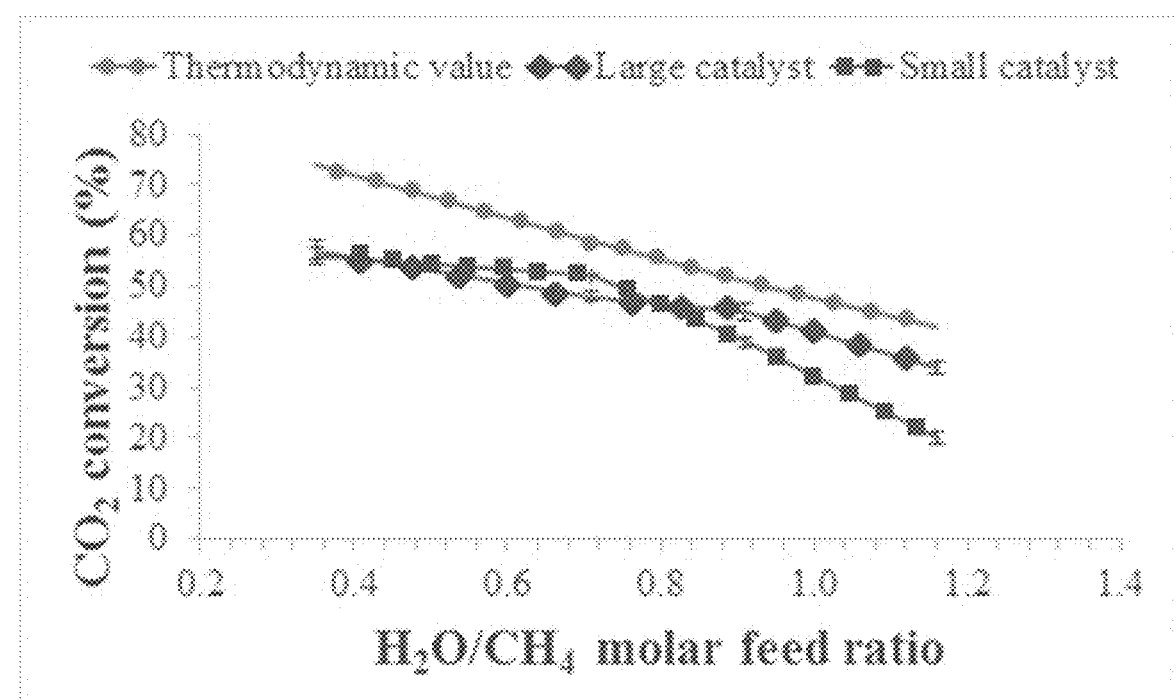
FIG. 8 shows the effect of $H_2O/CH_4$ molar feed ratio (0.35-1.16) on $CO_2$ conversion at 3 bar and 882° C.
Figure 9:
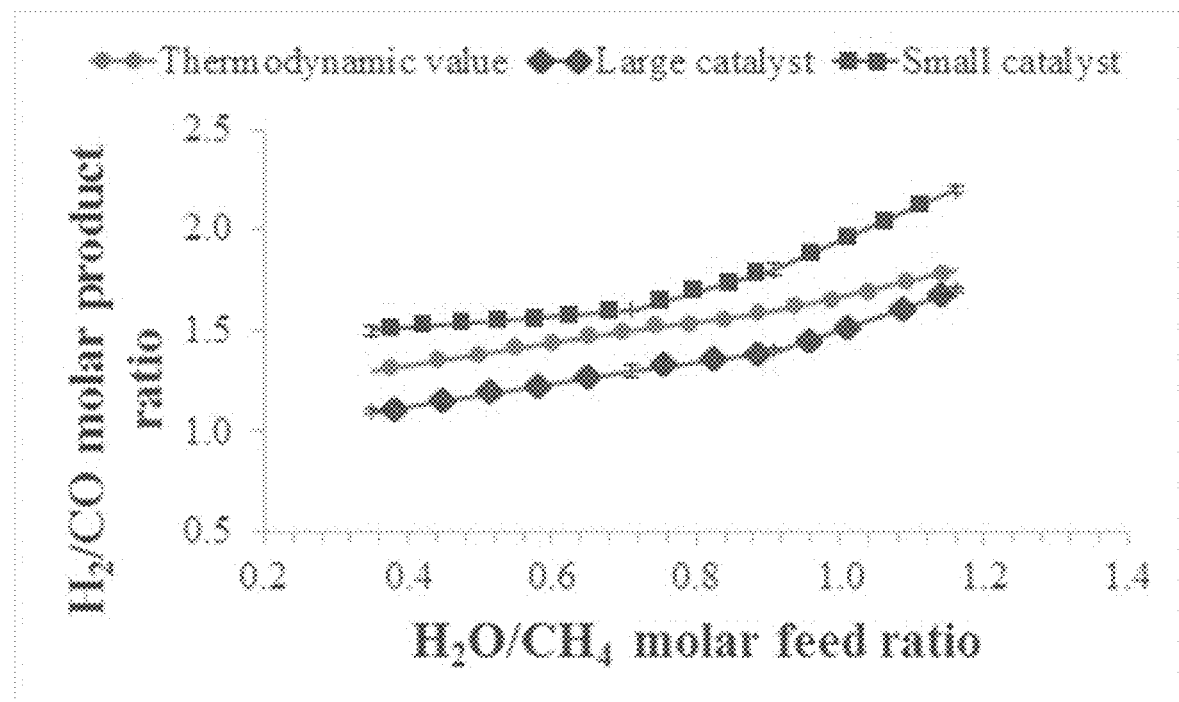
FIG. 9 shows the effect of $H_2O/CH_4$ molar feed ratio (0.35-1.16) on $H_2$/CO molar product ratio at 3 bar and 882° C.

The effect of $H_2O/CH_4$ molar feed ratio (0.35-1.16) on $CO_2$ conversions and $H_2/CO$ molar ratios, respectively, are shown in FIG. 8 and FIG. 9 at 3 bar and 882° C. For tri-reforming over the small catalyst, increasing $H_2O/CH_4$ molar ratio led to a decrease in $CO_2$ conversion from 56% to 20% while the $H_2/CO$ molar ratio increased from 1.5 to 2.2. The decrease of $CO_2$ conversion and increase of $H_2/CO$ molar ratio is due to the competition between $CO_2$ and steam for the same active sites. In addition, the water-gas shift (WGS) reaction is favored with an increase of $H_2O$, thus resulting in a net decrease of $CO_2$ conversion. Compared to the commercial $NiO/Al_2O_3$ pellet catalyst used for the preliminary tri-reforming tests (Table 6), the $CO_2$ conversion obtained over small catalyst was higher, and the obtained $H_2/CO$ molar ratio was similar (when the $H_2O/CH_4$ molar feed ratio was 0.35 or 0.71). For the tri-reforming over the large catalyst, the $CO_2$ conversion decreased from 57% to 34% while he $H_2/CO$ molar ratio increased from 1.1 to 1.7 with increasing $H_2O/CH_4$ molar ratio. These results were consistent with the thermodynamic equilibrium trends.

Figure 10A:
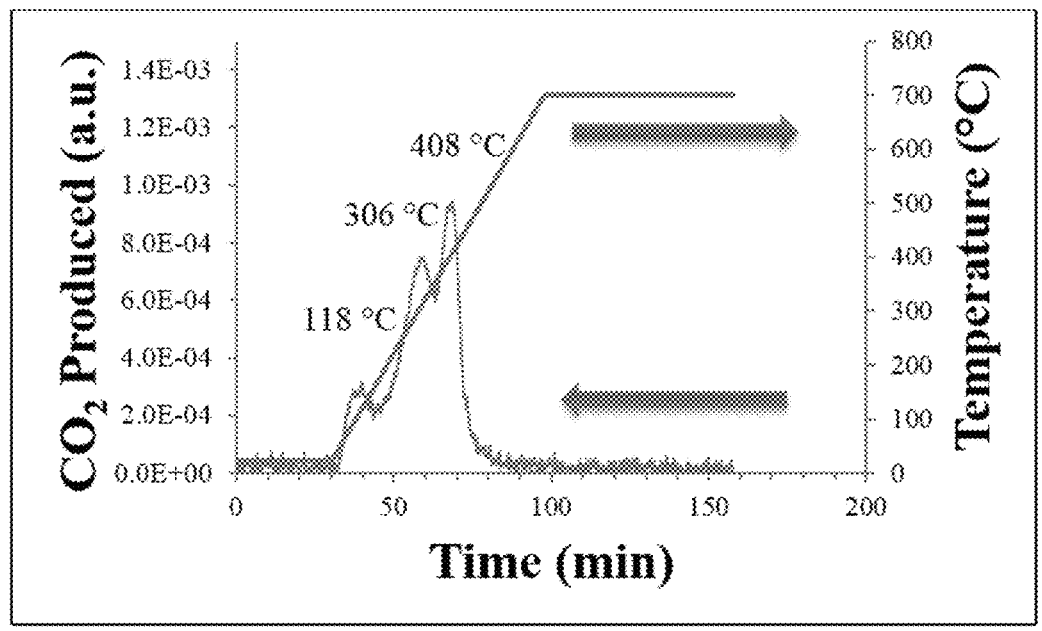
FIGS. 10A-10B show the TPO profiles of (FIG. 10A) used large (FIG. 10B) used small pellet catalyst.
Figure 10B:
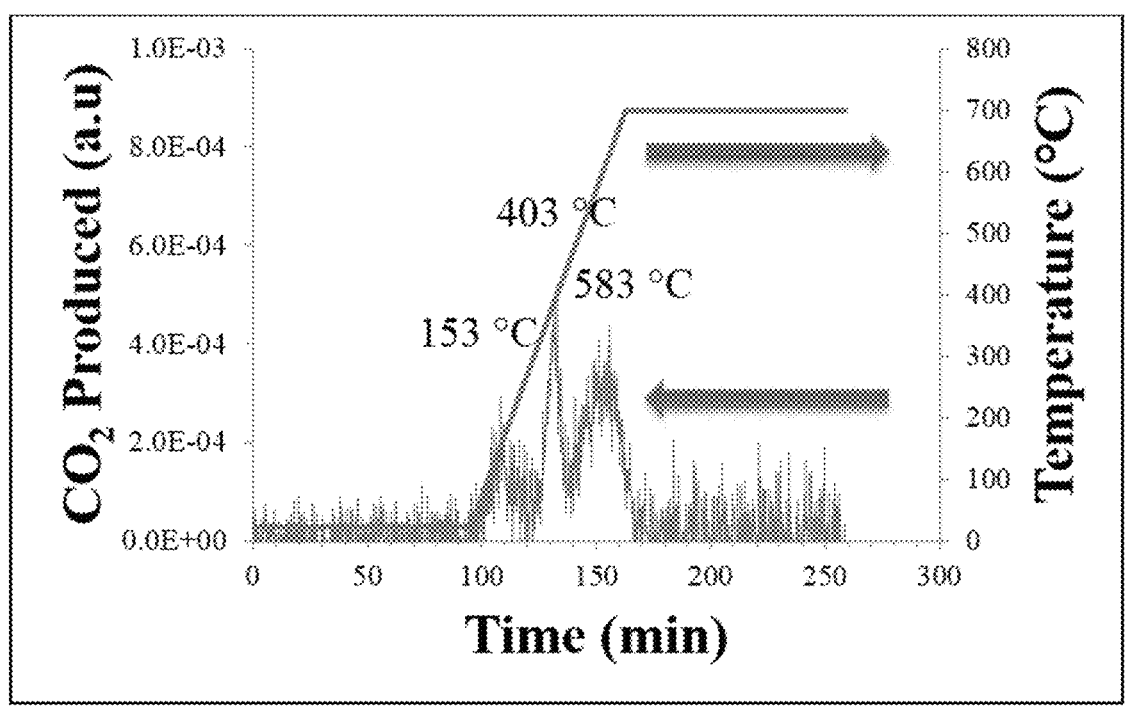

The TPO profile of used large catalyst (FIG. 10A) exhibited three main peaks at around 118° C., 306° C. and 408° C. The TPO profile of used small catalyst (FIG. 10B) also shows three main peaks at around 153° C., 403° C. and 583° C. Peaks centered at around 118° C. and 153° C. were attributed to mono-carbons (mono-carbon is also called atomic carbon). However, peaks at the temperatures of 306-583° C. were ascribed to filamentous carbons. Compared to graphitic carbon, atomic and filamentous carbons yield a slower deactivation rate due to their being more reactive. In addition, the atomic carbon species are supposed to contribute to some syngas formation.[47] If carbon formation rate was higher than the carbon diffusion rate through the catalyst bulk, carbon was accumulated on the catalyst surface to hinder the gas diffusion to the active sites of nickel, thus resulting in the catalyst deactivation.[48] The coke formation rate for used large catalyst was calculated as $2.2 \times 10^{-4}$ g/$g_{cat}$/h through the integration of the measured $CO_2$ peaks, shown in Table 8. The used small catalyst exhibited a lower coke formation rate, $1.1 \times 10^{-4}$ g/$g_{cat}$/h. The used small catalyst showed a lower coking rate than that of 5 wt % $Ni/CeO_2$ and Ni-CaO—$ZrO_2$ catalysts[26, 48] that were used in the dry reforming of methane. The used small catalyst also showed a lower coking rate than that of $Ni/ZrO_2$ and $Ni/Ce_{0.5}Zr_{0.5}O_2$ catalysts[49] that were used in the partial oxidation of methane. The deactivation of nickel-based catalysts during the partial oxidation of methane was mainly due to the carbonaceous deposition and the active metal sintering.[49] The presence of steam during the tri-reforming process may help reduce the coke deposition on the small catalyst. It was reported that the coke formation becomes more favorable at higher pressures during dry reforming of methane.[50] The above results indicate that both the large catalyst and small catalyst are highly resistant to carbon deposition under the tri-reforming reaction conditions. The high oxygen mobility of ceria and/or zirconia and basicity of Mg also contributes to the coke resistance.[5] Furthermore, the small catalyst possesses a higher coke resistance than that of the large catalyst. A possible reason is due to the higher average pore size of the small catalyst so that more $O_2$ or $H_2O$ can flow through the pores to decrease the amount of carbon deposition, compared to the large catalyst.

TABLE 8

Comparison of Catalyst Coking Rates to Literature

| Catalyst | Coking rate (g/$g_{cat}$/h) | Reference |
| --- | --- | --- |
| Large catalyst (time-on-stream: 10 h) | $2.2 \times 10^{-4}$ | This study |
| Small catalyst (time-on-stream: 10 h) | $1.1 \times 10^{-4}$ | This study |
| 5 wt% $Ni/Ce_{0.8}Pr_{0.2}O_2$ | $8.7 \times 10^{-5}$ | 26 |
| 5 wt% $Ni/CeO_2$ | $7.8 \times 10^{-3}$ | 26 |
| Ni-CaO-$ZrO_2$ | $9.0 \times 10^{-2}$ to $1.3 \times 10^{-1}$ | 48 |
| $Ni/ZrO_2$ | $6.4 \times 10^{-4}$ to $1.6 \times 10^{-3}$ | 49 |
| $Ni/Ce_{0.5}Zr_{0.5}O_2$ | $1.8 \times 10^{-4}$ | 49 |

Analysis of Internal Diffusion Limitations

Weisz-Prater criteria, Thiele moduli, and effectiveness factors were calculated for the tri-reforming on $NiMg/Ce_{0.6}Zr_{0.4}O_2$ pellet catalysts to examine the effect of internal diffusion limitations and are shown in Table 10. The reaction kinetics were assumed as first order with respect to $CH_4$.[18] These results showed that internal diffusion limitations for $NiMg/Ce_{0.6}Zr_{0.4}O_2$ pellet catalysts because the Weisz-Prater criteria was higher than 1, indicating reactions were performed in the internal diffusion-limited regime. The effectiveness factor of small catalyst is over double that of the large catalyst, which is consistent with slightly higher $CH_4$ conversion for the small than large catalyst at the conditions tested. The $NiMg/Ce_{0.6}Zr_{0.4}O_2$ powders used in our previous research at a microreactor scale did not exhibit internal mass transfer limitations.[5] In this study, pressure drop was negligible. Detailed analyses of other potential transport limitations and comparisons to various steam reforming reaction scales are described in the supporting information (Table 9, "analysis of transport limitations for the small catalyst" section).

Analysis of Transport Limitations for the Small Catalyst

The transport limitations for the small catalyst are estimated Table 9. The Mears criterion of external mass transfer was analyzed and the calculated value or $$\frac{r_{obs} * R_p * \rho_b}{K_c * C_{AB}}$$

was much lower than 0.15. This relation indicated that the external mass transfer effects could be neglected. For the Mears criterion of mass transfer, $r_{obs}$ is the observed reaction rate, $R_p$ is the critical length of the catalyst particle, $\rho_b$ is the bulk density of catalyst bed, $K_c$ is the mass transfer coefficient, and $C_{AB}$ is the bulk gas concentration of $CH_4$. The reaction order is assumed as 1.

The Prater-Weisz criterion of internal mass transfer was analyzed and the calculated value of $C_{WP}$ (internal diffusion limitation) was higher than 1. This value indicated that the internal mass transfer limitations exist in the catalyst and further details are reported in Table 10.

The Mears criterion of external heat transfer was analyzed and the calculated value of $$\frac{\Delta H_r * r_{obs} * R_P}{h_t * T_B}$$

was higher than the calculated value of $$15 * \frac{R_g * T_B}{E}.$$

This value indicated that the external heat transfer limitations exist in the reactor. For the Mears criterion of external heat transfer, $\Delta Hr$ is the heat of reaction per mole of $CH_4$ converted, $h_t$ is the heat transfer coefficient, $T_B$ is the bulk fluid temperature, $R_g$ is the gas constant, and $E$ is the activation energy.

The Anderson criterion of internal heat transfer was analyzed and the calculated value of $$\frac{\Delta H_r * r_{obs} * R_P^2}{\lambda^e * T_S}$$

was lower than the calculated value of $$0.75 * \frac{R_g * T_S}{E}.$$

This indicates that the internal heat transfer effects could be neglected. For the Anderson criterion of external heat transfer, $\lambda^e$ is the effective thermal conductivity of the particle and $T_s$ is the surface temperature.

TABLE 9

The Estimated Transport Limitations for the Small Catalyst

| Characteristic | External mass transfer | Internal mass transfer | External heat transfer | Internal heat transfer |
|---|---|---|---|---|
| Limitation | No (0.04 < 0.15) | Yes (7 > 1) | Yes (0.12 > 0.007) | No (0.01 < 0.04) |

TABLE 10

Analysis of Internal Diffusion Limitations

| | Internal diffusion limitation, $C_{wp}$ | Thiele modulus, $\phi_n$ | Effectiveness factor, $\eta$ | Radius (mm) | Length (mm) |
|---|---|---|---|---|---|
| Large catalyst | 38 | 6.2 | 0.16 | 1.59 | 7.0 |
| Small catalyst | 7 | 2.7 | 0.37 | 0.75 | 2.0 |
| NiMg/Ce$_{0.6}$Zr$_{0.4}$O$_2$ powder | 0.12 | <1 | 1.0 | 0.06 | N/A |

Characterizations of Typical Reactors for Methane Reforming

The characteristics of typical reactors, as a function of scale, for methane reforming are compared in Table 11. The Reynolds number is calculated based on the below equation (12):

$$R_e = \frac{\mu * L}{v} \quad (12)$$

Where $R_e$ is the Reynolds number, $\mu$ is the velocity of the gas mixture, L is the characteristic linear dimension, and v is the kinematic viscosity of the gas mixture. The pressure, reactor length, and the feed flow rate in this work are lower, compared to the steam reforming reactor. However, the pressure could be boosted to a higher value using a Booster Pump. The reactor length could be adjusted based on the catalyst amount and the feed flow rate could be adjusted easily. The reasonable catalyst particle size and catalytic performance indicate the feasibility of the NiMg/Ce$_{0.6}$Zr$_{0.4}$O$_2$ pellet catalyst under industrial conditions.

TABLE 11

The Characteristics of Reforming Reactors in Bench-scale

| Property | This work | Reference [1] | Reference [1] | Reference [1] |
|---|---|---|---|---|
| Scale | Bench-scale | Gradientless micro-reactor | Bench-scale | Industrial scale |
| Reforming type | Tri-reforming | Steam reforming | Steam reforming | Steam reforming |
| Pressure (bar) | 3 | 1 | 35 | 35 |
| Temperature (° C.) | 882 | 500 | 500-800 | 500-800 |
| Reactor diameter (mm) | 15.7 | 5 | 20 | 100 |
| Reactor length (m) | $1.5 \times 10^{-2}$ | $1.2 \times 10^{-2}$ | 0.3 | 12 |
| Total reactor volume (m$^3$) | $2.9 \times 10^{-6}$ | $0.2 \times 10^{-6}$ | $1.0 \times 10^{-4}$ | 19 |
| Number of tubes | 1 | 1 | 1 | 200 |
| Catalyst particle diameter (mm) | 1.5 | 0.3-0.5 | 3-4 | 16 mm rings |
| Feed flow rate (Nm$^3$/h) | $1.2 \times 10^{-3}$ | $50 \times 10^{-3}$ | 0.6 | 110,000 |
| Space velocity (vol CH$_4$/vol/h) | 6,700 | 60,000 | 1,450 | 1,450 |
| Mass velocity (kg/m$^2$/h) | 430 | 2,500 | 1,500 | 86,000 |
| Reynolds number | 7 | 12 | 52 | 9,500 |

Conclusions

NiMg/ceria-zirconia pellet catalysts performed well during tri-reforming of surrogate biogas and proved to be highly resistant to coke formation under industrially relevant conditions. The size of catalyst pellet affect the catalytic performance since they influence the internal and external heat/mass transfer properties. The small size pellets showed better mass transfer, higher coking resistance, higher surface area/pore volume, higher radial crush strength, and higher resistance to breakage. The H$_2$O/CH$_4$ molar feed ratio plays a significant role in the CO$_2$ conversion and H$_2$/CO ratio, which are both key performance metrics. CO$_2$ conversion decreased from 56% to 20%, but the H$_2$/CO molar ratio increases from 1.5 to 2.2 with an increase of the H$_2$O/CH$_4$ molar feed ratio from 0.35 to 1.16 at the reaction conditions of 3 bar, 882° C., and the small catalysts. High reactant conversions and desired H$_2$/CO molar ratios suggested that the NiMg/Ce$_{0.6}$Zr$_{0.4}$O$_2$ catalysts in pellet form are suitable for commercial scale applications. In future research, the NiMg/Ce$_{0.6}$Zr$_{0.4}$O$_2$ pellet catalysts will be used to convert landfill gas to syngas. In addition, the effects of CO$_2$/CH$_4$ molar ratio on the reactant conversions and H$_2$/CO molar ratios will be studied.

References for Example 2

1. Hajjaji, N.; Martinez, S.; Trably, E.; Steyer, J. P.; Hellas, A. Life cycle assessment of hydrogen production from biogas reforming. *Int. J. Hydrogen Energy* 2016, 41, 6064-6075.
2. Kumar, N.; Roy, A.; Wang, Z.; L'Abbate, E. M.; Haynes, D.; Shekhawat, D.; Spivey, J. J. Bi-reforming of methane on Ni-based pyrochlore catalyst. *Appl. Catal. A: Gen.* 2016, 517, 211-216.
3. Olah, G. A.; Goeppert, A.; Czaun, M.; Mathew, T.; May, R. B.; Prakash, G. K. Single step bi-reforming and oxidative bi-reforming of methane (natural gas) with steam and carbon dioxide to metgas (CO—2$H_2$) for methanol synthesis: self-sufficient effective and exclusive oxygenation of methane to methanol with oxygen. *J. Am. Chem. Soc.* 2015, 137, 8720-8729.
4. Noureldin, M. M. B.; Elbashir, N. O.; Gabriel, K. J.; El-Halwagi, M. M. A Process Integration Approach to the Assessment of $CO_2$ Fixation through Dry Reforming. *ACS Sustainable Chem. Eng.* 2015, 3, 625-636.
5. Walker, D. M.; Pettit, S. L.; Wolan, J. T.; Kuhn, J. N. Synthesis gas production to desired hydrogen to carbon monoxide ratios by tri-reforming of methane using Ni—MgO—(Ce,Zr)$O_2$ catalysts. *Appl. Catal. A: Gen.* 2012, 445-446, 61-68.
6. Bemani, M.; Aboosadi, Z. A. A dynamic model on the tri-reformer fixed-bed reactor to prepare synthesis gas required to product methanol. *J. Fundam. Appl. Sci.* 2016, 8, 2918-2932.
7. Song, C.; Pan, W. Tri-reforming of methane: a novel concept for catalytic production of industrially useful synthesis gas with desired $H_2$/CO ratios. *Catal. Tod.* 2004, 98, 463-484.
8. Balzarotti, R.; Italiano, C.; Pino, L.; Cristiani, C.; Vita, A. Ni/$CeO_2$-thin ceramic layer depositions on ceramic monoliths for syngas production by Oxy Steam Reforming of biogas. *Fuel Process. Technol.* 2016, 149, 40-48.
9. Xu, Y.; Ma, Y.; Demura, M.; Hirano, T. Enhanced catalytic activity of $Ni_3Al$ foils towards methane steam reforming by water vapor and hydrogen pretreatments. *Int. J. Hydrogen Energy* 2016, 41, 7352-7362.
10. Aasberg-Petersen, K.; Hansen, J.-H. B.; Christensen, T. S.; Dybkjaer, I.; Christensen, P. S.; Nielsen, C. S.; Madsen, S. W.; Rostrup-Nielsen, J. R. Technologies for large-scale gas conversion. *Appl. Catal. A: Gen.* 2001, 221, 379-387.
11. Kahle, L. C. S.; Roussiere, T.; Maier, L.; Herrera Delgado, K.; Wasserschaff, G.; Schunk, S. A.; Deutschmann, O. Methane dry reforming at high temperature and elevated pressure: impact of gas-phase reactions. *Ind. Eng. Chern. Res.* 2013, 52, 11920-11930.
12. Farrauto, R. J.; Armor, J. N. Moving from discovery to real applications for your catalyst. *Appl. Catal. A: Gen.* 2016, 527, 182-189.
13. Roy, P. S.; Park, C. S.; Raju, A. S. K.; Kim, K. Steam-biogas reforming over a metal-foam-coated (Pd—Rh)/($CeZrO_2$—$Al_2O_3$) catalyst compared with pellet type alumina-supported Ru and Ni catalysts. *J. $CO_2$ Util.* 2015, 12, 12-20.
14. Vita, A.; Cristiano, G.; Italiano, C.; Pino, L.; Specchia, S. Syngas production by methane oxy-steam reforming on Me/$CeO_2$ (Me=Rh, Pt, Ni) catalyst lined on cordierite monoliths. *Appl. Catal. B: Environ.* 2015, 162, 551-563.
15. Garcia-Vargas, J. M.; Valverde, J. L.; Diez, J.; Dorado, F.; Sanchez, P. Catalytic and kinetic analysis of the methane tri-reforming over a Ni—Mg/β-SiC catalyst. *Int. J. Hydrogen Energy* 2015, 40, 8677-8687.
16. Zhao, X.; Ngo, H. T.; Walker, D. M.; Weber, D.; Maiti, D.; Cimenler, U.; Petrov, A. D.; Joseph, B.; Kuhn, J. N. Tri-reforming of surrogate biogas over Ni/Mg/ceria-zirconia/alumina pellet catalysts. *Chem. Eng. Comm.* 2017, Submitted.
17. Fogler, H. Elements of chemical reaction engineering. *Third edition* 1999.
18. Cimenler, U.; Joseph, B.; Kuhn, J. N. Effect of zeolite membrane shell thickness on reactant selectivity for hydrocarbon steam reforming using layered catalysts. *Energy Fuels* 2016, 30, 5300-5308.
19. Zhan, Z.; Song, L.; Liu, X.; Jiao, J.; Li, J.; He, H. Effects of synthesis methods on the performance of Pt+Rh/$Ce_{0.6}Zr_{0.4}O_2$ three-way catalysts. *J. Environ. Sci.* 2014, 26, 683-693.
20. Liu, J.; Hu, H.; Jin, L.; Wang, P.; Zhu, S. Integrated coal pyrolysis with $CO_2$ reforming of methane over Ni/MgO catalyst for improving tar yield. *Fuel Process. Technol.* 2010, 91, 419-423.
21. He, D.; Luo, Y.; Tao, Y.; Strezov, V.; Nelson, P.; Jiang, Y. Promoter effects on nickel-supported magnesium oxide catalysts for the carbon dioxide reforming of methane. *Energy Fuels* 2016, 31, 2353-2359.
22. Chen, L. F.; Gonzalez, G.; Wang, J. A.; Noreña, L. E.; Toledo, A.; Castillo, S.; Morán-Pineda, M. Surfactant-controlled synthesis of Pd/$Ce_{0.6}Zr_{0.4}O_2$ catalyst for NO reduction by CO with excess oxygen. *Appl. Surf. Sci.* 2005, 243, 319-328.
23. Sukonket, T.; Khan, A.; Saha, B.; Ibrahim, H.; Tantayanon, S.; Kumar, P.; Idem, R. Influence of the catalyst preparation method, surfactant amount, and steam on $CO_2$ reforming of $CH_4$ over 5Ni/$Ce_{0.6}Zr_{0.4}O_2$ catalysts. *Energy Fuels* 2011, 25, 864-877.
24. Stelte, W.; Holm, J. K.; Sanadi, A. R.; Barsberg, S.; Ahrenfeldt, J.; Henriksen, U. B. Fuel pellets from biomass: The importance of the pelletizing pressure and its dependency on the processing conditions. *Fuel* 2011, 90, 3285-3290.
25. Elsayed, N. H.; Roberts, N. R. M.; Joseph, B.; Kuhn, J. N. Low temperature dry reforming of methane over Pt—Ni—Mg/ceria-zirconia catalysts. *Appl. Catal. B: Environ.* 2015, 179, 213-219.
26. Vasiliades, M. A.; Makri, M. M.; Djinović, P.; Erjavec, B.; Pintar, A.; Efstathiou, A. M. Dry reforming of methane over 5 wt % Ni/$Ce_{1-x}Pr_xO_{2-\delta}$ catalysts: Performance and characterisation of active and inactive carbon by transient isotopic techniques. *Appl. Catal. B: Environ.* 2016, 197, 168-183.
27. Li, W.; Zhao, Z.; Jiao, Y. Dry reforming of methane towards CO-rich hydrogen production over robust supported Ni catalyst on hierarchically structured monoclinic zirconia nanosheets. *Int. J. Hydrogen Energy* 2016, 41, 17907-17921.
28. Xiang, X.; Zhao, H.; Yang, J.; Zhao, J.; Yan, L.; Song, H.; Chou, L. Nickel based mesoporous silica-ceria-zirconia composite for carbon dioxide reforming of methane. *Appl. Catal. A: Gen.* 2016, 520, 140-150.
29. Escritori, J. C.; Dantas, S. C.; Soares, R. R.; Hori, C. E. Methane autothermal reforming on nickel-ceria-zirconia based catalysts. *Catal. Comm.* 2009, 10, 1090-1094.
30. Dong, W.-S.; Roh, H.-S.; Jun, K.-W.; Park, S.-E.; Oh, Y.-S. Methane reforming over Ni/Ce—$ZrO_2$ catalysts: effect of nickel content. *Appl. Catal. A: Gen.* 2002, 226, 63-72.

31. Roh, H.-S.; Jun, K.-W.; Dong, W.-S.; Chang, J.-S.; Park, S.-E.; Joe, Y.-I. Highly active and stable Ni/Ce—$ZrO_2$ catalyst for $H_2$ production from methane. *J. Molec. Catal. A: Chem.* 2002, 181, 137-142.
32. Kumar, P.; Sun, Y.; Idem, R. O. Nickel-based ceria, zirconia, and ceria-zirconia catalytic systems for low-temperature carbon dioxide reforming of methane. *Energy Fuels* 2007, 21, 3113-3123.
33. Diskin, A. M.; Cunningham, R. H.; Ormerod, R. M. The oxidative chemistry of methane over supported nickel catalysts. *Catal. Tod.* 1998, 46, 147-154.
34. Jacobs, G.; Williams, L.; Graham, U.; Sparks, D.; Davis, B. H. Low-temperature water-gas shift: in-situ DRIFTS-reaction study of a $Pt/CeO_2$ catalyst for fuel cell reformer applications. *J. Phys. Chem. B* 2003, 107, 10398-10404.
35. Busca, G. Infrared studies of the reactive adsorption of organic molecules over metal oxides and of the mechanisms of their heterogeneously-catalyzed oxidation. *Catal. Tod.* 1996, 27, 457-496.
36. Lavalley, J. C. Infrared spectrometric studies of the surface basicity of metal oxides and zeolites using adsorbed probe molecules. *Catal. Tod.* 1996, 27, 377-401.
37. Ashok, J.; Ang, M. L.; Kawi, S. Enhanced activity of $CO_2$ methanation over $Ni/CeO_2$—$ZrO_2$ catalysts: Influence of preparation methods. *Catal. Tod.* 2017, 281, 304-311.
38. Liu, J.; Bing, W.; Xue, X.; Wang, F.; Wang, B.; He, S.; Zhang, Y.; Wei, M. Alkaline-assisted Ni nanocatalysts with largely enhanced low-temperature activity toward $CO_2$ methanation. *Catal. Sci. Tech.* 2016, 6, 3976-3983.
39. Kouva, S.; Andersin, J.; Honkala, K.; Lehtonen, J.; Lefferts, L.; Kanervo, J. Water and carbon oxides on monoclinic zirconia: experimental and computational insights. *Phys. Chem. Chem. Phys.* 2014, 16, 20650-20664.
40. Guo, J.; Lou, H.; Mo, L.; Zheng, X. The reactivity of surface active carbonaceous species with $CO_2$ and its role on hydrocarbon conversion reactions. *J. Molec. Catal. A: Chem.* 2010, 316, 1-7.
41. Chen, S.; Cao, T.; Gao, Y.; Li, D.; Xiong, F.; Huang, W. Probing surface structures of $CeO_2$, $TiO_2$, and $Cu_2O$ nanocrystals with CO and $CO_2$ chemisorption. *J. Phys. Chem. C* 2016, 120, 21472-21485.
42. Soykal, I. I.; Sohn, H.; Singh, D.; Miller, J. T.; Ozkan, U. S. Reduction characteristics of ceria under ethanol steam reforming conditions: effect of the particle size. *ACS Catal.* 2014, 4, 585-592.
43. Narasimharao, K.; Ali, T. T. Catalytic oxidative cracking of propane over nanosized gold supported $Ce_{0.5}Zr_{0.5}O_2$ catalysts. *Catal. Lett.* 2013, 143, 1074-1084.
44. Kumar, V. V.; Naresh, G.; Sudhakar, M.; Anjaneyulu, C.; Bhargava, S. K.; Tardio, J.; Reddy, V. K.; Padmasri, A. H.; Venugopal, A. An investigation on the influence of support type for Ni catalysed vapour phase hydrogenation of aqueous levulinic acid to g-valerolactone. *RSC Adv.* 2016, 6, 9872-9879.
45. Du, X.; France, L. J.; Kuznetsov, V. L.; Xiao, T.; Edwards, P. P.; AlMegren, H.; Bagabas, A. Dry reforming of methane over $ZrO_2$-supported Co—Mo carbide catalyst. *App. Pet. Res.* 2014, 4, 137-144.
46. Parry, E. P. An infrared study of pyridine adsorbed on acidic solids. Characterization of surface acidity. *J. Catal.* 1963, 2, 371-379.
47. Al-Fatesh, A. S.; Naeem, M. A.; Khan, W. U.; Abasaeed, A. E.; Fakeeha, A. H. Effect of nano-support and type of active metal on reforming of $CH_4$ with $CO_2$. *J. Chin. Chem. Soc.* 2014, 61, 461-470.
48. Wang, C.; Sun, N.; Wei, W.; Zhao, Y. Carbon intermediates during $CO_2$ reforming of methane over $NiCaOZrO_2$ catalysts: A temperature-programmed surface reaction study. *Int. J. Hydrogen Energy* 2016, 41, 19014-19024.
49. Xu, S.; Wang, X. Highly active and coking resistant $Ni/CeO_2$—$ZrO_2$ catalyst for partial oxidation of methane. *Fuel* 2005, 84, 563-567.
50. Schulz, L. A.; Kahle, L. C. S.; Delgado, K. H.; Schunk, S. A.; Jentys, A.; Deutschmann, O.; Lercher, J. A. On the coke deposition in dry reforming of methane at elevated pressures. *Appl. Catal. A: Gen.* 2015, 504, 599-607.

Example 3

Cylindrical $NiMg/Ce_{0.6}Zr_{0.4}O_2$ pellet catalysts with two different sizes (large: radius=1.59 mm; and small: radius=0.75 mm) were produced by extrusion of powder catalysts. The small catalyst pellets had a higher specific surface area, pore volume, average pore size, radial crush strength, and resistance to breakage than the large ones. Tri-reforming tests with surrogate biogas were conducted at 3 bar and 882° C., with the feed molar ratios of $CH_4$:$CO_2$:air fixed at 1.0:0.7:0.95 and the $H_2O/CH_4$ molar feed ratio (0.35-1.16) varied. The small catalyst pellets exhibited lower internal mass transfer resistance and higher coking resistance, compared to the large ones. $CO_2$ conversion decreased and $H_2$/CO molar ratio increased with the increase of $H_2O/CH_4$ molar feed ratio, which are consistent with the trends predicted by thermodynamic equilibrium calculations. The results indicate that the $NiMg/Ce_{0.6}Zr_{0.4}O_2$ catalyst pellets are promising for commercial scale applications.

Mechanical strength of the solid catalysts plays a significant role in the industrial applications. Often solid catalysts must be "formed" into pellets to meet pressure drop restrictions in packed tubular reactors. Manufacturing of pellet catalysts is cheaper than monolith catalysts. The pellets must be designed to be mechanically stable when subject to thermal and mechanical stresses during operation. The objective of this study was to evaluate the effect of pellet synthesis parameters on mechanical stability. Cylindrical $NiMg/Ce_{0.6}Zr_{0.4}O_2$ pellet catalysts used in methane reforming applications were synthesized. The binder amount, water amount, and pH of solvent had some effect on the physicochemical properties and mechanical strength of catalysts. Too much or less binder or water, and high slurry pH can decrease the crush strength and breakage resistance of catalysts. The highest mechanical strength of the catalyst was obtained when the ratio of binder and solvent to $NiMg/Ce_{0.6}Zr_{0.4}O_2$ powders was 0.22 g:2.5 mL:9 g at pH=1. The tri-reforming activity (e.g., $CH_4$ and $CO_2$ conversions, and $H_2$/CO molar ratio) of the catalyst is not impacted significantly when the forming process was optimized to improve mechanical strength.

Experimental

Catalyst Preparation $NiMg/Ce_{0.6}Zr_{0.4}O_2$ powders were synthesized using a co-precipitation method (to prepare $Ce_{0.6}Zr_{0.4}O_2$) and then a wet impregnation method (to load Ni and Mg to the $Ce_{0.6}Zr_{0.4}O_2$ support), shown in our previous paper [14]. The $NiMg/Ce_{0.6}Zr_{0.4}O_2$ powders were milled for 1 h at a speed of 300 rpm using a Planetary Mono Mill "Pulverisette 6" (Fritsch). The ball milled $NiMg/Ce_{0.6}Zr_{0.4}O_2$ powders were mixed with deionized (DI) water and gum guar (#G4129, Sigma-Aldrich, Co.). The mixture was then extruded using a press die (inside diameter: 1.50 mm)

through a Bench Top Auto Press (Carver, Inc.) at a force of 2,268 kg and a speed of 15%. The extruded pellets were dried at 106° C. for 12 h and calcined at 500° C. for 4 h in air with a ramp rate of 5° C./min.

Catalyst Characterization

The NiMg/Ce$_{0.6}$Zr$_{0.4}$O$_2$ catalysts were characterized using various techniques including X-ray Diffractometer (XRD, Bruker AXS), N$_2$ adsorption-desorption analyzer (Quantachrome Autosorb-iQ), Diffuse Reflectance Infrared Fourier transform spectroscopy (DRIFTS), temperature-programmed reduction (TPR, Cirrus MKS mass spectrometer), and transmission electron microscopy (TEM). The XRD pattern range were 5°-90° (2θ). The Cu Kα radiation, Lynxeye detector, 40 mA, and 40 kV were used.

For the N$_2$ adsorption-desorption measurement, the sample was first outgassed at 200° C. for 12 h before being loaded into an analysis station. The PIP$_0$ range of 0.05-0.30 was used to determine the specific surface area using Brunauer-Emmett-Teller (BET). The average pore size and the pore volume were determined using a Barret-Joyner-Halenda (BJH) method. For TPR analysis, the catalysts were pretreated under helium at 110° C. for 30 min then cooled. The catalysts were heated to 950° C. at a ramp rate of 10° C./min with the gas mix (5% H$_2$/He).

The surface acidity and basicity of catalysts (placed in a sample cup within a reactor) were measured through DRIFTS using a Nicolet IS50 spectrometer equipped with a reactor cell from Harrick Scientific. The catalysts were reduced at 860° C. for ~1 h in a 10% H$_2$/N$_2$ (H$_2$=50 sccm; N$_2$=450 sccm) to remove any surface adsorbed oxygen species and convert NiOx species to Ni before loading to the DRIFTS cell. Prior to analysis, the samples were activated in the reactor cell under Ar (40 sccm) while being heated to 250° C. at 2.5° C./min to remove any surface adsorbed gases on the samples. After activation, the sample was cooled down to room temperature in presence of argon flow. CO$_2$ was flown over this clean sample along with Argon (5 sccm of CO$_2$ and 30 sccm of Ar) for 15 min. Post CO$_2$ adsorption, argon was solely flown for 30 min to purge out excess gas phase CO$_2$ from the DRIFTS cell. The sample was heated to 200° C. under Ar flow, and the spectra was recorded at room temperature, 100° C. and 200° C. The gases used were of ultra-high purity (UHP) grade obtained from Airgas. All the temperature-programmed desorption (TPD) spectra were recorded at a resolution of 0.241 cm$^{-1}$ and consisted of 150 scans.

High resolution transmission electron microscopy (HR-TEM) was carried out using a Tecnai F20 microscope operated at 200 kV. Using a line resolution of 0.102 nm and 26° diffraction angle, the dominant facets of both MgNiO$_2$ and Ce$_{0.6}$Zr$_{0.4}$O$_2$ were revealed. The single pellet axial crush strength of catalysts was measured using a Dake Hydraulic Press equipped with a force sensor and software using the standard test methods ASTM D4179 and ASTM D6175 (note: three individual pellets were tested due to the limitation of the catalyst amount).

The drop test was determined to indicate the catalyst breakage resistance according to the below procedures. First, the drop height could be between 0.20 m and 6.40 m. The drop height in this study was selected as 0.73 m. Second, the catalyst sample size was 3-10 pellets in this study due to the catalyst amount limitation. Third, the drop surface was a flat metal (copper) plate positioned horizontally. A long glass tube was used and placed on the flat metal plate. Fourth, the pellet sample (horizontally) was dropped from the top of the glass tube. Before and after the drop, the length and diameter of the pellet sample were measured using a caliper. The length of the pellets before the drop was remained as around 4 mm. The change of the ratio of length to diameter of pellets was calculated. Some errors of the data could happen if the catalyst powder, binder and solution were not mixed evenly prior to the extrusion. The evaporation of water may cause some cracks inside the catalysts, which could affect the data consistence. In addition, more pellets (~200 particles) are better to ensure the data accuracy. Furthermore, if the dust, chips and fines on the pellets are not completely cleaned, they may skew the results [18].

Tri-Reforming

Tri-reforming tests were run at 3 bar (standard deviation: 0.14 bar) in a fixed-bed reactor. The 2.9 g of catalyst was loaded in the reactor tube with SiC support on both ends. More details about this reforming reactor system (reactor tube material/size/limitation, thermocouple, water pump, etc.), gas cylinders, mass flow controllers, are in our previous research papers [14]. After the reduction of catalysts (860° C. for 1.0 h with flowing N$_2$=450 sccm and H$_2$=50 sccm), surrogate gases (CH$_4$, CO$_2$, steam and air) were introduced to the reformer with the reaction temperature of 857° C. (standard deviation: 4° C.). The inlet molar ratio of CH$_4$/CO$_2$/air was 1.0:0.7:0.95. Two different steam/CH$_4$ molar ratios were set as 0.71 and 0.91, respectively. The GHSV varied between 22,700 and 24,100 h$^{-1}$. The time-on-stream for reaching steady-state was about 45 min. Each tri-reforming test was duplicated and the average values were presented. The gases including CH$_4$, CO$_2$, H$_2$, CO, and air (steam was removed through a condenser after the reformer) were analyzed using a Gas chromatography-mass spectrometer (GC-MS, GC: 6890N, MS: 5975C, Agilent Technologies) with N$_2$ as an internal standard gas. The element (carbon, hydrogen, or oxygen) balance was determined using the total moles of the element out as products divided by the total moles of the element in as reactants. The overall carbon, hydrogen, and oxygen mass balance for all tri-reforming runs was 82% (standard deviation: 1.4%), 90% (standard deviation: 2.1%), and 92% (standard deviation: 2.8%), respectively.

The Thiele modulus ($\Phi_n$) and Weisz-Prater criterion ($C_{WP}$) were calculated using the following equations to investigate the internal mass transfer limitations:

$$\Phi_n = C_L * \sqrt{\frac{(-r_A) * q_c}{D_e * C_{AS}}} \tag{13}$$

$$C_{wp} = \frac{(-r_{A'}) * q_c * C_L^2}{D_e * C_{As}} \tag{14}$$

$$C_L = \frac{R * L}{2 * (R + L)} \tag{15}$$

where R is the radius of the catalyst cylinder, L is the length of the catalyst cylinder, $C_L$ is the critical length of the catalyst cylinder, $-r_A'$ is the mass-normalized reaction rate, $q_c$ is the catalyst density, $D_e$ is the effective diffusivity, and $C_{As}$ is the reactant concentration external to the catalyst. The effectiveness factor was estimated based on a first-order reaction curve of "effectiveness factor vs Thiele modulus" [14,19,20].

Results and Discussion

Catalyst Strength Optimization

Figure 11:
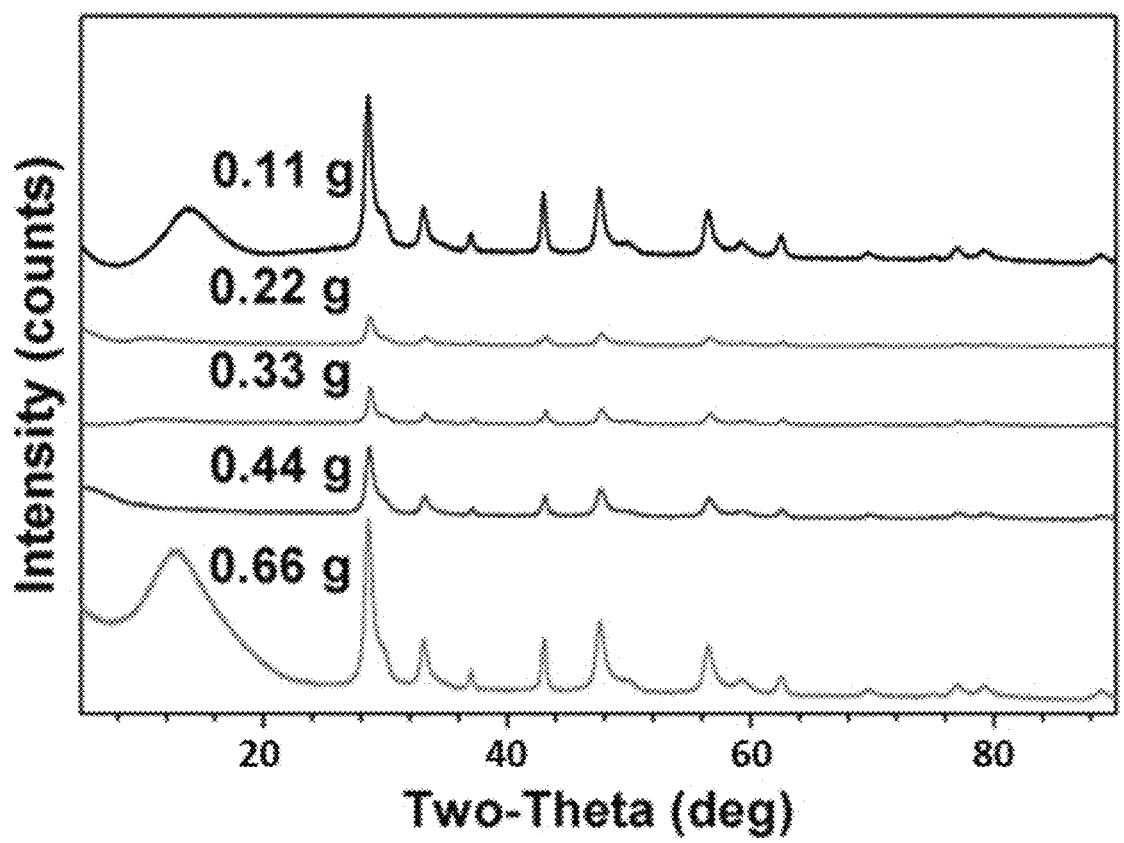
FIG. 11 shows the XRD profiles of pellet catalysts with different binder amounts (NiMg/$Ce_{0.6}Zr_{0.4}O_2$ powders=9 g, water=2.5 g, pH=7).

Effect of binder amount on catalyst properties. To investigate the effect of binder amount on the crystal structure, mass ratio of binder to NiMg/$Ce_{0.6}Zr_{0.4}O_2$ powders at 0.11:9, 0.22:9, 0.33:9, 0.44:9, and 0.66:9 were prepared. The mass ratio of water to NiMg/$Ce_{0.6}Zr_{0.4}O_2$ powders was fixed as 2.5:9. The diffraction lines at 2θ=28.6°, 33.1°, 47.6°, 56.5°, 59.2°, 69.6° and 77.0° (FIG. 11) indicated the $Ce_{0.6}Zr_{0.4}O_2$ phase (cubic crystal) in all catalysts, based on Joint Committee on Power Diffraction Standards (JCPDS) file No. 00-038-1439. This indicates that $ZrO_2$ can be incorporated into the $CeO_2$ lattice to form a solid solution. The (Mg, Ni)O phase in all catalysts was shown at 2θ=37.0°, 43.0° and 62.5°, according to JCPDS file No. 00-024-0712. The formation of (Mg, Ni)O structure indicates the incorporation of Ni into the MgO structure [14]. There is no obvious peak position difference between these samples, indicating the binder amount does not have a significant effect on the crystal structure of NiMg/$Ce_{0.6}Zr_{0.4}O_2$ catalysts. However, there are some differences in peak intensities, indicating the different crystallite size in each catalyst. Similar research was studied by Badoga et al. [17] that the different binder loadings (10, 15, and 20 wt. %) affected the peak intensities, but not the peak positions.

The BET surface areas of these pellets were in the range of 14-25 $m^2g^{-1}$, shown in Table 12. The BJH pore volumes of these pellets were in the range of 0.03-0.06 $cm^3$/g. When the mass ratio of binder to NiMg/$Ce_{0.6}Zr_{0.4}O_2$ powder was 0.33:9, the BET surface area and BJH pore volume were both the highest. The BJH average pore diameters of these pellets (96-97 Å) were not affected by the binder amount. Badoga et al. [17] also found that the binder (bentonite) had an effect on the surface area and pore volume of MoKCuFe/CNT (carbon nanotubes) pellet catalysts. Many catalytic masses cannot be shaped without the addition of binders. A binder can influence the rheological properties and characteristics of catalysts [15]. The binder can create cracks in the catalyst during calcination process due to the gas evolution derived from the thermal decomposition of the binder [16]. The binder is soluble in water, indicating the evaporation of water during calcination could create cracks in the catalyst.

TABLE 12

$N_2$ physisorption results of pellet catalysts with different binder amounts (NiMg/$Ce_{0.6}Zr_{0.4}O_2$ powders = 9 g, water = 2.5 g, pH = 7).

| Binder (g) | BET surface area ($m^2g^{-1}$) | BJH pore volume ($cm^3$/g) | BJH average pore diameter (Å) |
| --- | --- | --- | --- |
| 0.11 | 18 | 0.04 | 96 |
| 0.22 | 19 | 0.05 | 96 |
| 0.33 | 25 | 0.06 | 97 |
| 0.44 | 14 | 0.03 | 96 |
| 0.66 | 16 | 0.04 | 96 |

Figure 12:
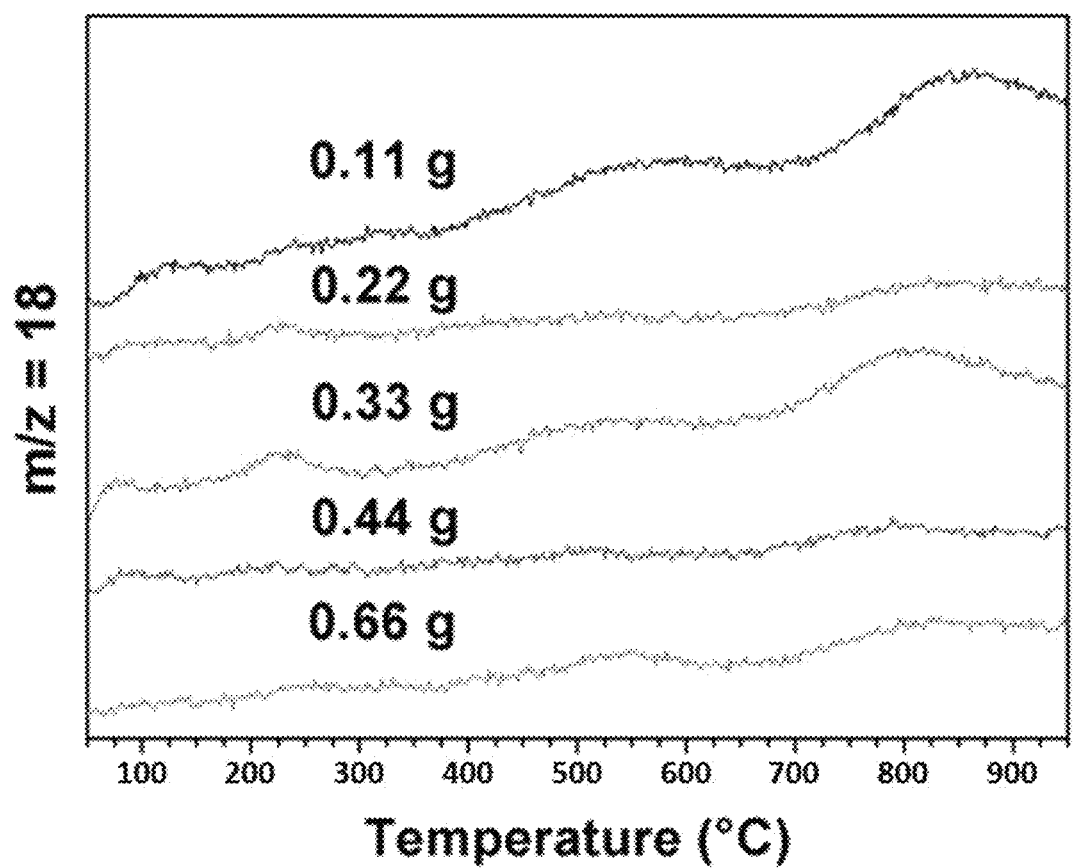
FIG. 12 shows the TPR profiles of pellet catalysts with different binder amounts (NiMg/$Ce_{0.6}Zr_{0.4}O_2$ powders=9 g, water=2.5 g, pH=7).

The catalysts mainly showed several reduction peaks (FIG. 12). The lower temperature reduction peaks (e.g. 559° C.) are possibly attributed to NiO with weak interaction with $Ce_{0.6}Zr_{0.4}O_2$ support and Mg. The higher temperature reduction peaks (e.g. 844° C.) are possibly attributed to NiO with strong interaction with $Ce_{0.6}Zr_{0.4}O_2$ support and Mg. The ease in reducibility of active metal plays a significant role in the catalyst activation [17]. The lower reduction peaks were in the temperature range of 513-559° C. The higher reduction peaks were in the temperature range of 788-844° C. The low and high temperature reduction peaks are likely attributed to NiO weekly and strongly interacting with Mg and $Ce_{0.6}Zr_{0.4}O_2$ support, respectively [14]. The results suggest that the binder loading has some effect on the reduction temperature of the NiMg/$Ce_{0.6}Zr_{0.4}O_2$ pellets. Similar results were found by Badoga et al. [17] that the binder had an effect on the reduction temperature of MoKCuFe/CNT pellet catalysts.

When the mass ratio of binder to NiMg/$Ce_{0.6}Zr_{0.4}O_2$ powders was equal to or lower than 0.11:9, the extruded pellets were wet and attached together, shown in Table 13. When the mass ratio of binder to NiMg/$Ce_{0.6}Zr_{0.4}O_2$ powders was equal to or higher than 0.22:9, the extruded pellets were dry and individually separated. The radial crush strength of pellets increased as the mass ratio of binder to NiMg/$Ce_{0.6}Zr_{0.4}O_2$ powder increased to 0.22:9. Similar results were found by Badoga et al. [17] that the mechanical strength of the MoKCuFe/CNT pellet catalysts increased with the increase of the binder loading from 10 wt. % to 20 wt. %. However, the radial crush strength of the NiMg/$Ce_{0.6}Zr_{0.4}O_2$ pellets decreased with the increase of the mass ratio of binder to NiMg/$Ce_{0.6}Zr_{0.4}O_2$ powders. The binder can absorb some water. Fine powders are typically formed into pellets, beads, or granules with an inert binder for better mechanical strength and handling [21]. However, too much binder may cause the slurry too dry to form shapes. The binder has an influence on the viscosity and adhesion properties of catalysts [16].

TABLE 13

The radial crush strength for NiMg/$Ce_{0.6}Zr_{0.4}O_2$ pellet catalysts with different binder amounts (average ± standard deviation, NiMg/$Ce_{0.6}Zr_{0.4}O_2$ powders = 9 g, water = 2.5 g, pH =7)

| Binder (g) | Radial crush strength (N) | Note |
| --- | --- | --- |
| 0 | N/A | Very wet: the pellets attach together |
| 0.11 | 0.35 ± 0.01 | Slightly wet: the pellets slightly attach together |
| 0.22 | 1.55 ± 0.02 | |
| 0.33 | 1.28 ± 0.06 | |
| 0.44 | 1.06 ± 0.02 | Easy to take out the press parts after pressing |
| 0.66 | 0.54 ± 0.01 | Hard to take out the press parts after pressing: need wrenches to help |

Table 14 shows the drop test data for NiMg/$Ce_{0.6}Zr_{0.4}O_2$ pellet catalysts. The higher the change of the ratio of length to diameter, the lower the breakage resistance. There is a trend that the breakage resistance decreased first and then increased with the increase of the mass ratio of binder to NiMg/$Ce_{0.6}Zr_{0.4}O_2$ powders from 0.11:9 to 0.66:9. The binder has an effect on the breakage resistance of catalysts because the binder affects the adhesion property of catalysts. However, the addition of excess amount of binder can create cracks in the catalyst during the calcination process through the gas evolution from the binder [16]. The results indicate the mass ratio of binder to NiMg/$Ce_{0.6}Zr_{0.4}O_2$ powders at 0.22:9 was the optimum ratio for achieving the highest breakage resistance.

TABLE 14

The drop test for NiMg/$Ce_{0.6}Zr_{0.4}O_2$ pellet catalysts with different binder amounts (NiMg/$Ce_{0.6}Zr_{0.4}O_2$ powders = 9 g, water = 2.5 g, pH = 7).

| Binder (g) | The change of the ratio of length to diameter (%) |
| --- | --- |
| 0.11 | 36 ± 1.4 |
| 0.22 | 6 ± 0.9 |
| 0.33 | 9 ± 1.4 |
| 0.44 | 7 ± 0.2 |
| 0.66 | 14 ± 1.1 |

Figure 13:
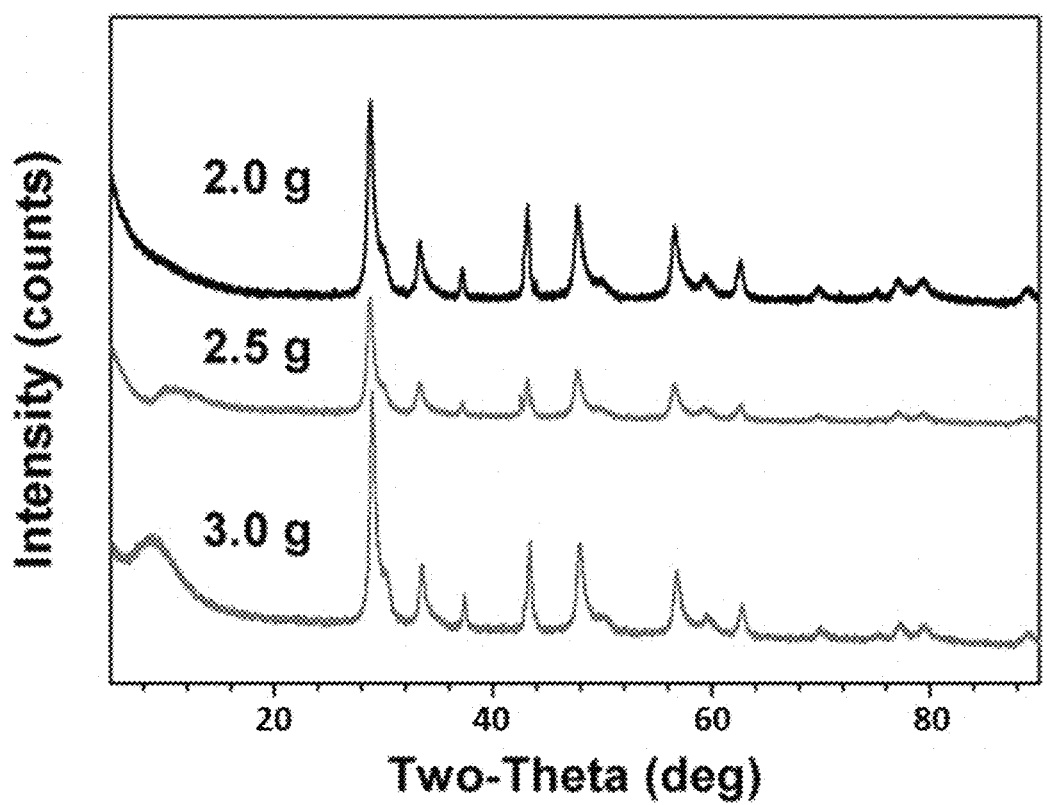
FIG. 13 shows the XRD profiles of pellet catalysts with different water amounts (NiMg/$Ce_{0.6}Zr_{0.4}O_2$ powders=9 g, binder=0.22 g, pH=7).

Effect of water amount on catalyst properties. To investigate the effect of water amount on the crystal structure, mass ratio of water to NiMg/Ce$_{0.6}$Zr$_{0.4}$O$_2$ powders at 2.0:9, 2.5:9, and 3.0:9 were prepared. There is no obvious peak position difference between these samples (FIG. 13), indicating the water amount does not a significant effect on the crystal structure of NiMg/Ce$_{0.6}$Zr$_{0.4}$O$_2$ catalysts. However, the peak intensities were different at different water amounts. Hou et al. studied the XRD patterns of Cu—ZnO catalysts obtained from different water contents (0-90%). The Cu—ZnO catalysts exhibited same peak positions, but different peak intensities. The intensity of CuO characteristic peak increased with the increase of water content, probably due to the active Cu$^0$ reacted with the oxygen in water to form Cu$^{2+}$ [22]. May-Lozano et al. found the water amount affected the XRD peak intensity of B-TiO$_2$ photocatalysts [23].

The BET surface areas of these pellets were in the range of 19-24 m$^2$g$^{-1}$ (Table 15). The BJH pore volumes of these pellets were in the range of 0.05-0.06 cm$^3$/g. The BJH average pore diameters of these pellets were in the range of 78-96 Å. The water content may have an effect of the hydrolysis of catalysts to exhibit different textural properties. Hou et al. studied the textural properties of Cu—ZnO catalysts obtained from different water contents (0-90%). The Cu—ZnO catalysts exhibited different BET surface areas and pore volumes at different water contents. The Cu—ZnO crystals tended to aggregate with increasing water content, thus resulting in a lower surface area [22]. May-Lozano et al. studied the effect of water amount on the synthesis of B—TiO$_2$ photocatalysts. The water amount (molar ratio of water to alkoxide=0.5, 1.0, 4.0, 8.0 and 16.0) has an effect on the specific surface area and average pore diameter of catalysts probably due to the hydrolysis and condensation [23]. Chandrasekar and Hartmann studied the effect of water content on the textural properties of SBA-15 extrudates. The BET surface areas, pore volumes and average pore diameters of these SBA-15 extrudates obtained with different water contents (63.2-72.0 wt. %) were in the range of 400-427 m$^2$g$^{-1}$, 0.55-0.60 cm$^3$/g, and 54-58 Å, respectively [24].

TABLE 15

N$_2$ physisorption results of pellet catalysts with different water amounts (NiMg/Ce$_{0.6}$Zr$_{0.4}$O$_2$ powders = 9 g, binder = 0.22 g, pH = 7).

| Water (g) | BET surface area (m$^2$g$^{-1}$) | BJH pore volume (cm$^3$/g) | BJH average pore diameter (Å) |
|---|---|---|---|
| 2.0 | 24 | 0.06 | 78 |
| 2.5 | 19 | 0.05 | 96 |
| 3.0 | 21 | 0.05 | 78 |

Figure 14:
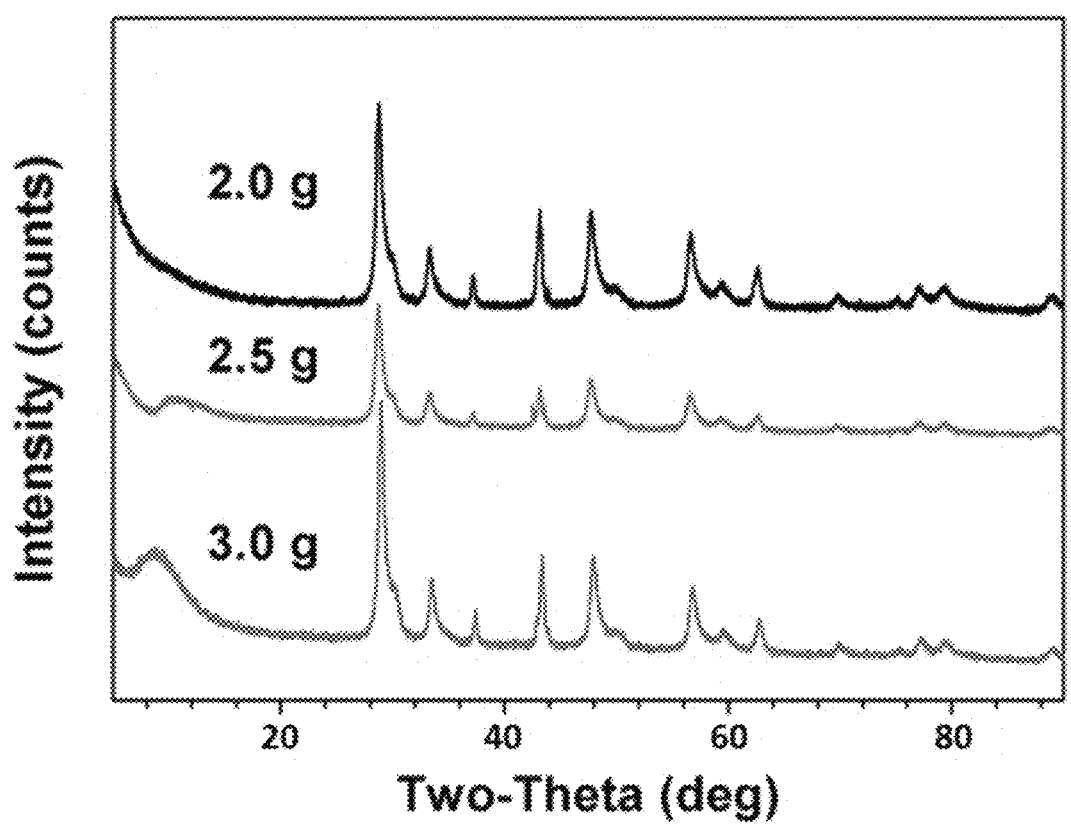
FIG. 14 shows the TPR profiles of pellet catalysts with different water amounts (NiMg/$Ce_{0.6}Zr_{0.4}O_2$ powders=9 g, binder=0.22 g, pH=7).

The lower reduction peaks were in the temperature range of 508-536° C. (FIG. 14). The higher reduction peaks were in the temperature range of 822-839° C. The results suggest that the water loading has minor effect on the reduction temperature of the NiMg/Ce$_{0.6}$Zr$_{0.4}$O$_2$ pellets. During the NiMg/Ce$_{0.6}$Zr$_{0.4}$O$_2$ paste preparation, water was used not only for combing small particles together, but also for homogeneous mixing [24].

When the mass ratio of binder to NiMg/Ce$_{0.6}$Zr$_{0.4}$O$_2$ powders was equal to or lower than 1.5:9, the slurry could not be extruded out totally or partially. There is a trend that the radial crush strength of pellets first increased and then decreased with the increase of the mass ratio of water to NiMg/Ce$_{0.6}$Zr$_{0.4}$O$_2$ powders, shown in Table 16. Some water can be absorbed by the binder to assist holding together the NiMg/Ce$_{0.6}$Zr$_{0.4}$O$_2$ powders. However, too much water may cause the extruded pellets wet, which could leave some voids during the drying and calcination process. Similar results were found by Chandrasekar and Hartmann that the crushing stress of SBA-15 extrudates increased from 3.7 to 4.7 MPa and then decreased to 1.4 MPa when the water content in the paste increased from 63.2 wt. % to 72 wt. %. A higher water content in the SBA-15 extrudates can create defects such as cracks, micro holes, and air bubbles, which resulted in the reduced mechanical strength [24].

TABLE 16

The radial crush strength for NiMg/Ce$_{0.6}$Zr$_{0.4}$O$_2$ pellet catalysts with different water amounts (average ± standard deviation, NiMg/Ce$_{0.6}$Zr$_{0.4}$O$_2$ powders = 9 g, binder = 0.22 g, pH = 7)

| Water (g) | Radial crush strength (N) | Note |
|---|---|---|
| 0.5 | N/A | Cannot be extruded out |
| 1.0 | N/A | Cannot be extruded out |
| 1.5 | 0.42 ± 0.02 | Half can be extruded out, but the rest is blocked inside the press die |
| 2.0 | 0.67 ± 0.03 | |
| 2.5 | 1.55 ± 0.02 | |
| 3.0 | 0.47 ± 0.03 | Slightly wet: the pellets slightly attach together |

The breakage resistance of pellets first increased and then decreased with the increase of the mass ratio of water to NiMg/Ce$_{0.6}$Zr$_{0.4}$O$_2$ powders, shown in Table 17. This result is consistent with the crush strength result. A suitable amount of water is helpful to hold the binder together with the NiMg/Ce$_{0.6}$Zr$_{0.4}$O$_2$ powders. Nevertheless, excess water could result in the lower breakage resistance. Chandrasekar and Hartmann found that a higher water content in the SBA-15 pellets can create defects such as micro holes, cracks, and air bubbles [24].

TABLE 17

The drop test for NiMg/Ce$_{0.6}$Zr$_{0.4}$O$_2$ pellet catalysts with different water amounts (NiMg/Ce$_{0.6}$Zr$_{0.4}$O$_2$ powders = 9 g, binder = 0.22 g, pH = 7).

| Water (g) | The change of the ratio of length to diameter (%) |
|---|---|
| 1.5 | 33 ± 1.3 |
| 2.0 | 13 ± 0.8 |
| 2.5 | 6 ± 0.9 |
| 3.0 | 17 ± 1.7 |

Figure 15:
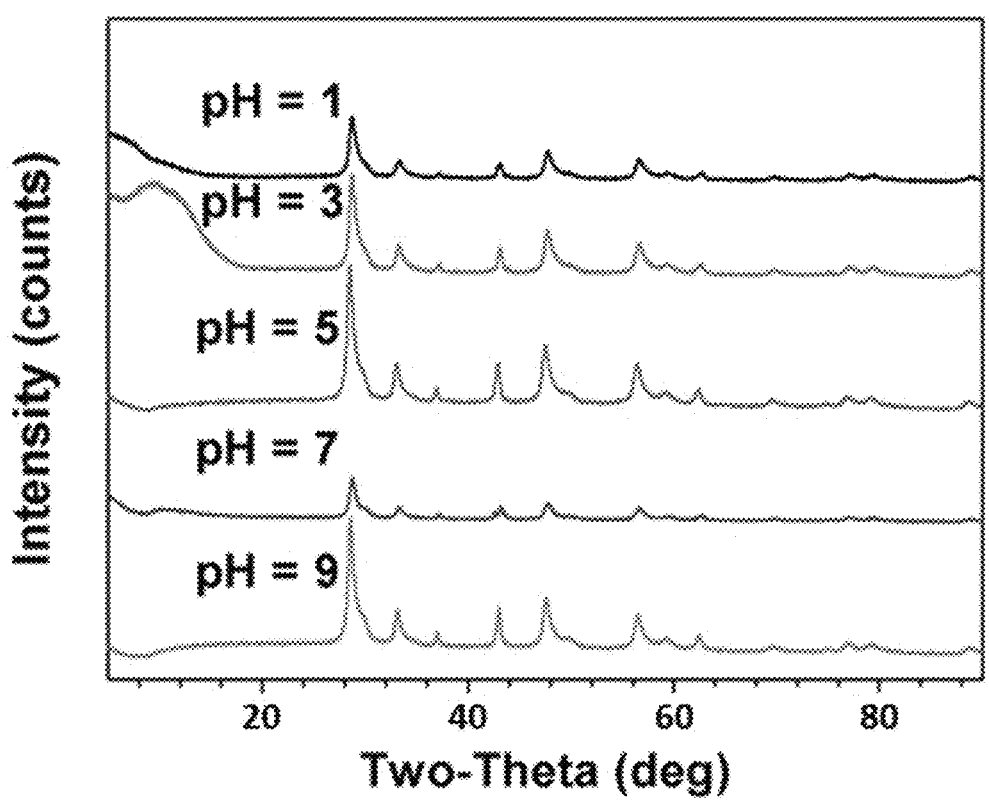
FIG. 15 shows the XRD profiles of pellet catalysts with different pH values (NiMg/$Ce_{0.6}Zr_{0.4}O_2$ powders=9 g, binder=0.22 g, solution=2.5 mL).

Effect of pH on catalyst properties. To investigate the effect of pH value on the crystal structure, the solution with different pH values at 1, 3, 5, 7, and 9 were prepared. There is no obvious peak position difference between these samples (FIG. 15), indicating the pH value does not a significant effect on the crystal structure of NiMg/Ce$_{0.6}$Zr$_{0.4}$O$_2$ catalysts. Hellgardt and Chadwick studied the effect of precipitation pH (pH=6, 7, 8, and 9) on the XRD patterns of aluminas. The pH had minor influence on the peak positions and crystallite size of aluminas [25].

The BET surface areas of these pellets were in the range of 19-32 m$^2$g$^{-1}$ (Table 18). The BJH pore volumes of these pellets were in the range of 0.05-0.08 cm$^3$/g. The BJH average pore diameters of these pellets were in the range of 78-96 Å. When the pH values were higher than 5, there is a trend that the BET surface areas of these pellets decreased. Irmawati et al. studied the effect of pH on the physicochemical properties of MoVTeNbO$_x$ catalysts. The BET surface area of MoVTeNbO$_x$ catalysts decreased from 18.0 m$^2$/g to 0.1 m$^2$/g with the increase of pH value from 1 to 7 [26]. The pH has an influence on the relative rate of hydrolysis and condensation reactions, which can affect the material structures [27].

TABLE 18

$N_2$ physisorption results of pellet catalysts with different pH values (NiMg/$Ce_{0.6}Zr_{0.4}O_2$ powders = 9 g, binder = 0.22 g, solution = 2.5 mL).

| Solution | BET surface area ($m^2g^{-1}$) | BJH pore volume ($cm^3/g$) | BJH average pore diameter (Å) |
|---|---|---|---|
| Dilute $HNO_3$, pH = 1 | 28 | 0.07 | 78 |
| Dilute $HNO_3$, pH = 3 | 32 | 0.08 | 95 |
| Dilute $HNO_3$, pH = 5 | 29 | 0.06 | 96 |
| Water, pH = 7 | 19 | 0.05 | 96 |
| Dilute $NH_3 \cdot H_2O$, pH = 9 | 21 | 0.05 | 78 |

Figure 16:
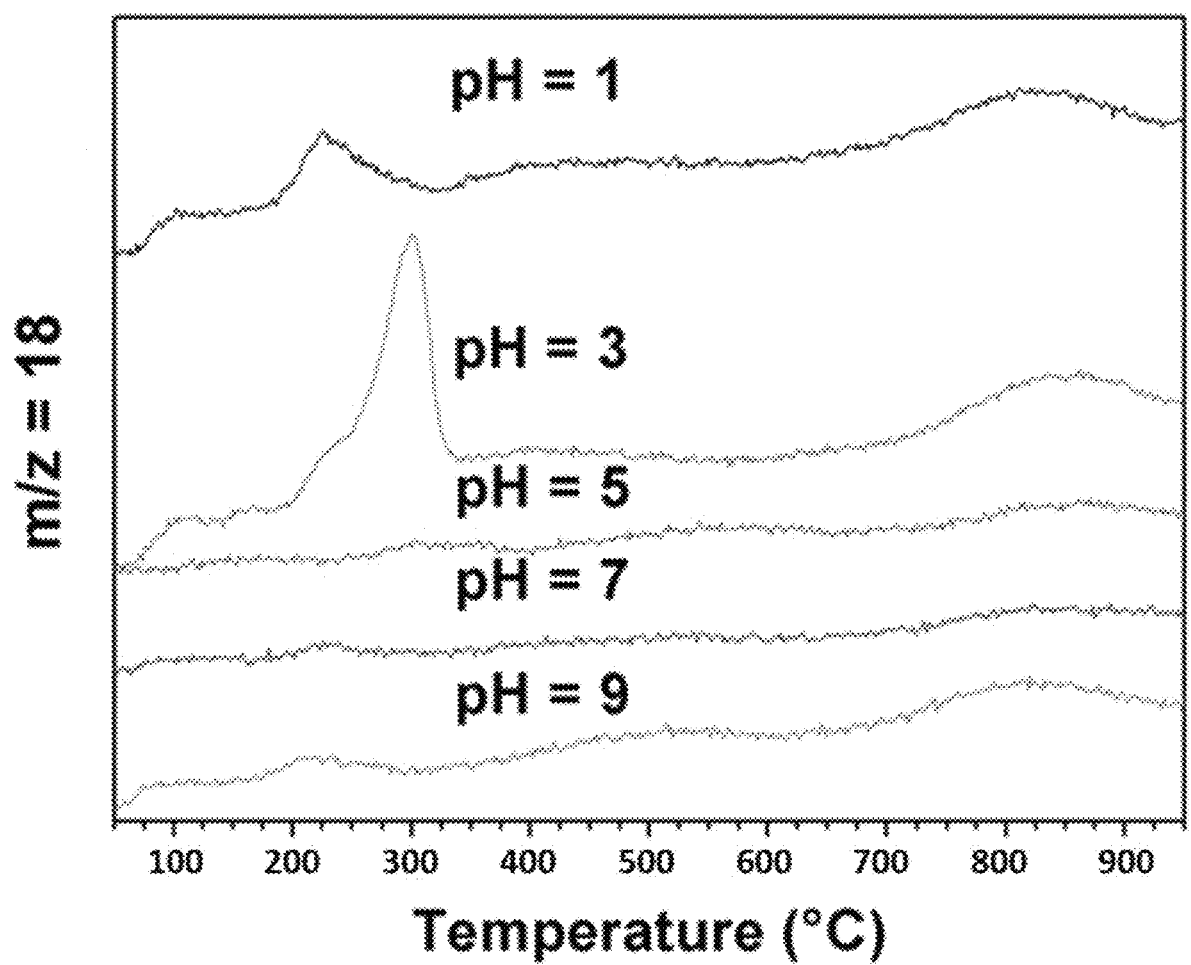
FIG. 16 shows the TPR profiles of pellet catalysts with different pH values (NiMg/$CeCe_{0.6}Zr_{0.4}O_2$ powders=9 g, binder=0.22 g, solution=2.5 mL).

The lower reduction peaks were in the temperature range of 493-541° C. (FIG. 16). The higher reduction peaks were in the temperature range of 820-843° C. When pH=3, there was an obvious reduction peak at 296° C. However, the corresponding reduction peak was at 230° C. for pH=1. The lower reduction temperature indicates the higher reducibility of the catalyst. Irmawati et al. found no clear trend in the TPR reduction profiles of $MoVTeNbO_x$ catalysts obtained from different pH values (1, 3, 5, and 7). However, the $MoVTeNbO_x$ catalysts obtained at pH=1 showed a lower reduction peak with bigger peak size than other catalysts, indicating the higher reducibility [26].

There is a trend that the radial crush strength of pellets decreased with the increase of the pH of the solvent, shown in Table 19. The highest crush strength of the NiMg/$Ce_{0.6}Zr_{0.4}O_2$ pellets was 2.33 N (1.6 N/mm), which is in the range of the minimum crush strength of alumina pellets (0.6-2.8 N/mm) [28]. However, the catalyst composition of this study is largely different from the alumina, which may cause the difference in the crush strength. The extrudate catalysts for practical application is preferred to be higher than 10 N/mm [29]. This indicates more optimization (e.g., calcination temperature, steam curing, etc.) of the pellet strength can be studied in the future. The acid or base has some effect on the performance of binder. However, too acid may cause the leaching of the active metal from the catalyst. Abdullah et al. found the pH (pH=3 5, and 7) had a significant effect on the mechanical properties of trishydrazone hydrogels. The acidic condition is helpful to enhance the mechanical strength of trishydrazone hydrogels due to the formation of branching interconnecting nanofibers that leads to a higher modulus storage [30]. Sekido et al. studied the effects of pH on the mechanical properties of dried poly[2-(diethyl-amino)ethyl methacrylate]polystyrene (PDEA-PS) latex particles. The fracture toughness of the dried particles decreased with the increase of pH (pH=3, 6, 10) [31].

TABLE 19

The radial crush strength for NiMg/$Ce_{0.6}Zr_{0.4}O_2$ pellet catalysts with different pH values (average ± standard deviation, NiMg/$Ce_{0.6}Zr_{0.4}O_2$ powders = 9 g, binder = 0.22 g, solution = 2.5 mL)

| Solution | Radial crush strength (N) |
|---|---|
| Dilute $HNO_3$, pH = 1 | 2.33 ± 0.16 |
| Dilute $HNO_3$, pH = 3 | 1.63 ± 0.09 |
| Dilute $HNO_3$, pH = 5 | 1.56 ± 0.11 |
| Water, pH = 7 | 1.55 ± 0.02 |
| Dilute $NH_3 \cdot H_2O$, pH = 9 | 0.50 ± 0.05 |

There is a trend that the breakage resistance of pellets decreased with the increase of the pH of the solvent, shown in Table 20. The acidity is helpful to remain the breakage resistance of pellets, compared with basicity. Katheria et al. found that the stability of Ni/$MgAl_2O_4$ slurry decreased with the increase of pH [16]. Abdullah et al. reported that the acidity can enhance the mechanical strength of trishydrazone hydrogels due to the formation of branching interconnecting nanofibers [30]. Based on above results, the highest mechanical strength of the catalyst was obtained when the ratio of binder and solvent to NiMg/$Ce_{0.6}Zr_{0.4}O_2$ powders was 0.22 g: 2.5 mL (pH=1): 9 g.

TABLE 20

The drop test for NiMg/$Ce_{0.6}Zr_{0.4}O_2$ pellet catalysts with different pH values (NiMg/$Ce_{0.6}Zr_{0.4}O_2$ powders = 9 g, binder = 0.22 g, solution = 2.5 mL).

| Solution | The change of the ratio of length to diameter (%) |
|---|---|
| Dilute $HNO_3$, pH = 1 | 1 ± 0.1 |
| Dilute $HNO_3$, pH = 3 | 4 ± 0.1 |
| Dilute $HNO_3$, pH = 5 | 3 ± 0.5 |
| Water, pH = 7 | 6 ± 0.9 |
| Dilute $NH_3 \cdot H_2O$, pH = 9 | 16 ± 0.2 |

Figure 17:
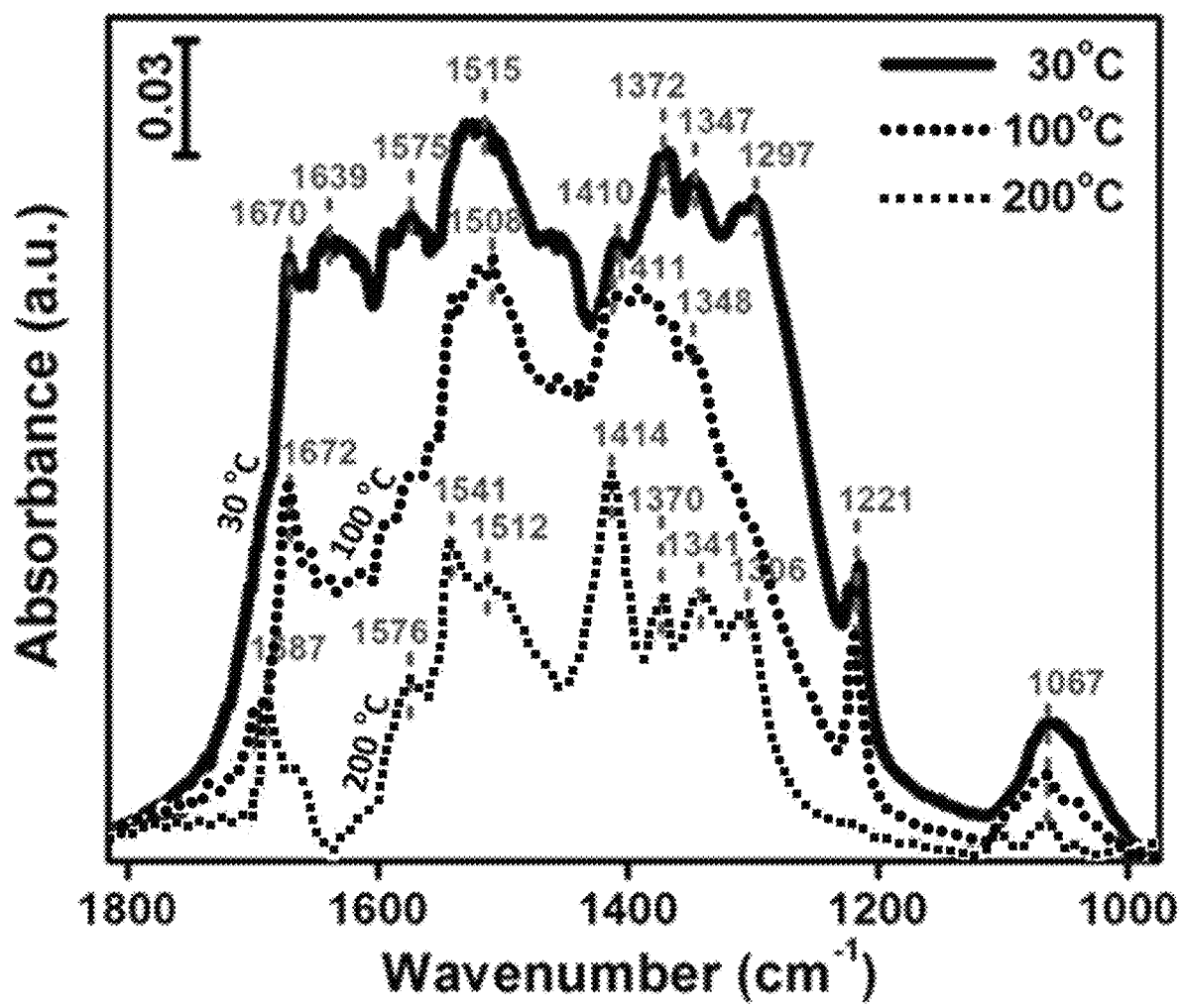
FIG. 17 shows $CO_2$ adsorption profile over NiMg/$Ce_{0.6}Zr_{0.4}O_2$ catalyst at different temperatures as obtained via TPD-DRIFTS (NiMg/$Ce_{0.6}Zr_{0.4}O_2$ powders=9 g, binder=0.22 g, solution=2.5 mL (pH=1)).
Figures 18A, 18B, 18C, 18D, 18E:
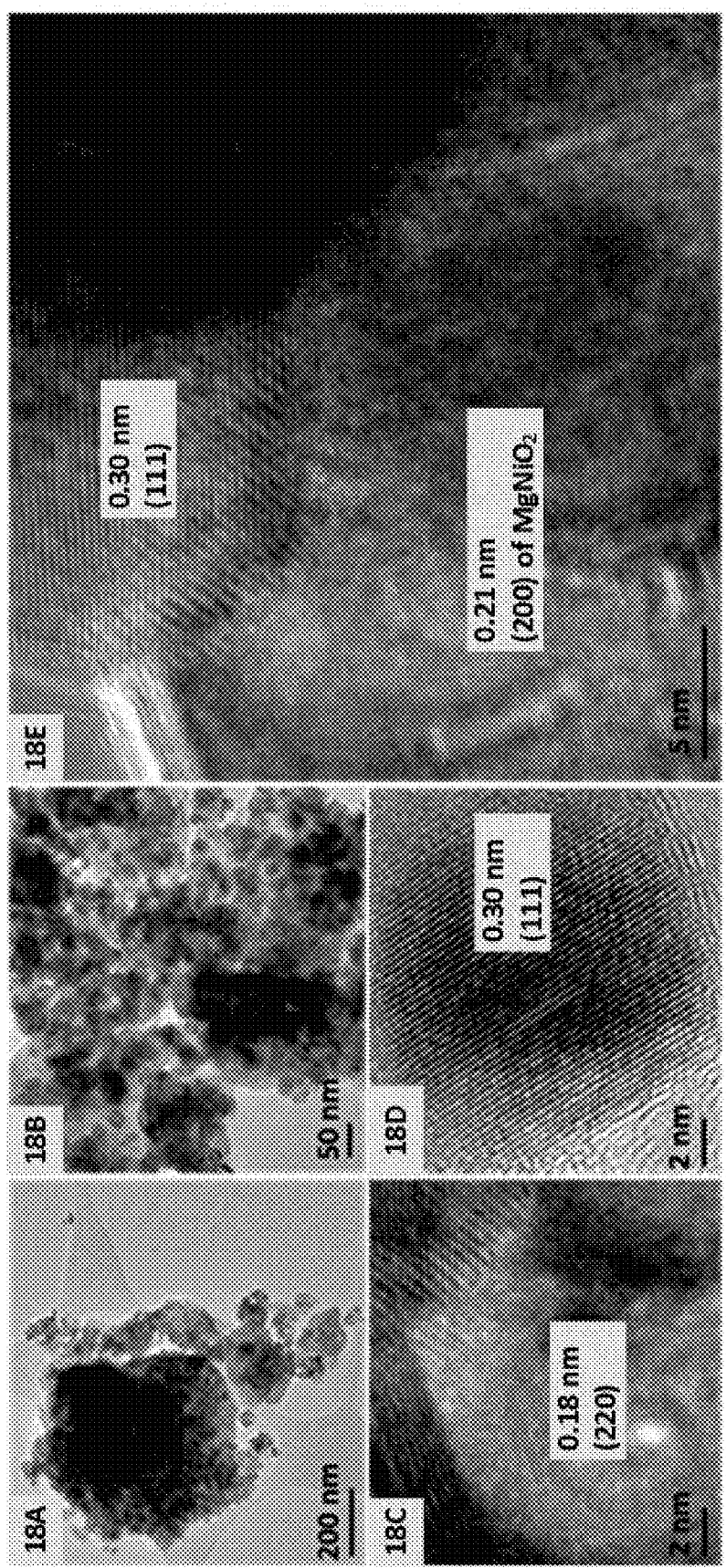
FIGS. 18A-18E show TEM images of NiMg/$Ce_{0.6}Zr_{0.4}O_2$ catalyst (NiMg/$Ce_{0.6}Zr_{0.4}O_2$ powders=9 g, binder=0.40 g, water=2.5 mL, pH=7)
Figures 19A, 19B, 19C, 19D, 19E:
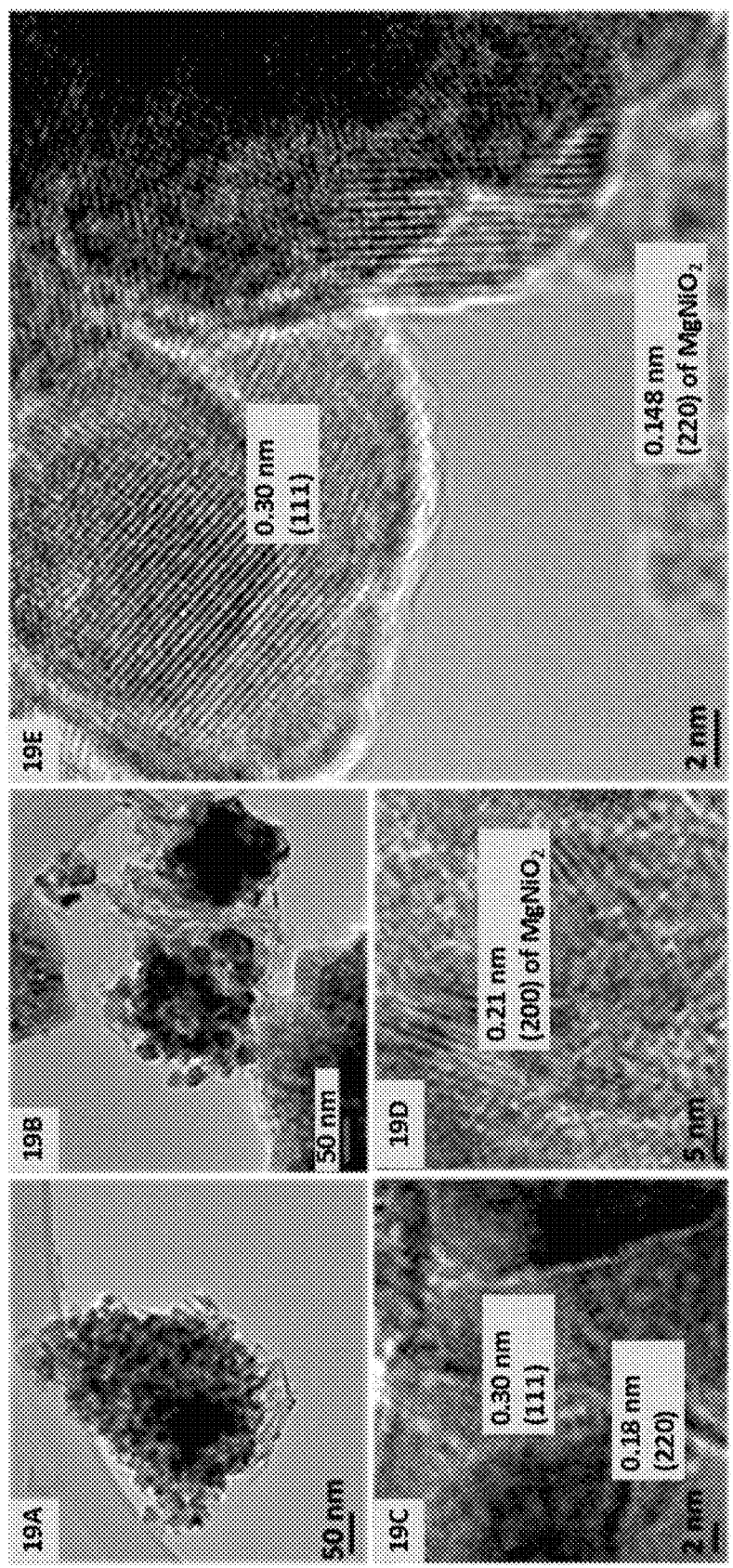
FIGS. 19A-19E show TEM images of NiMg/$Ce_{0.6}Zr_{0.4}O_2$ catalyst (NiMg/$Ce_{0.6}Zr_{0.4}O_2$ powders=9 g, binder=0.22 g, solution=2.5 mL (pH=1))

Comparison of Strongest Pellets with Previous Pellets $CO_2$-DRIFTS analysis. The surface basicity of the NiMg/$Ce_{0.6}Zr_{0.4}O_2$ catalyst with the highest mechanical strength (NiMg/$Ce_{0.6}Zr_{0.4}O_2$ powders=9 g, binder=0.22 g, solution=2.5 mL (pH=1)) was characterized via DRIFTS for the $CO_2$ TPD experiment, shown in FIG. 17. The DRIFTS analysis of the previous NiMg/$Ce_{0.6}Zr_{0.4}O_2$ pellet catalysts (NiMg/$Ce_{0.6}Zr_{0.4}O_2$ powders=9 g, binder=0.40 g, water=2.5 mL, pH=7) has been studied in our previous article [14]. For all the temperatures, strong $CO_2$ adsorption peaks were noted. The peaks can be assigned to mostly carbonate species. The peak around 1067 cm-1 marks the presence of monodentate carbonate as is also observed around 1541 cm-1 [32]. The presence of bridging carbonates was evident from peak at 1221 cm-1 which only disappears at high temperatures of 200° C. [32-34]. One of the dominant carbonate species at high temperatures is the bidentate form as observed around 1414 cm-1, 1576 cm-1. The symmetrical O—C—O stretch is observed around 1372 cm-1 [35]. This result demonstrates the presence of basic sites as is apparent from the strong adsorption characteristics of acidic $CO_2$ molecule. Our previous article [14] demonstrated the $CO_2$ adsorption spectra over similar catalyst species with different binder amounts.

TEM analysis. FIGS. 18A-18E and FIGS. 19A-19E show the TEM images of the previous NiMg/$Ce_{0.6}Zr_{0.4}O_2$ pellet catalysts (NiMg/$Ce_{0.6}Zr_{0.4}O_2$ powders=9 g, binder=0.40 g, water=2.5 mL, pH=7) studied in our previous article [14] and NiMg/$Ce_{0.6}Zr_{0.4}O_2$ catalyst with the highest mechanical strength (NiMg/$Ce_{0.6}Zr_{0.4}O_2$ powders=9 g, binder=0.22 g, solution=2.5 mL (pH=1)), respectively. The TEM images of the catalyst with 0.4 binder, showed $MgNiO_2$ particles of the range 15 nm dispersed nonuniformly on the support of the $Ce_{0.6}Zr_{0.4}O_2$ support. The HRTEM images exhibit the (111) and (220) planes of $Ce_{0.6}Zr_{0.4}O_2$ and (200) plane of $MgNiO_2$. The result is consistent with the phase from the above XRD analysis result. For the catalyst with binder amount 0.22, rod like structures of $Ce_{0.6}Zr_{0.4}O_2$ along with the $MgNiO_2$ nanoparticles were observed. The $MgNiO_2$ particles are also in the range of 15 nm. Along with the different planes exhibited by the catalyst with 0.4 binder amount, (220) of $MgNiO_2$ is also shown in HRTEM.

Figure 20:
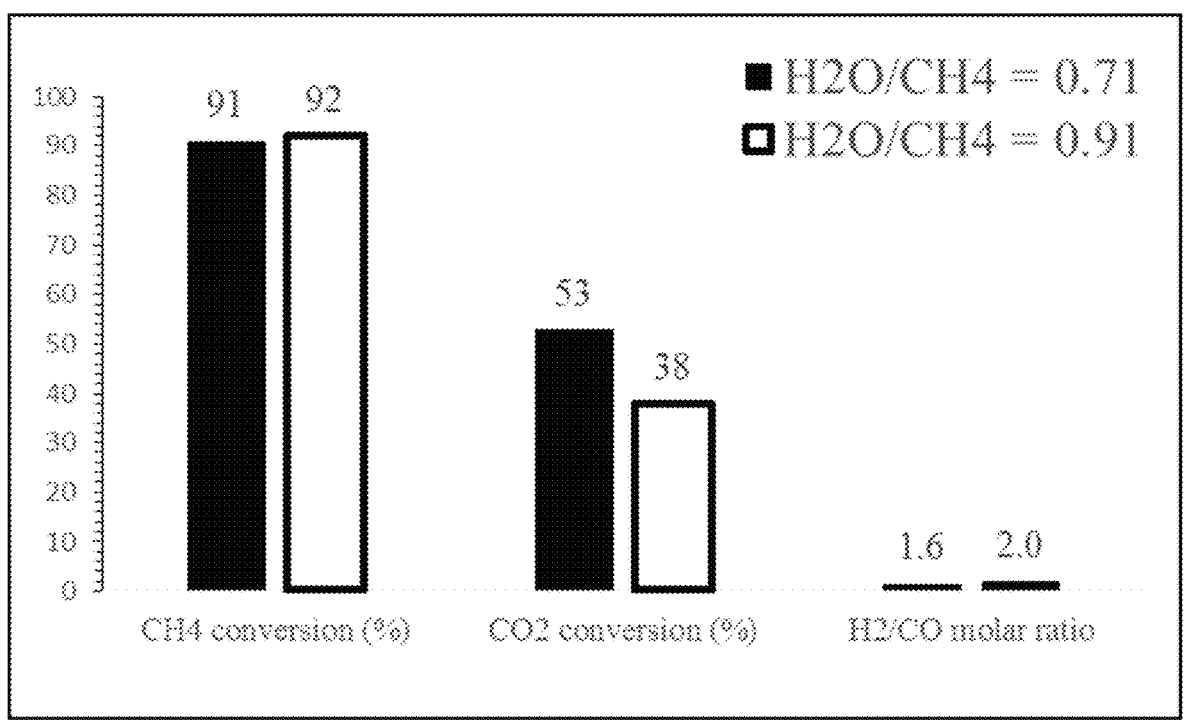
FIG. 20 shows the $CH_4$ conversion, $CO_2$ conversion and $H_2$/CO molar ratio obtained at 3 bar and 857° C. over NiMg/$Ce_{0.6}Zr_{0.4}O_2$ pellets (NiMg/$Ce_{0.6}Zr_{0.4}O_2$ powders=9 g, binder=0.22 g, solution=2.5 mL (pH=1)) at two different $H_2O/CH_4$ molar feed ratios (0.71 and 0.91).

Experimental tri-reforming studies. In our previous research, the tri-reforming was studied over NiMg/$Ce_{0.6}Zr_{0.4}O_2$ catalyst (NiMg/$Ce_{0.6}Zr_{0.4}O_2$ powders=9 g, binder=0.40 g, water=2.5 mL) [14]. In this study, the effect of different $H_2O/CH_4$ molar feed ratios (0.71 and 0.91) on $CH_4$ conversion, $CO_2$ conversion and $H_2/CO$ molar ratio at 3 bar and 857° C. over NiMg/$Ce_{0.6}Zr_{0.4}O_2$ pellets (catalyst powder/binder/$HNO_3$ solution ratio=9 g/0.22 g/2.5 mL; pH=1) was investigated for tri-reforming (FIG. 20). Due to the catalyst and reactor conditions, $CH_4$ conversions were high (91-92%). High $CH_4$ conversions are slightly lower than 95% which was obtained at 882° C. in our previous research [14]. A possible reason is due to the lower reaction temperature in this study. Increasing $H_2O/CH_4$ molar ratio led to a decrease in $CO_2$ conversion from 53% to 38% while the $H_2/CO$ molar ratio increased from 1.6 to 2.0. The water-gas shift (WGS) reaction, competition between $CO_2$ and steam for the same active sites might cause the above trend. Comprehensively, the $CH_4$ conversion, $CO_2$ conversion and $H_2/CO$ molar ratio in this study are in accord with the results obtained over NiMg/$Ce_{0.6}Zr_{0.4}O_2$ catalyst (NiMg/$Ce_{0.6}Zr_{0.4}O_2$ powders=9 g, binder=0.40 g, water=2.5 mL) in our previous research [14]. This indicates that the tri-reforming activity of the NiMg/$Ce_{0.6}Zr_{0.4}O_2$ catalyst is not affected significantly even though the crush strength of the catalyst is improved largely.

Comparison of strongest pellets with previous powders. In our previous tri-reforming test over NiMg/$Ce_{0.6}Zr_{0.4}O_2$ powders at conditions of 800° C., 61,000 h-1, 1 bar, and molar ratio of $CH_4:CO_2:H_2O:O_2$=1:0.7:0.23:0.2, the produced $CH_4$ conversion, $CO_2$ conversion, and $H_2/CO$ molar ratio were 97%, 78%, and 2.1, respectively [2]. In this study's tri-reforming test over NiMg/$Ce_{0.6}Zr_{0.4}O_2$ pellets (NiMg/$Ce_{0.6}Zr_{0.4}O_2$ powders=9 g, binder=0.22 g, solution=2.5 mL (pH=1)) at conditions of 857° C., 24,100 h-1, 3 bar, and molar ratio of $CH_4:CO_2:H_2O:air$=1:0.7:0.91:0.95, the produced $CH_4$ conversion, $CO_2$ conversion, and $H_2/CO$ molar ratio were 92%, 38%, and 2.0, respectively. The lower $CO_2$ conversion is due to some possible reasons: the higher pressure (3 bar), the feed flow of air instead of $O_2$, and the internal diffusion limitation of pellets. The Thiele moduli, Weisz-Prater criteria, and effectiveness factors for the tri-reforming over NiMg/$Ce_{0.6}Zr_{0.4}O_2$ catalysts are shown in Table 21. The reaction kinetic was assumed as first order with respect to methane [20]. The NiMg/$Ce_{0.6}Zr_{0.4}O_2$ powders used in our previous research at a micro-scale reactor did not exhibit internal mass transfer limitations [2], The NiMg/$Ce_{0.6}Zr_{0.4}O_2$ pellet catalysts exhibited an internal diffusion limitation due to high Weisz-Prater criteria (>1), indicating reactions were performed in the internal diffusion-limited regime.

TABLE 21

Analysis of internal diffusion limitations.

| NiMg/$Ce_{0.6}Zr_{0.4}O_2$ | Internal diffusion limitation ($C_{wp}$) | Thiele modulus ($\Phi_n$) | Effectiveness factor ($\eta$) | Length (mm) | Radius (mm) | Reference |
|---|---|---|---|---|---|---|
| Pellets | 8 | 2.9 | 0.34 | 2.0 | 0.75 | This study |
| Powders | 0.12 | <1 | 1.0 | N/A | 0.06 | [2, 14] |

Conclusions

After the optimization of binder amount, water amount, and pH of solvent, the mechanical strength of the NiMg/$Ce_{0.6}Zr_{0.4}O_2$ pellet catalysts improved greatly. The NiMg/$Ce_{0.6}Zr_{0.4}O_2$ pellet catalysts showed potential performance during tri-reforming of surrogate biogas: $CH_4$ conversion=92%, $CO_2$ conversion=38%, and $H_2/CO$ molar ratio=2.0. The binder amount, water amount, and pH of solvent had some effect on the physicochemical properties and mechanical strength of catalysts. Suitable amounts of binder or water are significant to maintain the high crush strength and breakage resistance of catalysts. A lower slurry pH generally contributes to a higher crush strength and breakage resistance of catalysts. The high conversions of reactants during tri-reforming process and potential mechanical strength suggest that the NiMg/$Ce_{0.6}Zr_{0.4}O_2$ pellet catalysts are suitable for commercial scale use. In the future, other methods (such as using an extruder with a screw, and steam curing of catalysts) can be tried to further improve the mechanical strength of catalysts.

References for Example 3

1. Hajjaji, N.; Martinez, S.; Trably, E.; Steyer, J. P.; Helias, A. Life cycle assessment of hydrogen production from biogas reforming. *Int. J. Hydrogen Energy* 2016, 41, 6064-6075.
2. Walker, D. M.; Pettit, S. L.; Wolan, J. T.; Kuhn, J. N. Synthesis gas production to desired hydrogen to carbon monoxide ratios by tri-reforming of methane using ni-mgo-(ce,zr)o2 catalysts. *Appl. Catal., A* 2012, 445-446, 61-68.
3. Kumar, N.; Roy, A.; Wang, Z.; L'Abbate, E. M.; Haynes, D.; Shekhawat, D.; Spivey, J. J. Bi-reforming of methane on ni-based pyrochlore catalyst. *Appl. Catal., A* 2016, 517, 211-216.
4. Xie, J.; Sun, X.; Barrett, L.; Walker, B. R.; Karote, D. R.; Langemeier, J. M.; Leaym, X.; Kroh, F.; Traylor, W.; Feng, J., et al. Autothermal reforming and partial oxidation of n-hexadecane via pt/ni bimetallic catalysts on cerin-based supports. *Int. J. Hydrogen Energy* 2015, 40, 8510-8521.
5. Liguras, D. K.; Kondarides, D. I.; Verykios, X. E. Production of hydrogen for fuel cells by steam reforming of ethanol over supported noble metal catalysts. *Appl. Catal., B* 2003, 43, 345-354.
6. Mitchell, S.; Michels, N. L.; Perez-Ramirez, J. From powder to technical body: The undervalued science of catalyst scale up. *Chem. Soc. Rev.* 2013, 42, 6094-6112.
7. Lang, W.; Laing, P.; Cheng, Y.; Hubbard, C.; Harold, M. P. Co-oxidation of co and propylene on pd/ceo 2-zro 2 and pd/al 2 o 3 monolith catalysts: A light-off, kinetics, and mechanistic study. *Appl. Catal., B* 2017, 218, 430-442.
8. Tronconi, E.; Groppi, G.; Visconti, C. G. Structured catalysts for non-adiabatic applications. *Current Opinion in Chemical Engineering* 2014, 5, 55-67.
9. <monolithic catalysts for the chemical industry.Pdf>.
10. <measurement and statistics of single pellet.Pdf>.
11. Baldovino-Medrano, V. G.; Le, M. T.; Van Driessche, I.; Bruneel, E.; Alcázar, C.; Colomer, M. T.; Moreno, R.; Florencie, A.; Farin, B.; Gaigneaux, E. M. Role of shaping in the preparation of heterogeneous catalysts: Tableting and slip-casting of oxidation catalysts. *Catal. Today* 2015, 246, 81-91.
12. Bemani, M.; Aboosadi, Z. A. A dynamic model on the tri-reformer fixed-bed reactor to prepare synthesis gas required to product methanol. *J. Fundam. Appl. Sci.* 2016, 8, 2918-2932.

13. Song, C.; Pan, W. Tri-reforming of methane: A novel concept for catalytic production of industrially useful synthesis gas with desired $h_2$/co ratios. *Catal. Today* 2004, 98, 463-484.
14. Zhao, X.; Walker, D. M.; Maiti, D.; Petrov, A. D.; Kastelic, M.; Joseph, B.; Kuhn, J. N. Nimg/ceria-zirconia cylindrical pellet catalysts for tri-reforming of surrogate biogas. *Ind. Eng. Chem. Res.* 2018, 57, 845-855.
15. Devyatkov, S. Y.; Zinnurova, A. A.; Aho, A.; Kronlund, D.; Peltonen, J.; Kuzichkin, N. V.; Lisitsyn, N. V.; Murzin, D. Y. Shaping of sulfated zirconia catalysts by extrusion: Understanding the role of binders. *Ind. Eng. Chem. Res.* 2016, 55, 6595-6606.
16. Katheria, S.; Deo, G.; Kunzru, D. Washcoating of ni/mgal2o4 catalyst on fecralloy monoliths for steam reforming of methane. *Energy Fuels* 2017, 31, 3143-3153.
17. Badoga, S.; Vosoughi, V.; Dalai, A. K. Performance of promoted iron/cnt catalyst for fischer-tropsch synthesis: Influence of pellet shapes and binder loading. *Energy Fuels* 2017, 31, 12633-12644.
18. Beeckman, J. W .L.; Fassbender, N. A.; Datz, T. E. Length to diameter ratio of extrudates in catalyst technology i. Modeling catalyst breakage by impulsive forces. *AIChE J.* 2016, 62, 639-647.
19. Fogler, H. Elements of chemical reaction engineering. *Third edition* 1999.
20. Cimenler, U.; Joseph, B.; Kuhn, J. N. Effect of zeolite membrane shell thickness on reactant selectivity for hydrocarbon steam reforming using layered catalysts. *Energy Fuels* 2016, 30, 5300-5308.
21. Rezaei, F.; Sakwa-Novak, M. A.; Bali, S.; Duncanson, D. M.; Jones, C. W. Shaping amine-based solid co 2 adsorbents: Effects of pelletization pressure on the physical and chemical properties. *Microporous Mesoporous Mater.* 2015, 204, 34-42.
22. Hou, M.; Jiang, H.; Liu, Y.; Chen, R. Role of initial water content in glycerol hydrogenolysis to 1,2-propanediol over cu-zno catalyst. *React. Kinet. Mech. Cat.* 2017, 122, 1129-1143.
23. May-Lozano, M.; Ramos-Reyes, G. M.; Martinez-Delgadillo, S. A.; Flores-Moreno, J. Effect of the amount of water in the synthesis of b-tio2: Orange ii photodegradation. *International Journal of Photochemistry* 2014, 2014, 1-8.
24. Chandrasekar, G.; Hartmann, M.; Murugesan, V. Preparation of sba-15 extrudates: Evaluation of textural and mechanical properties. *J. Porous Mater.* 2008, 16, 175-183.
25. <effect of ph of precipitation on the.Pdf>.
26. <effect of ph on the physicochemical.Pdf>.
27. Sinkó, K. Influence of chemical conditions on the nanoporous structure of silicate aerogels. *Materials* 2010, 3, 704-740.
28. <mechanical strength and reliability.Pdf>.
29. <zironia extrudate patent.Pdf>.
30. Abdullah, N. H.; Wan Abu Bakar, W. A.; Hussain, R.; Bakar, M. B.; van Esch, J. H. Effect of homogeneous acidic catalyst on mechanical strength of trishydrazone hydrogels: Characterization and optimization studies. *Arabian Journal of Chemistry* 2016.
31. Sekido, T.; Kappl, M.; Butt, H. J.; Yusa, S.; Nakamura, Y.; Fujii, S. Effects of ph on the structure and mechanical properties of dried ph-responsive latex particles. *Soft matter* 2017, 13, 7562-7570.
32. Chilukoti, S.; Gao F.; Anderson, B. G.; Niemantsverdriet, J. W. H.; Garland, M. Pure component spectral analysis of surface adsorbed species measured under real conditions. Btem-drifts study of co and no reaction over a pd/[gamma]-al2o3 catalyst. *PCCP* 2008, 10, 5510-5520.
33. Andreeva, D.; Idakiev, V.; Tabakova, T.; Ilieva, L.; Falaras, P.; Bourlinos, A.; Travlos, A. Low-temperature water-gas shift reaction over au/ceo2 catalysts. *Catal. Today* 2002, 72, 51-57.
34. Bi, Y.; Xu, H.; Li, W.; Goldbach, A. Water-gas shift reaction in a pd membrane reactor over pt/ce0.6zr0.4o2 catalyst. *Int. J. Hydrogen Energy* 2009, 34, 2965-2971.
35. Wang, X.; Shi, H.; Kwak, J. H.; Szanyi, J. Mechanism of co2 hydrogenation on pd/al2o3 catalysts: Kinetics and transient drifts-ms studies. *ACS Catal.* 2015, 5, 6337-6349.

REFERENCES FOR BACKGROUND

1. Hajjaji, N.; Martinez, S.; Trably, E.; Stayer, J.-P.; Hellas, A., Life cycle assessment of hydrogen production from biogas reforming. *International Journal of Hydrogen Energy* 2016, 41, (14), 6064-6075.
2. Kumar, N.; Roy, A.; Wang, Z.; L'Abbate, E. M.; Haynes, D.; Shekhawat, D.; Spivey, J. J., Bi-reforming of methane on Ni-based pyrochlore catalyst. *Applied Catalysis A: General* 2016, 517, 211-216.
3. Olah, G. A.; Goeppert, A.; Czaun, M.; Mathew, T.; May, R. B.; Prakash, G. K., Single Step Bi-reforming and Oxidative Bi-reforming of Methane (Natural Gas) with Steam and Carbon Dioxide to Metgas ($CO—2H_2$) for Methanol Synthesis: Self-Sufficient Effective and Exclusive Oxygenation of Methane to Methanol with Oxygen. *J Am Chem Soc* 2015, 137, (27), 8720-9.
4. Noureldin, M. M. B.; Elbashir, N. O.; Gabriel, K. J.; El-Halwagi, M. M., A Process Integration Approach to the Assessment of $CO_2$ Fixation through Dry Reforming. *ACS Sustainable Chemistry & Engineering* 2015, 3, (4), 625-636.
5. Walker, D. M.; Pettit, S. L.; Wolan, J. T.; Kuhn, J. N., Synthesis gas production to desired hydrogen to carbon monoxide ratios by tri-reforming of methane using Ni—MgO—$(Ce,Zr)O_2$ catalysts. *Applied Catalysis A: General* 2012, 445-446, 61-68.
6. Bemani, M.; Aboosadi, Z. A., A dynamic model on the tri-reformer fixed-bed reactor to prepare synthesis gas required to product methanol. *Journal of Fundamental and Applied Sciences* 2016, 8, (3S), 2918-2932.
7. Song, C.; Pan, W., Tri-reforming of methane: a novel concept for catalytic production of industrially useful synthesis gas with desired $H_2$/CO ratios. *Catalysis Today* 2004, 98, (4), 463-484.
8. Balzarotti, R.; Italiano, C.; Pino, L.; Cristiani, C.; Vita, A., Ni/$CeO_2$-thin ceramic layer depositions on ceramic monoliths for syngas production by Oxy Steam Reforming of biogas. *Fuel Processing Technology* 2016, 149, 40-48.
9. Xu, Y.; Ma, Y.; Demura, M.; Hirano, T., Enhanced catalytic activity of $Ni_3Al$ foils towards methane steam reforming by water vapor and hydrogen pretreatments. *International Journal of Hydrogen Energy* 2016, 41, (18), 7352-7362.
10. Kahle, L. C. S.; Roussiere, T.; Maier, L.; Herrera Delgado, K.; Wasserschaff, G.; Schunk, S. A.; Deutschmann, O., Methane Dry Reforming at High Temperature and Elevated Pressure: Impact of Gas-Phase Reactions, *Industrial & Engineering Chemistry Research* 2013, 52, (34), 11920-11930.

11. Farrauto, R. J.; Armor, J. N., Moving from discovery to real applications for your catalyst. *Applied Catalysis A: General* 2016, 527, 182-189.
12. Roy, P. S.; Park, C. S.; Raju, A. S. K.; Kim, K., Steam-biogas reforming over a metal-foam-coated (Pd—Rh)/(CeZrO₂—Al₂O₃) catalyst compared with pellet type alumina-supported Ru and Ni catalysts. *Journal of CO₂ Utilization* 2015, 12, 12-20.
13. Zhao, X.; Ngo, H. T.; Walker, D. M.; Weber, D.; Maiti, D.; Cimenler, U.; Alves, A. D. P.; Joseph, B.; Kuhn, J. N., Biogas tri-reforming over Ni/Mg/ceria-zirconia/alumina pellet catalysts. *International Journal of Hydrogen Energy* 2017, Under review.
14. Vita, A.; Cristiana, G.; Italiano, C.; Pino, L.; Specchia, S., Syngas production by methane oxy-steam reforming on Me/CeO₂ (Me=Rh, Pt, Ni) catalyst lined on cordierite monoliths. *Applied Catalysis B: Environmental* 2015, 162, 551-563.
15. Garcia-Vargas, J. M.; Valverde, J. L.; Diez, J.; Dorado, F.; Sánchez, P., Catalytic and kinetic analysis of the methane tri-reforming over a Ni—Mg/β-SiC catalyst. *International Journal of Hydrogen Energy* 2015, 40, (28), 8677-8687.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A method of making a $Ce_{0.6}Zr_{0.4}O_2$ supported NiMg catalyst extrudate, the method comprising:
   (a) preparing a ceria-zirconia solution comprising $Ce(NO_3)_3 \cdot 6H_2O$, $ZrO(NO_3)_2 \cdot xH_2O$, and water;
   (b) combining the ceria-zirconia solution and $NH_4OH$ to produce a precipitate;
   (c) drying and calcining the precipitate to produce a $Ce_{0.6}Zr_{0.4}O_2$;
   (d) forming a nickel-magnesium solution comprising $Ni(NO_3)_2 \cdot 6H_2O$ and $Mg(NO_3)_2 \cdot 6H_2O$ dissolved in water;
   (e) adding the nickel-magnesium solution to the $Ce_{0.6}Zr_{0.4}O_2$ to produce the $NiMg/Ce_{0.6}Zr_{0.4}O_2$;
   (f) ball milling the $NiMg/Ce_{0.6}Zr_{0.4}O_2$ to produce a $NiMg/Ce_{0.6}Zr_{0.4}O_2$ powder;
   (g) combining the $NiMg/Ce_{0.6}Zr_{0.4}O_2$ powder with a binder and water to produce a mixture;
   (h) extruding the mixture through a die to produce a wet extrudate; and
   (i) drying and calcining the wet extrudate to produce the $Ce_{0.6}Zr_{0.4}O_2$ supported NiMg catalyst extrudate.

2. The method according to claim 1, wherein the mass ratio of the $Ce(NO_3)_3 \cdot 6H_2O$ to the $ZrO(NO_3)_2 \cdot xH_2O$ is about 1.5 to 3.5.

3. The method according to claim 1, wherein in step (c) the drying is performed by heating the precipitate to a first elevated temperature of about 110° C. to 130° C.

4. The method according to claim 3, wherein the heating is performed for a period of time of at least 6 hours.

5. The method according to claim 1, wherein in step (c) the calcining is performed by heating the precipitate to a second elevated temperature of about 700° C. to 900° C. at a rate of about 5° C./min to 15° C./min and maintaining the second elevated temperature for a period of at least 2 hours.

6. The method according to claim 1, wherein a mass ratio of $Ni(NO_3)_2 \cdot 6H_2O$ to $Mg(NO_3)_2 \cdot 6H_2O$ is about 0.4 to 1.0.

7. The method according to claim 1, wherein the $NiMg/Ce_{0.6}Zr_{0.4}O_2$ powder is about a −625 mesh.

8. The method according to claim 1, wherein a mass ratio of the $NiMg/Ce_{0.6}Zr_{0.4}O_2$ powder to the binder is about 10 to 90.

9. The method according to claim 1, wherein a mass ratio of the $NiMg/Ce_{0.6}Zr_{0.4}O_2$ powder to the water is about 1.5 to 7.

10. The method according to claim 1, wherein the binder is selected from the group consisting of gum guar, microcrystalline cellulose, polyvinyl pyrrolidone, polyvinyl alcohol, magnesium stearate, carboxymethyl cellulose, phenolic resin, petroleum resin, bentonite clay, molasses, alumina, aluminate silicate, methyl cellulose, hydroxyethyl cellulose, polyvinyl acetate, vegetable hydrocolloid, polyvinyl butyal, acrylic polymer, animal protein, cellulose ether, polymethyl methacrylate, locust bean, gelatine, and a combination thereof.

11. The method according to claim 1, wherein the die has a diameter of about 1 mm to 4 mm.

12. The method according to claim 1, wherein in step (i) the drying is performed by heating the wet extrudate to a first elevated temperature of about 100° C. to 150° C.

13. The method according to claim 1, wherein in step (i) the calcining is performed by heating the wet extrudate to a second elevated temperature of about 400° C. to 600° C. at a rate of about 5° C./min to 20° C./min.

14. The method according to claim 13, further comprising in step (i) maintaining the second elevated temperature for a period of time of at least 2 hours.

15. The method according to claim 1, further comprising pressing the wet extrudate from step (h) prior to the drying and calcining in step (i).

16. The method according to claim 15, wherein the wet extrudate is pressed at a force of at least 4000 lbs.

17. The method according to claim 1, wherein the mass ratio of the $Ce(NO_3)_3 \cdot 6H_2O$ to the $ZrO(NO_3)_2 \cdot xH_2O$ is about 1.5 to 3.5;
   wherein the mass ratio of $Ni(NO_3)_2 \cdot 6H_2O$ to $Mg(NO_3)_2 \cdot 6H_2O$ is about 0.4 to 1.0;
   wherein the $NiMg/Ce_{0.6}Zr_{0.4}O_2$ powder is about a −625 mesh;
   wherein the mass ratio of the $NiMg/Ce_{0.6}Zr_{0.4}O_2$ powder to the binder is about 10 to 90; and
   wherein the mass ratio of the $NiMg/Ce_{0.6}Zr_{0.4}O_2$ powder to the water is about 1.5 to 7.

18. The method according to claim 17, wherein the binder is selected from the group consisting of gum guar, microcrystalline cellulose, polyvinyl pyrrolidone, polyvinyl alcohol, magnesium stearate, carboxymethyl cellulose, phenolic resin, petroleum resin, bentonite clay, molasses, alumina, aluminate silicate, methyl cellulose, hydroxyethyl cellulose, polyvinyl acetate, vegetable hydrocolloid, polyvinyl butyal, acrylic polymer, animal protein, cellulose ether, polymethyl methacrylate, locust bean, gelatine, and a combination thereof.

19. The method according to claim 1, wherein in step (c) the drying is performed by heating the precipitate to a first elevated temperature of about 110° C. to 130° C. for a period of time of at least 6 hours;
   wherein in step (c) the calcining is performed by heating the precipitate to a second elevated temperature of about 700° C. to 900° C. at a rate of about 5° C./min to 15° C./min and maintaining the second elevated temperature for a period of at least 2 hours;

wherein in step (i) the drying is performed by heating the wet extrudate to a first elevated temperature of about 100° C. to 150° C.; and wherein in step (i) the calcining is performed by heating the wet extrudate to a second elevated temperature of about 400° C. to 600° C. at a rate of about 5° C./min to 20° C./min and maintaining the second elevated temperature for a period of time of at least 2 hours.

* * * * *